United States Patent [19]

Cotton et al.

[11] Patent Number: 5,379,280
[45] Date of Patent: Jan. 3, 1995

[54] CONFERENCING SYSTEM FOR DISTRIBUTED SWITCHING NETWORK

[75] Inventors: John M. Cotton, East Norwalk; Neil C. Olsen, Milford; Alex T. Wissink, Woodbridge; Gary V. Pieper, Wallingford; William A. Oswald, Oxford, all of Conn.; Nicholas Necula, Mount Vernon, N.Y.; Enrique Abreu, Huntington, Conn.; Maurice J. Mascarenhas, Stamford, Conn.; Rudy De Bruyn, Derby, Conn.

[73] Assignee: IPC Information Systems, Inc., Stamford, Conn.

[21] Appl. No.: 766,649
[22] Filed: Sep. 26, 1991
[51] Int. Cl.$^6$ .................. H04Q 11/04; H04M 3/42; H04M 3/00
[52] U.S. Cl. .................. 370/62; 379/202; 379/204; 379/269
[58] Field of Search .................. 370/60, 62; 379/202, 379/203, 204, 205, 206, 269

[56] References Cited

U.S. PATENT DOCUMENTS

| | | | |
|---|---|---|---|
| 4,173,713 | 11/1979 | Giesken et al. | 379/272 X |
| 4,201,889 | 5/1980 | Lawrence et al. | 379/269 X |
| 4,201,891 | 5/1980 | Lawrence et al. | 379/269 X |
| 4,317,962 | 3/1982 | Cox et al. | 379/269 X |
| 4,817,085 | 3/1989 | De Prycker | 370/60 |
| 4,825,433 | 4/1989 | Deschaine | 379/202 X |
| 4,903,260 | 2/1990 | Boettle et al. | 370/60 |
| 4,916,690 | 4/1990 | Barri | 370/60 |
| 4,998,275 | 3/1991 | Braunstein et al. | 379/164 |
| 5,127,001 | 6/1992 | Steagall et al. | 379/202 X |
| 5,276,678 | 1/1994 | Hendrickson et al. | 379/202 X |

FOREIGN PATENT DOCUMENTS

| | | |
|---|---|---|
| WO8804869 | 6/1988 | WIPO . |
| WO8807297 | 9/1988 | WIPO . |
| WO8911764 | 11/1989 | WIPO . |
| WO9004316 | 4/1990 | WIPO . |

OTHER PUBLICATIONS

"Implementation of a 16 to 16 Switching Element for ATM Exchanges," by P. Barri et al., *IEEE Journal on Selected Areas in Communications*, vol. 9, No. 5, pp. 751–757 (Jun. 1991).

"Effects of Output Buffer Sharing on Buffer Requirements in an ATDM Packet Switch," by A. E. Eckberg et al., AT&T Bell Laboratories, Holmdel, New Jersey 07733, pp. 459–465 (IEEE 1988).

"Metastability Behavior of CMOS ASIC Flip-Flops in Theory and Tests", by Jens U. Horstmann et al., *IEEE Journal of Solid-State Circuits*, vol. 24, No. 1 pp. 146–157 (Feb. 1989).

"Input v. Output Queueing on a Space-Division Packet Switch," by Mark J. Karol et al., *IEEE Global Telecommunications Conference*, Conference Record, vol. 2, Session 19.4, pp. 659–665 (Dec. 1986).

"Metastable Behavior in Digital Systems," by Lindsay Kleeman et al., *IEEE Design & Test of Computers*, pp. 4–19 (Dec. 1987).

"A Shared Buffer Memory Switch for an ATM Exchange," by Hiroshi Kuwahara et al., pp. 118–122 (IEEE 1989).

"System 12: Review of the Fundamental Concepts," by R. Van Malderen, *Electrical Communication*, vol. 59, No. 1/2, pp. 20–28 (1985).

"Large-Scale ATM Multistage Switching Network with Shared Buffer Memory Switches," by Yoshito Sakurai et al., *IEEE Communications*, vol. 29, No. 1 pp. 90–96 (Jan. 1991).

"The Behavior of Flip-Flops Used as Synchronizers and Prediction of Their Failure Rate," by Harry J. M. Veendrick, *IEEE Journal of Solid-State Circuits*, vol. 1 SC-15, No. 2 pp. 169–176 (Feb. 1989).

*Primary Examiner*—James L. Dwyer
*Assistant Examiner*—Harry S. Hong
*Attorney, Agent, or Firm*—Morgan & Finnegan

[57] ABSTRACT

A conferencing device and method among terminals in a distributed digital telephone switching system is provided. The telephone switching system has a plurality of switching elements for interconnecting telephone units and telephone lines via communication links. A duplex path is set between each party in the conference and a designated bridge port. The speech from all the parties in the conference is summed and at the bridge port the sum is sent back to all engaged in the conference. As each party receives the sum, it subtracts its own speech data and therefore obtains the speech data from the other parties in the conference.

47 Claims, 33 Drawing Sheets

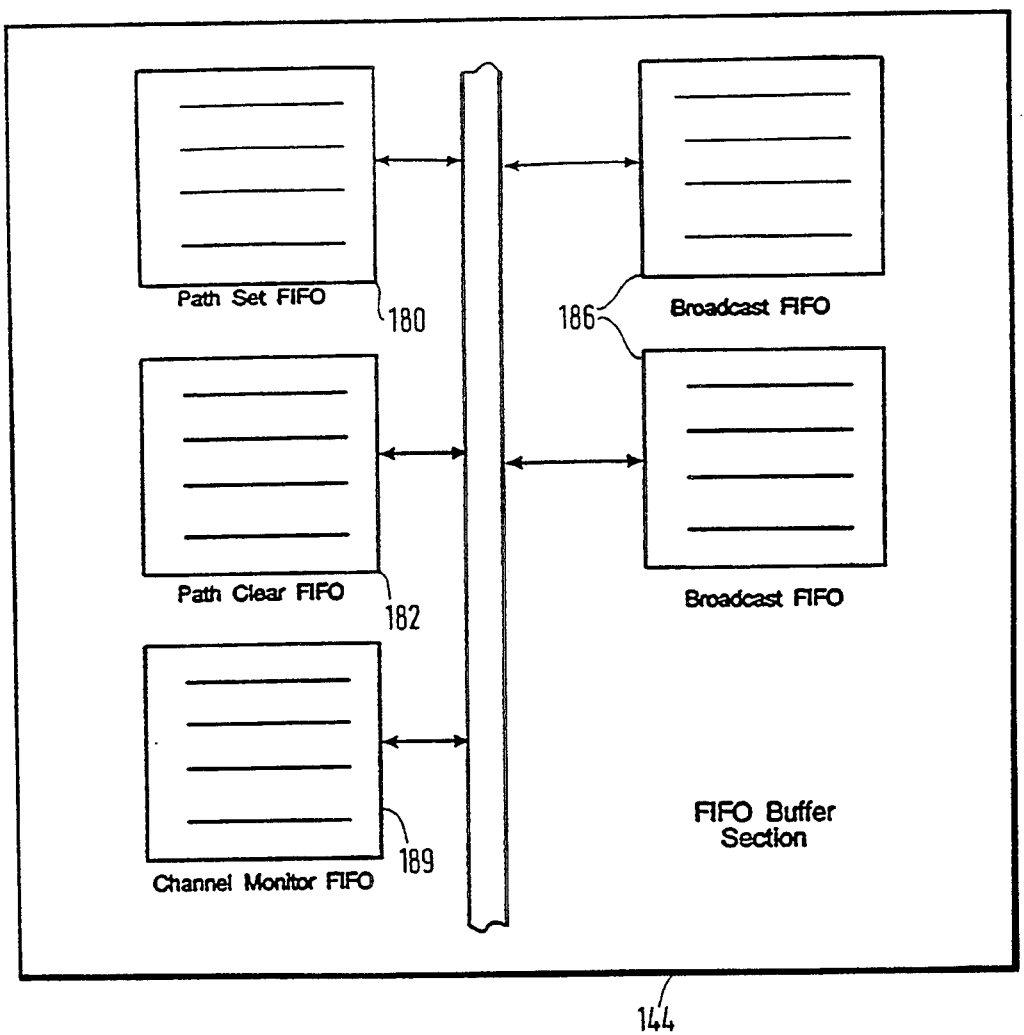

NEXT CHANNEL IN LINK LIST TABLE

NEXT CHANNEL OUT LINK LIST TABLE

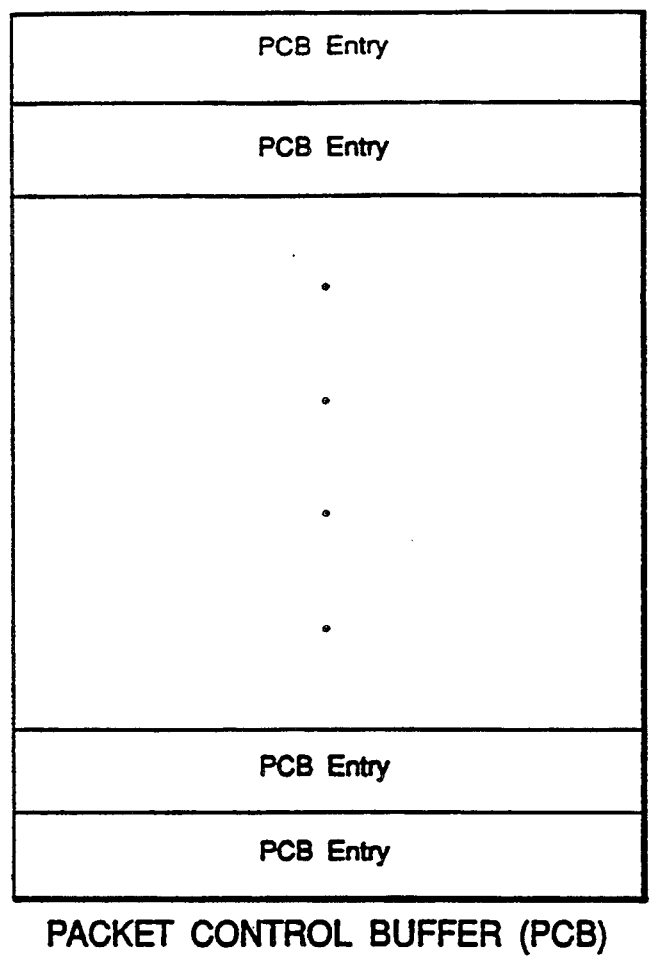
PACKET CONTROL BUFFER (PCB)
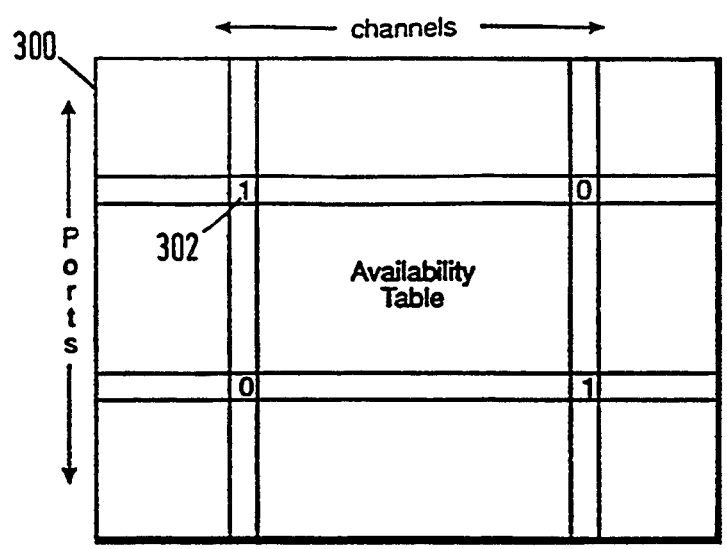

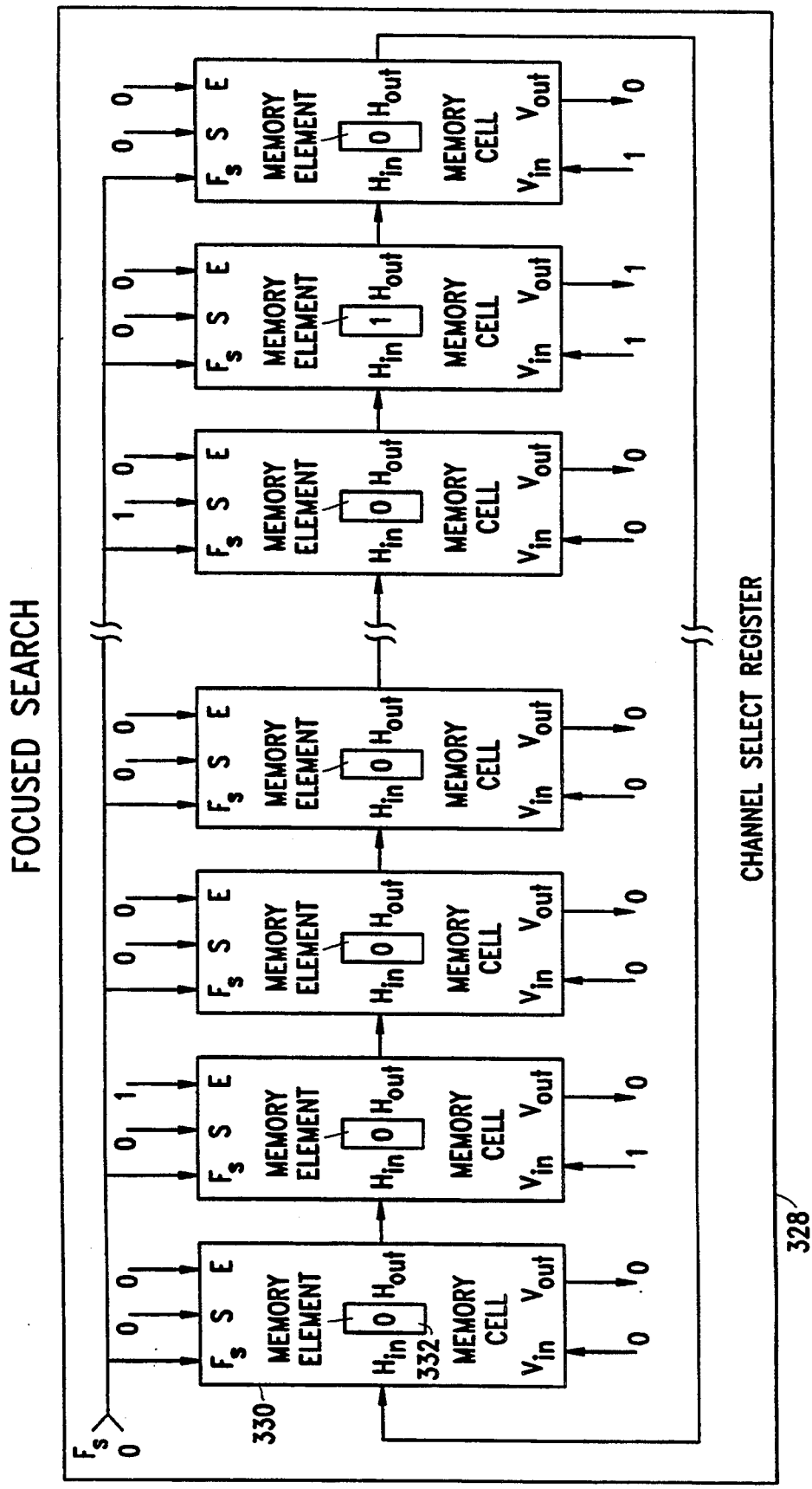

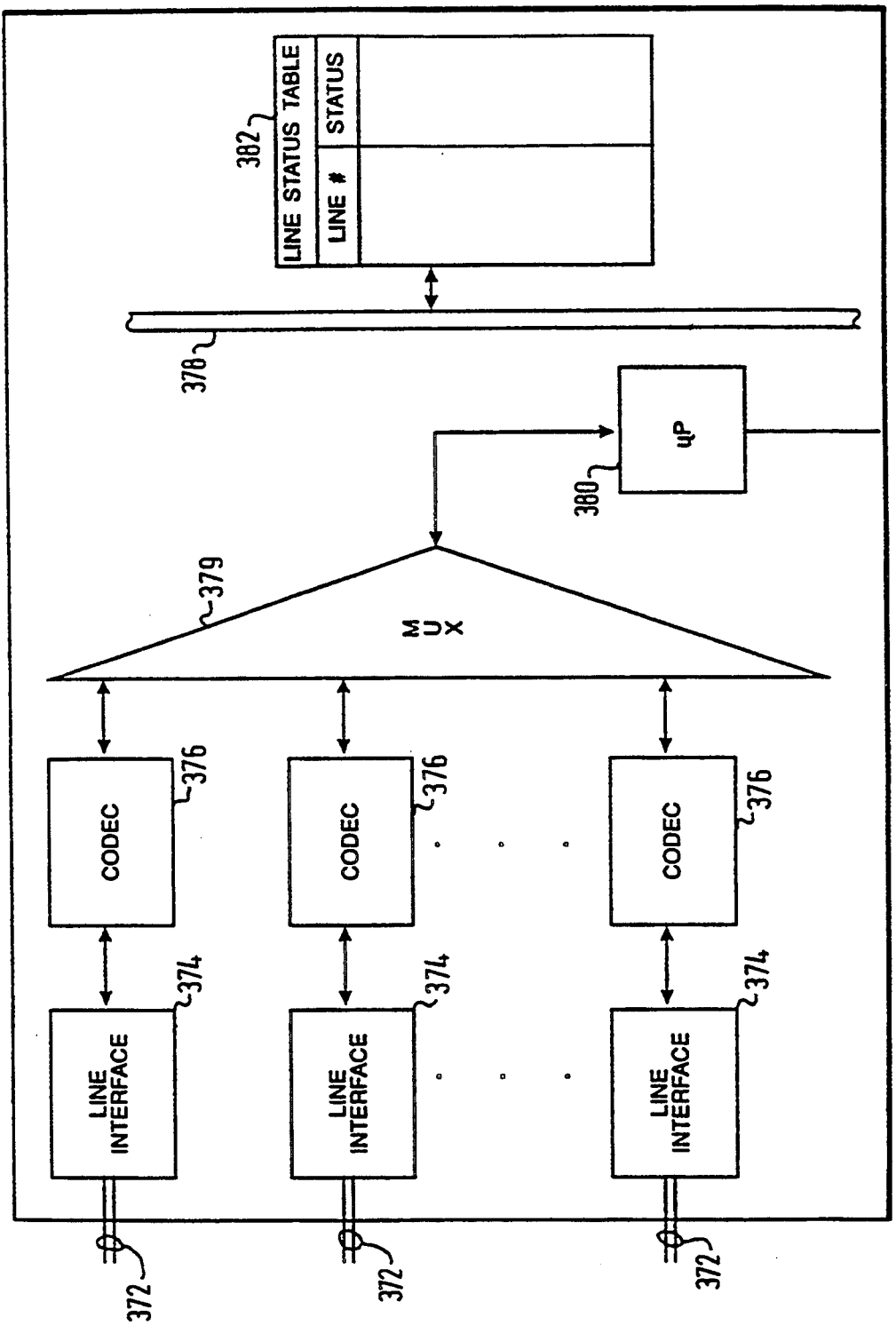

FIG.14
BROADCAST MESSAGE
First Channel:
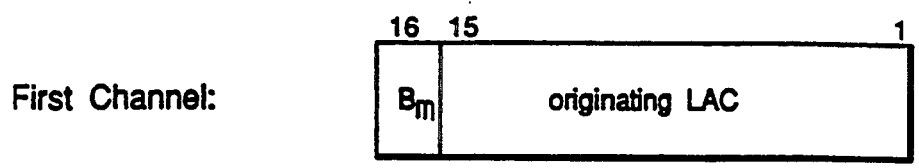
Second Channel:
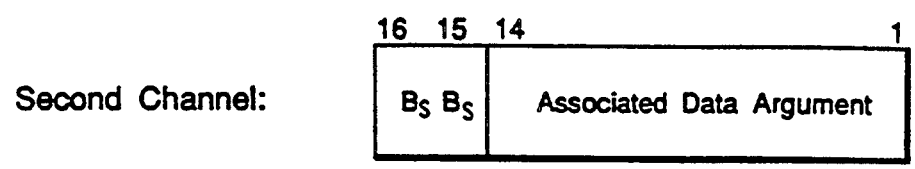
FIG.17a
BROADCAST INDEX TABLE
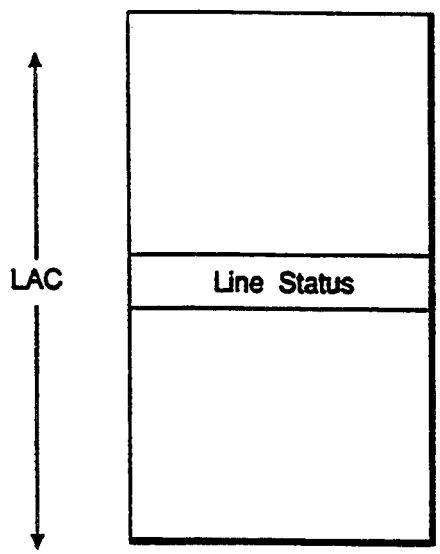
FIG.17b
BUTTON TABLE
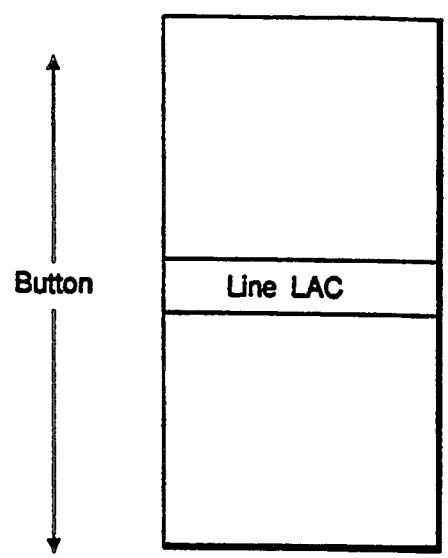

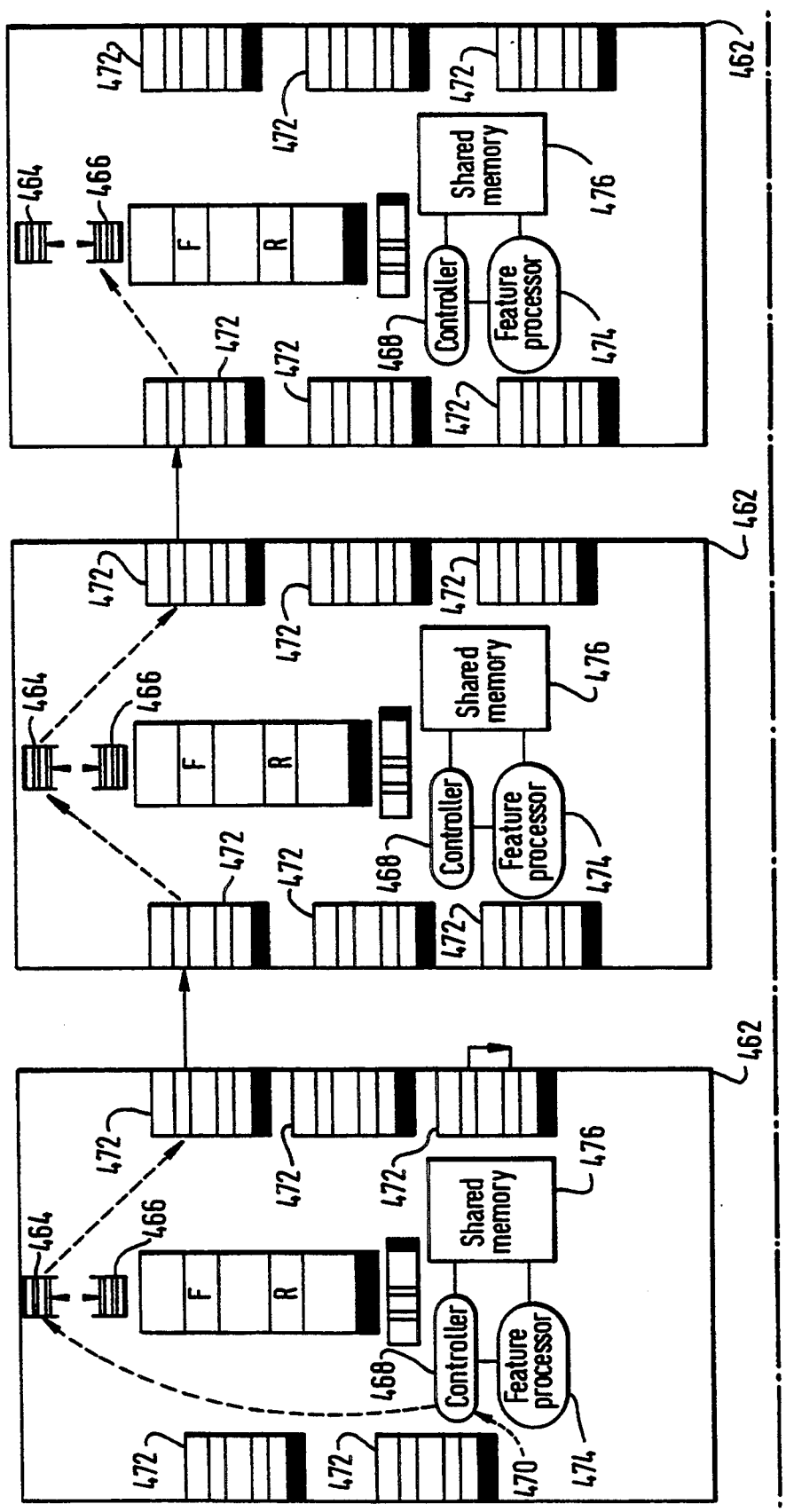

CONFERENCING SYSTEM FOR DISTRIBUTED SWITCHING NETWORK

BACKGROUND OF THE INVENTION

This invention relates to digital switching network and, more particularly, to call conferencing in a multi-line telephone systems which provide an interface between large key telephones and a multiplicity of analog and digital lines.

Multi-line telephone key stations, sometimes referred to as "trader turrets" are widely used in rapid communication networks such as trading operations in banks, brokerage houses, and other financial institutions. Telephones of this type provide direct access to a large number of telephone lines with a line being selected by the depression of a single key on the key station. A large trading room can include many telephone key stations for simultaneously completing many transactions each involving many millions of dollars;. Trader turrets generally include at least thirty line keys and often have several hundred. Trader turrets are normally used in networks where the number of lines is greater than the number of telephones whereas, with normal telephone key stations, the number of telephones exceeds the number of lines.

A typical trading transaction involves a rapid series of short telephone conversations to, for example, locate traders having the desired security for sale at the best price. A typical call lasts for few seconds and there may be many calls per minute during the course of a single transaction. It is important for a trader to have immediate access to outside lines irrespective of system load conditions. It is also important that many terminals and users could be connected to each other simultaneously in a conference mode in a highly distributed switching system.

Each telephone key station may have access to other telephone key stations in the system within a trading room and to a large number of outside lines and private lines. Each telephone user may be connected to several lines or terminals at the same time in a conferencing mode.

In prior art switching systems, conferencing was accomplished by connecting three or more parties to a dedicated conference bridge for the system. With such arrangements there is a maximum number of parties that can participate in a conference. There is also a maximum number of conferences that can exist at any one time.

A dedicated switching element to accomplish the conferencing function and to serve as a conference bridge was provided. In most of the digital switches of the prior art voice data was companded. As a result, voice data had to be linearized at the conference bridge before the voice data from different sources could be summed at the conference bridge. The linearized voice data would be summed at the conference bridge but the sum had to be returned to the companded state. This approach tends to make the system rigid and inflexible to system changes.

SUMMARY OF THE INVENTION

It is therefore an object of this invention to provide a method and apparatus for conferencing in a switching network.

Another object of the invention is to provide a method and apparatus for flexible conferencing wherein a relatively large number of separate conference calls may be established at any one time and each such conference call may include a relatively large number of participants.

Another object of the invention is to provide a flexible conferencing feature in a digital switching network, where any terminal can join a plurality of other lines or terminals and engage in a duplex communication.

In the distributed switching network according to this invention, a flexible conferencing method and apparatus is provided.

Initially a duplex path is set between two locations in the network, such as a telephone station and a line card. The duplex path directs speech from the telephone station and the line card into a bridge port located in an interface switch element associated with the telephone station where the linear speech data is summed. The summed speech data is then sent from the bridge port back to both the telephone station and the line card. At this point, the telephone station subtracts out its own speech data from the sum to derive the line card speech data, and the line card subtracts out its own speech data to receive the telephone station speech data only.

Other parties can join the conference by simply setting duplex paths to the same bridgeport. The sum of the speech data from all parties in the conference eventually arrives at the bridge port, and then sent back to all engaged in the conference. As each party receives the sum, it subtracts its own speech data and therefore obtains the speech data from the other parties in the conference. During the path set-up to a bridge port, the party being added joins the conference at the closest possible switch element where the speech data is summed and propagates forward towards the bridge.

In order for a party to subtract out its own speech data from the summed conference speech data, the time delay for that parties speech data must be determined. Once the conference path is established each party to the conference can successfully send a confirm command to the conference bridge and measure the return time. This return time delay is thereafter used to time the subtraction of the parties via data from the conference sum.

The foregoing and other features and advantages of the invention will be apparent from the following more detailed description of the preferred embodiments of the invention as illustrated by the accompanying drawings.

BRIEF DESCRIPTION OF DRAWINGS

A more complete understanding of the present invention may be had by reference to the following Detailed Description with the accompanying drawings, wherein:

FIG. 3b is a conceptual diagram of the switch element of FIG. 3a;

FIG. 4 is a schematic diagram of the FIFO buffer section of FIG. 3a;

FIG. 5 is a functional block diagram of the feature processor section of FIG. 3a;

FIG. 8 illustrates a block diagram of a packet control buffer;

FIG. 9a is a conceptual diagram of an availability table in accordance with the instant invention;

FIG. 9e and 9f are schematic block diagrams illustrating the search functions of the channel select register;

FIG. 11b is a conceptual drawing of a private line interface as may be connected to the switching network;

FIG. 14 is a diagram illustrating the structure of a broadcast message;

FIG. 17a is a diagram illustrating the structure of a broadcast index table; and FIG. 17b is a diagram illustrating the structure of a button table.

DETAILED DESCRIPTION OF THE DRAWINGS

A. System Layout

Figure 1:
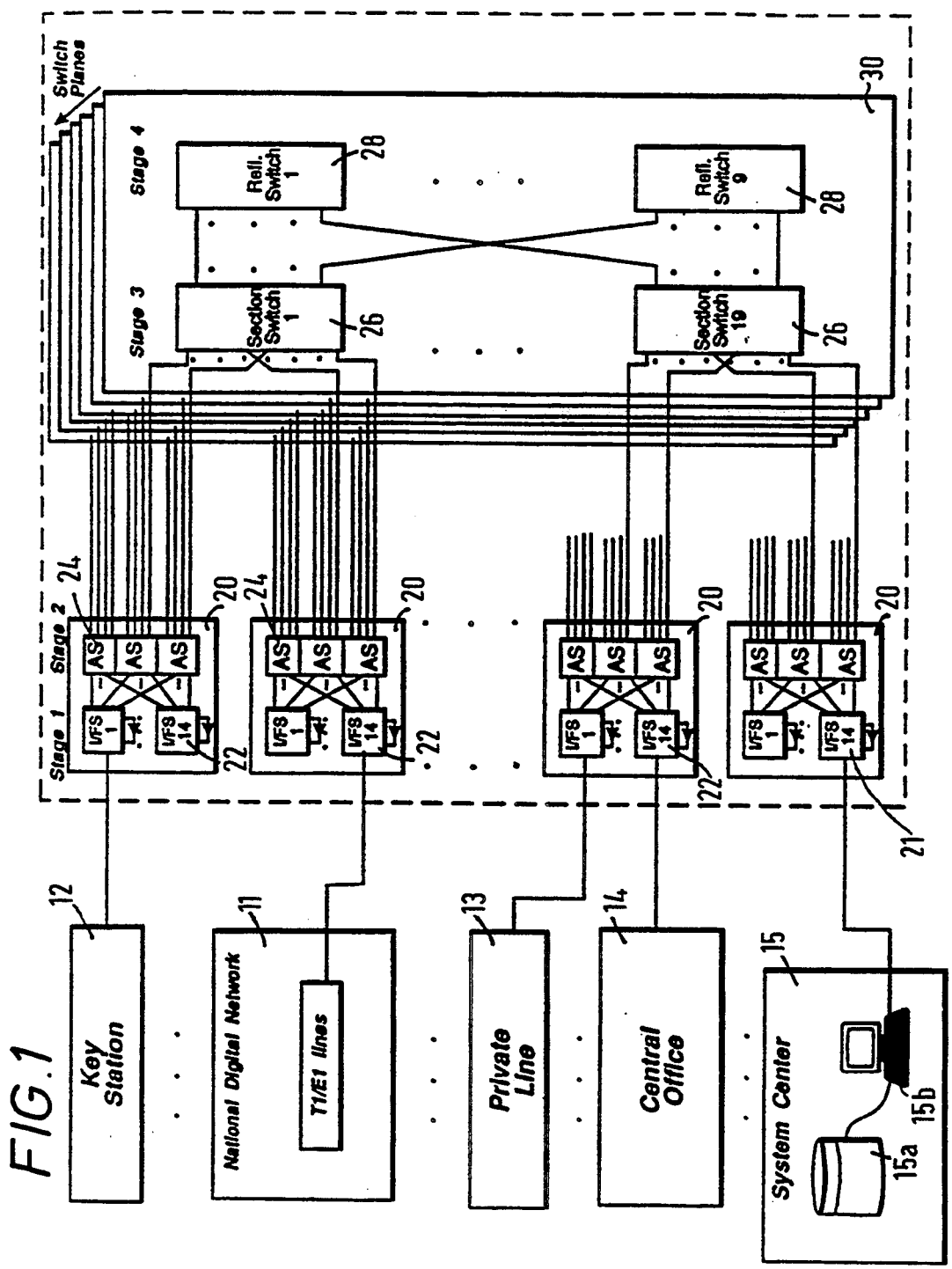
FIG. 1 is a block diagram of the switching network.

FIG. 1 illustrates a switching network for interconnecting various types of voice or data equipment and telephone lines, indicated generally as units 11-15 in accordance with the instant invention. In the preferred embodiment, the switching network generally includes four stages. The first two stages, referred to as interface (I/F) switches 22 and access switches (AS) 24, are in terminal units 20 which provide an entry point to the switching network for telephone lines and terminal equipment. The third and fourth stages, referred to as the section switches 26 and the reflection switches 28, respectively, are located on individual switch planes 30.

Each of the terminal units 20 includes fourteen interface switches 22 and three access switches 24. Each of the interface switches in a terminal unit is coupled by a communications link to each of the three associated access switches. In the preferred embodiment, there are six switching planes 30 in the switching network. Each of the 3 access switches of a terminal unit is coupled to a different set of four out of the six switching planes via its corresponding communications link.

A section switch on a switching plane is linked to two out of the three access switches from each terminal unit and, therefore, since there are nineteen section switches on a switching plane in a maximum system of this configuration, there can be as many as ninety-five terminal units coupled to each plane.

In the maximum system of this configuration each switching plane also includes nine reflection switches 28, each of which is linked to all of the other section switches. With this arrangement, a communication path can be established from a key station to a line termination via an interface switch and any one of three access switches and an interface switch at the key station end, appropriate section switches and reflection switches on any one of six switching planes, and any one of three access switches and the interface switch at the line end. Should any access switch, section switch, reflection switch, or switching plane fail, there are always many alternative paths available through the switching network. Should an interface switch fail, the failure only affects the terminal units connected to the particular failed interface switch and does not affect the operation of the remainder of the system. The total number of switches at any stage depends on the size of the system, the degree of non-blocking communication required and the degree of redundancy required. Other embodiments of the switching network may have other configurations for connecting the switch elements.

Each of the switch elements operates independently and is controlled by separate processors. In the preferred embodiment, all switch elements—interface switches, access switches, section switches and reflection switches—include many common structural elements. Each switch element includes multiple input switch ports and multiple output switch ports. Communication via a switch port is on thirty-two time divided channels. The system architecture is based on the use of 24-bit pulse code modulated (PCM) channels that simultaneously transmit and receive speech and data. The processors associated with each switch element can switch in space (from one port to another) and can switch in time (from one channel to another).

In the preferred embodiment as disclosed, reflection switches, section switches, and access switches are basically the same and each has nineteen switch ports. The interface switch is similar to the other switch elements but smaller, including only a single terminal port and four switch ports. Other embodiments of the interface switch may have more than four switch ports.

B. Port Group Assignments

The switching network provides multiple routes for transmitting voice or data communications between a source and destination. Thus, at any given switch element, there may be a number of switch ports that are available for sending the transmission towards its destination. A port group specifies a number of switch ports for a switch element that can be utilized for routing such a transmission to its destination. The port groups are defined (i.e., switch ports assigned to which port groups) once the configuration of the switching network is established. The port group assignment information can thereafter be loaded into the appropriate switch elements during system initialization. In the preferred embodiment, 32 port groups are available. Port groups 0 through 19 are reserved for identifying individual switch ports, while switch port groups 20 through 31 are reserved for specifying groups of switch ports.

As shown in FIG. 1, interface switches have one terminal port (Port #18) connected to terminal equipment and three switch ports (Port #0–Port #2) coupled to the three access switches in the same terminal unit. One port (Port #3) in every interface switch is reserved for the bridge port (a switch port of which the output is connected to the input, as discussed below). Additionally, one port (Port #19) in every interface switch is reserved for the link data port (switch port that allows the switch elements to send and receive data packets to and from the network, as will be discussed in greater detail below). Preferably, the following port group assignments are utilized for interface switches:

| Interface Switch Port Groups | Associated Ports |
|---|---|
| 0 | Port # 0 (to access switch stage) |
| 1 | Port # 1 (to access switch stage) |
| 2 | Port # 2 (to access switch stage) |
| 3 | Port # 3 (to bridge) |
| 4–17 | undefined |
| 18 | Port # 18 (to terminal equipment) |
| 19 | Port # 19 (link data port) |
| 20 | Port #'s 0, 1, 2 |
| 21 | Port #'s 0, 1 |
| 22 | Port #'s 1, 2 |
| 23 | Port #'s 0, 2 |
| 24–31 | undefined |

This convention allows all three switch ports connecting the interface switch to the access switches to be identified for the outgoing communications link (port group 20), any combination of two switch ports going to an access switch (port groups 21 through 23) to be identified, or any individual switch port to be identified as the outgoing communications link to the access stage (port groups 0 through 2).

As shown in FIG. 1, fourteen switch ports (Port #0 Port-#13) of an access switch are coupled to the fourteen associated interface switches on the terminal unit and the remaining four switch ports (Port #14–Port #17) of an access switch are coupled to four section switches on four of the six switching planes. One port (Port #19) in every access switch is reserved for the link data port. Additionally, one port (Port #18) in every access switch is coupled to a tape device for recording desired transmissions. Preferably, the following port group assignments are utilized for access switches:

| Access Switch Port Groups | Associated Ports |
|---|---|
| 0–19 | respective individual port (Port # 0–Port # 19) |
| 20 | Port #'s 14, 15, 16, 17 (to section switch stage) |
| 21–31 | undefined |

This convention allows all four switch ports connecting the access switch to the section switches to be identified as the outgoing communications link, or any individual switch port to be identified as the outgoing communications link. Due to the redundant architecture of the switching network, any of the four switch planes connected to an access switch may be utilized for the transmission. Thus, port group 20 sufficiently identifies the outgoing route. However, port groups 21 through 31 remain available for further definition of port groups.

As shown in FIG. 1, ten switch ports (Port #0–Port #9) of a section switch are coupled to the associated access switches of five terminal units (TU1–TU5) and nine switch ports (Port #10–Port #18) of the section switch are coupled to the nine reflection switches on the same switch plane. For illustrative purposes, terminal unit TU1 is coupled to Port #0 and Port #5; TU2 is coupled to Port #1 and Port #6; TU3 is coupled to Port #2 and Port #7; TU4 is coupled to Port #3 and Port #8; and TU5 is connected to Port #4 and Port #9. One port (Port #19) in every section switch is reserved for the link data port. Preferably, the following port group assignments are utilized for section switches:

| Section Switch Port Groups | Associated Ports |
|---|---|
| 0–19 | respective individual port (Port # 0–Port # 19) |
| 20 | Port #'s 0, 5 (associated with TU1) |
| 21 | Port #'s 1, 6 (associated with TU2) |
| 22 | Port #'s 2, 7 (associated with TU3) |
| 23 | Port #'s 3, 8 (associated with TU4) |
| 24 | Port #'s 4, 9 (associated with TU5) |
| 25 | Port # 10 through Port # 18 |
| 26–31 | undefined |

This convention defines a port group for each of the terminal units connected to the section switch. Additionally, this convention defines a port group (port group 25) for transmissions going to reflection switches. For transmissions travelling from a section switch to a reflection switch, the transmission may be directed to any of the nine reflection switches.

As shown in FIG. 1, a reflection switch can send a transmission to any section switch (via Port #0–Port #18) and thus to any terminal unit. However, to reach a particular terminal unit from a reflection switch only one section switch is suitable. Thus, no port groups are defined. One port (Port #19) in every reflection switch is reserved for the link data port. Preferably, the following individual port group assignments are utilized for reflection switches:

| Reflection Switch Port Groups | Associated Ports |
|---|---|
| 0–19 | individual port (Port # 0–Port # 19) |
| 20–31 | undefined |

This convention identifies only individual switch ports as the appropriate output route from a reflection switch.

C. Switch Data Format

Figure 2:
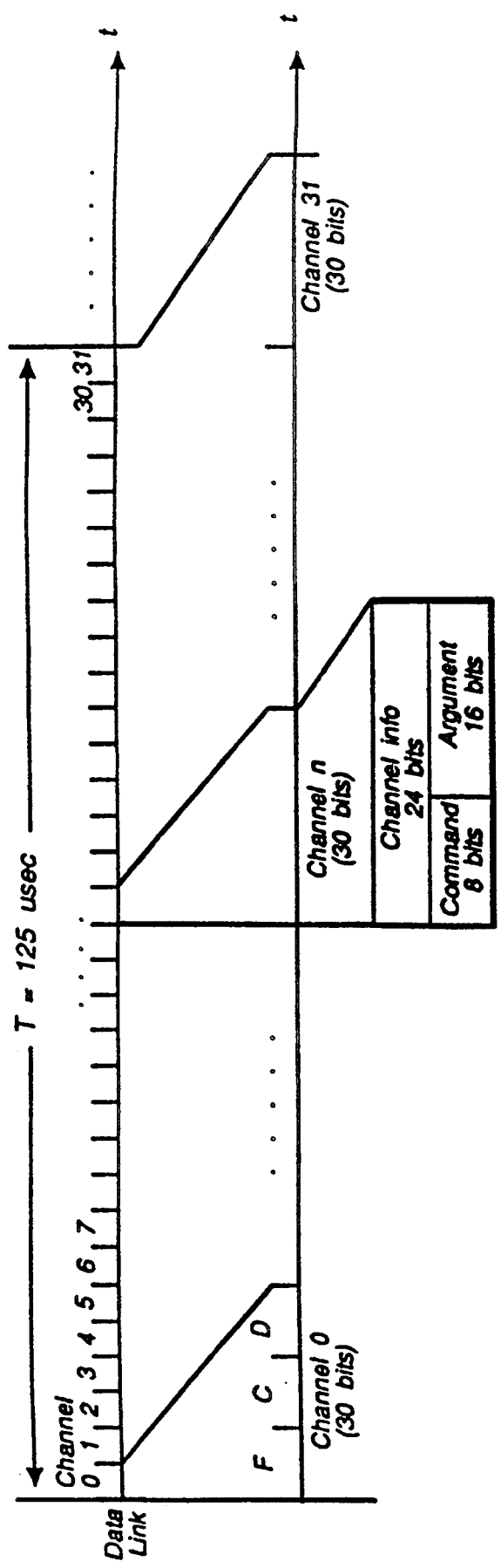
FIG. 2 is a data format diagram.

The data format for the switch element is illustrated in FIG. 2. Each communications link carries thirty-two channels of time division multiplexed (TDM) digital information in a serial format. As illustrated, each frame of the TDM format includes thirty-two channels. Each channel has thirty bits over the communication links including twenty-four bits of information when processed in a switch element. Each switch element provides a 5B/4B decoding on the incoming channel segments and as a result, the 30-bit segment in the communications link is converted to a 24-bit segment of information. The remaining six bits are utilized for error correction. The encoding is used to ensure an adequate 1's density for clock extraction and provide even parity for error detection on communication links and ensure that the framing signal in channel zero of a frame cannot be imitated. Each switch element before transmitting the 24-bit channel information performs a 4B/5B encoding and provides the communication link with the 30-bit channel. The length of each frame is 125 μ sec. Channel 0 of each frame includes synchronizing information and may include clocking information. Channels 30 and 31 may be used to broadcast line status information.

In the preferred embodiment, the twenty-four bits of information of a channel word are divided into eight bits of command code and sixteen bets of argument. Some examples of command codes are "Path Set", "Path Clear", "Not Acknowledged (NAK)", and "Confirm." Variations of the "Path Set" command may include "path set data private"; "path set data multicast"; "path set voice duplex"; "path set voice simplex" and "path set voice private." The particular command is according to an 8 bit code which appears at the beginning of each channel word. These commands when present, are interpreted by the processors in the system to perform their respective functions. The 16-bit argument contains the data being conveyed through the switch.

D. Addressing Scheme

Route selection through the switching network utilizes an addressing scheme including logical address codes (LACs), type address codes (TACs) and packet address codes (PACs). Routing itself through the switching network relies on logical address codes.

A LAC is unique code number assigned to a location in the switching network from which data can originate or to which data can be sent. For example, the location defined by a LAC could be an analog line card, a trader station, a digital line T1 channel line card, a processing function (software location), or a switch element within the switch.

A LAC is used by the switch elements in the switching network for path routing. For example, in response to a "path set" command the switch elements will establish a communication path across the switching network from one LAC which may be an incoming line, to another IAC which may be a key station or some other terminal equipment. Thereafter, appropriate channels for the communication path are selected and allocated throughout the communication to transmit information from originating LAC to the destination LAC, until the end of communication or forced release. A particular advantage of using LACs is that it provides a layer of isolation from physical changes in the system.

A TAC or type address code is a unique code indicating a group of LACs to which data may be multicast simultaneously, i.e., a one to many transmission of data.

A PAC is used to identify a packet type. When a packet is sent, the sending program is linked to the code and data of the packet and therefore the structure of the packet is known. However, when a packet is received, the structure of the packet is not known to the receiving processor. By assigning a PAC to individual packets, a local translation and substitution may be performed between the packet address code and the target processor packet software addresses.

In addition to its logical address code (LAC), each switch element in the switching network is assigned a physical switch address (PSA) that ,identifies the position or node of the switch element in the switching network. Although each switch element in the network is assigned a unique LAC, several processors can have the same PSA. For example, both a key station and the interface switch to which the key station is connected will have the same PSA because they are located at the same node of the switching network. Preferably, a PSA is comprised of four bytes that identify the position of a LAC by specifying the path that must be taken from the reflection stage of the switching network in order to reach the LAC.

The first byte of the PSA identifies the switch port that must be taken from the reflection switch stage in order to direct the transmission to a section switch that can send the transmission to its destination. (Port #1 for each reflection switch is coupled to the first section switch on the switch plane, Port #2 for each reflection switch is coupled to the second section switch on the switch plane, etc.)

The second byte of the PSA identifies the switch port that must be taken from the appropriate section switch in order to direct the transmission to its destination. Similarly, the third byte of the PSA identifies the switch port that must be taken from the appropriate access switch in order to direct the transmission to its destination.

Finally, to fully identify the position of a LAC associated with a section switch or reflection switch, the fourth byte of the PSA specifies the switch plane that the switch element is on. For an access switch, the fourth byte specifies which one of the three access switches on a terminal unit the access switch is. For an interface switch or other LAC, the fourth byte is zero.

The system center 15 maintains a load image array that catalogues the physical switch address (PSA) for each logical address code (LAC) that has been assigned in the network. Additionally, the load image array maintains a packet of specific data for each switch element including the LAC and TAC that dentify the adjacent switching elements.

E. System Center

Referring to FIG. 1, the system center 15 is responsible for initialization and maintenance of the switching system. The system center includes a file server 15a and a computer terminal 15b which have access to the switching network through interface switches 21. The system center is used to assign unique LAC, TAC and PAC address codes and to analyze these assignments to distribute data as necessary for initialization of the system.

As will be explained in more detail, during initialization of the system, each switch element polls the neighboring switch elements as to their understanding of their identity. The switch elements closer to the system center obtain their identity first. Once each switch element has determined its identity within the switching system, the system center transmits the appropriate software and data to the switch element.

The system center also maintains system status information. During the operation of the switching network, if a switch port of a switch element becomes inoperative, a report is sent to the system center dentifying the switch port responsible for the anomaly. The system center does analysis concerning the suspected faulty communication link and gives guidance to maintenance personnel as to corrective action.

F. Basic Switch Element

Figure 3A:
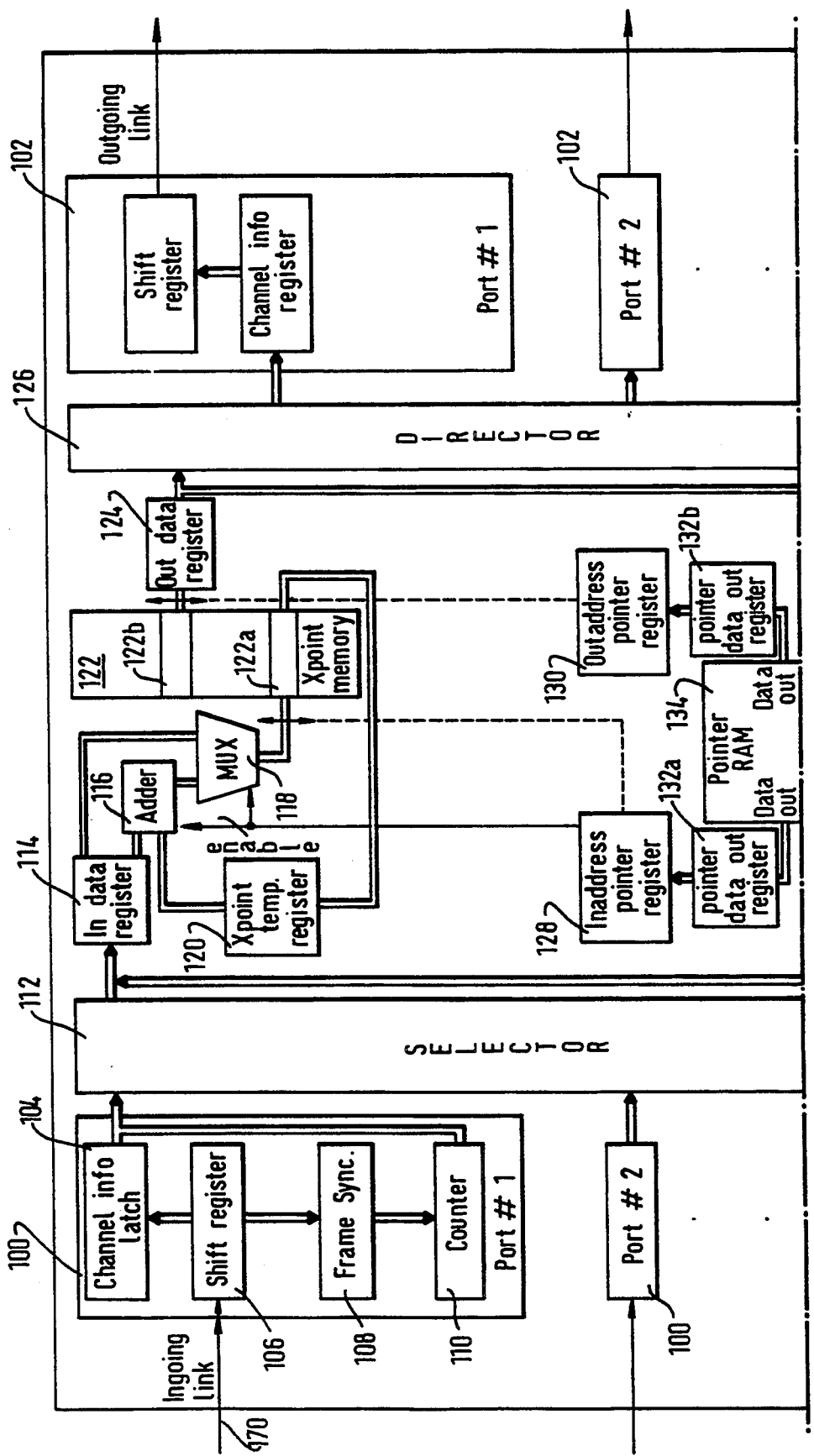
FIG. 3a is a block diagram of a switch element in the switching network.
Figure 3A:
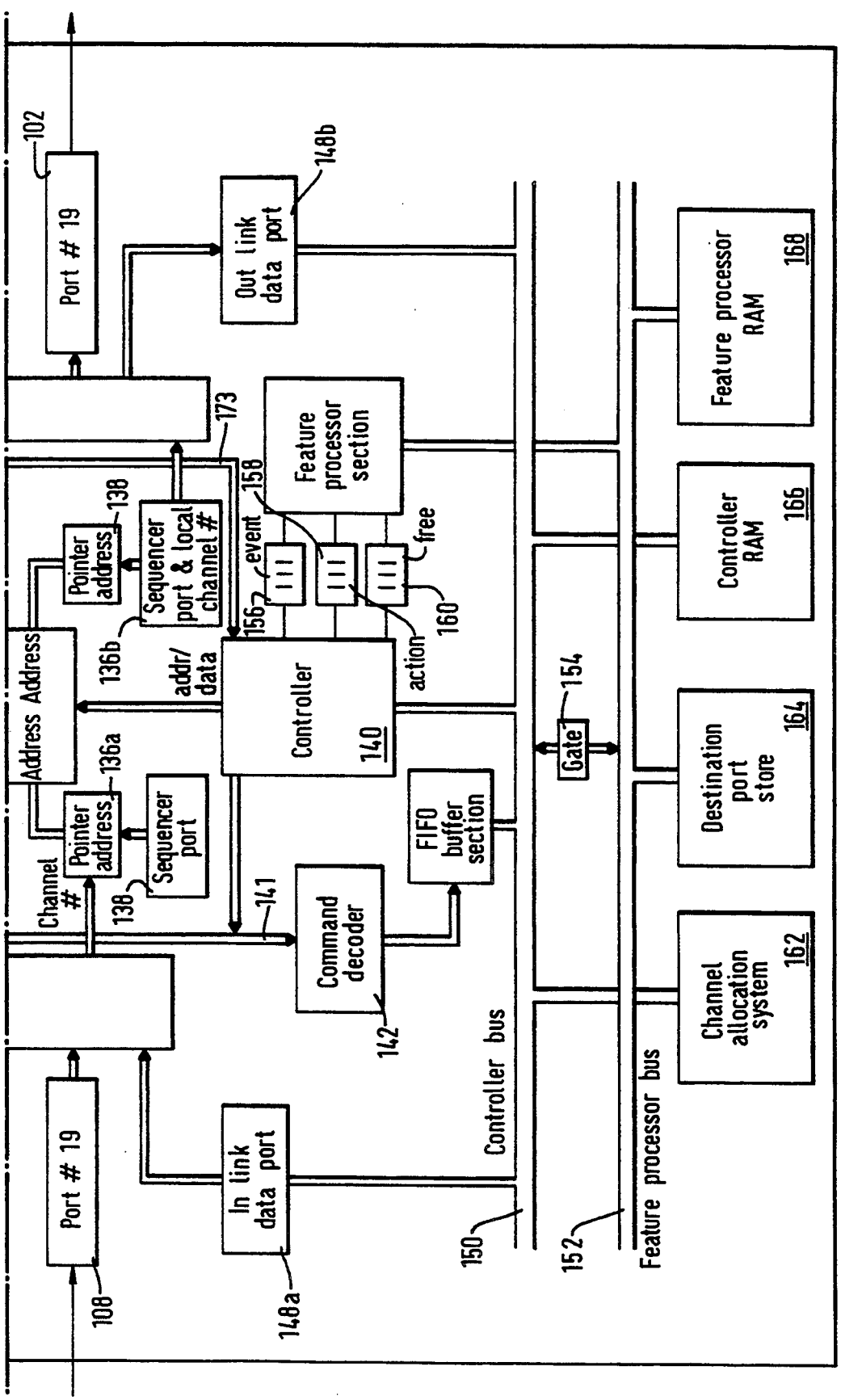

The basic layout for a switch element is shown in FIG. 3a including nineteen switch ports each having a channel receiver and a channel transmitter. As explained previously, a communications link supplies serial data to or from a switch port in a serial thirty-two channel time division multiplexed (TDM) frame format with twenty-four bits of information per channel. The first eight bits of each channel is used for commands such as setting a path or clearing a path, while the remaining sixteen bits are used for data transmission. Channel 0 is used for clocking information and includes a coded identifier (1111100000) which identifies the beginning of a frame.

The switch element includes nineteen channel receivers 100 and nineteen channel transmitters 102. Incoming data from another switch element or, in the case of interface switches, from a terminal port is stored in a crosspoint memory 122 on a channel-by-channel basis as directed by an in-address pointer register 128. Similarly, data can be read from the crosspoint memory and directed to a selected channel transmitter of a switch port and a selected channel by an out-address pointer register 130. In this fashion, incoming data can be shifted in space (from any channel receiver of a switch port to any channel transmitter of a switch port) and can be shifted in time (from one input channel to any output channel). The switch element is capable of summing data being placed in a particular crosspoint memory location to provide conferencing by addition of the data for two or more channels.

Data on the incoming communications link 170 is fed serially to the channel receiver 100. The channel receiver includes a shift register 106 for receiving the serial data input and converting the data from serial to parallel format. The first ten bits of the shift register are coupled to a frame synchronous detector 108 which looks for a coded identifier of the frame beginning. The shift register is also coupled to a channel information latch 104 which receives one data channel at a time. The frame synchronous detector 108 is coupled to a channel counter 110 which identifies the current incoming channel number for the data in the channel information latch 104.

As mentioned before, at the beginning of each frame, a 10-bit frame synchronous word is provided which consists of five 0's followed by five 1's (1111100000). When the frame sync detector recognizes the frame sync pattern, the counter is reset and thereafter counts channels to keep track of the incoming channel numbers. The shift register 106 converts the serial incoming bit stream into a parallel word and provides the channel word latch 104 with the parallel word.

A channel selector 112 samples the respective channel word latches of the ports in sequence and transfers the data in parallel to an in-data register 114. The output of the in-data register 114 is coupled to a multiplexer 118 and to a 16-bit saturation adder 116. A crosspoint temporary register 120 provides data from a crosspoint (X point) memory location to the second input of the adder. The output of the adder is also coupled to the multiplexer and the output of the multiplexer is coupled to the crosspoint memory 122.

During each switch port time slot, incoming channel information is stored in a crosspoint memory location and during each outgoing time slot the contents of a crosspoint memory location is retrieved and provided to an outgoing channel transmitter 102. The crosspoint memory is a fast 640×24 bit RAM which transfers data from incoming communications links to appropriate outgoing communications links.

The addresses of crosspoint memory locations for incoming and outgoing channel information are stored in pointer RAM 134. The addresses of the crosspoint memory locations in the pointer RAM are indexed by switch port and channel number. The pointer RAM 134 is a fast (640×2)×12 static RAM reserved for two sets of crosspoint memory addresses or pointers associated with each of the incoming and outgoing channels.

The pointer RAM index is defined as an 11 bit address as "PPPPPCCCCC" where A=0 or 1, which denotes an address for an incoming channel or an address for an outgoing channel respectively. CCCCC is the channel number from 0 to 31, and PPPPP is the port number from 0 to 19, where 19 is an address of a link data port and 18 is an address reserved for the terminal port which is used in interface switches only. The pointer RAM data is defined as 10 bits: for a crosspoint memory location, 1 bit to denote whether idle codes will be flagged, and one bit to denote if the cross point memory location is part of a conference call or a reset bit.

The pointer RAM is coupled to pointer data out registers 132a and 133b. Pointer data out register 132a is coupled to an in-address pointer register 128, and pointer data out register 132b is coupled to an out-address pointer register 130. The in-address pointer register directs the incoming data to its allocated crosspoint memory location 122a. Similarly, the out-address pointer register selects the outgoing data from its allocated crosspoint memory location 122b. The outgoing data is sent from out-data register 124 to the appropriate switch port via the channel information register in the channel transmitter 102.

Channel transmitter 102 provides a serial outgoing data stream to outgoing communications link 172. The channel transmitter 102 includes a channel word register 174 which receives the outgoing channel word in parallel format. The channel word register 174 is coupled to a shift register 176. The shift register converts the parallel data into a serial bit stream. At the beginning of each outgoing frame, the frame synchronous bits (1111100000) are provided by sequence port and local channel number 139 to director 126 and thereafter to channel transmitter 102 and sent by shift register 176.

In each channel receiver 100 the channel counter 110 provides the incoming channel number to a pointer address register 136a via selector 112. The pointer address register 136a is also coupled to a sequencer 138 which keeps track of the switch port number being served. The pointer address register 136a is coupled to the pointer RAM 134, and provides the incoming channel and switch port number to the pointer RAM.

The sequencer 139 is coupled to pointer address register 136b which provides the pointer RAM with local channel number and the switch port number. It may be appreciated that the local channel number is not the same as the incoming channel number. It is preferable to maintain two separate channel counts because incoming channel words arrive at individual switch ports at different times and, therefore, are not synchronous. However, the channel transmitter at every switch port transmits the same channel number at the same time.

During one channel time period, each switch port is assigned a unique time slot. Each switch port time slot is then divided into six phase periods by the system clock. During each switch port time slot, two phase periods are used to transfer out an outgoing data from its crosspoint memory location to its channel information register. Similarly, two phase periods are used to transfer an incoming data to its destination crosspoint memory location. The final two phase periods are reserved for controller 140 data transfers.

The switch element also includes a real time controller 140 coupled to a controller bus 150. The controller is coupled to in-data register 114 via data bus 141 allowing the controller to send information to a crosspoint memory location. Similarly the controller is coupled to out-data register 124 via data bus 143, allowing the controller to receive information from a crosspoint memory location.. A FIFO buffer section 144 is also coupled to the controller bus 150. As part of its responsibilities, the controller initializes and manages the switch ports, and sets and clears communication paths to lines, key stations and other processors.

The switch element also contains a feature processor section 146, which is coupled to a feature processor bus 152. The feature processor section provides call processing functions, initializations, fault recovery and maintenance. Feature processor section 146 and controller 140 communicate with each other via event FIFO 156, action FIFO 158 and free FIFO 160. The feature processor and the controller are also able to share memory resources through gate 154. Gate 154 couples the controller bus 150 to feature processor bus 152 at appropriate times. It can be appreciated that the functions of the controller and the feature processor may be combined and provided by one very fast processor.

A destination port store (DPS) 164 is provided and is coupled to the controller bus 150. The destination port store is a memory table which contains routing information for each logical address code (LAC). By indexing into the destination port store by a logical address code (LAC), the controller can find the port or group of ports that should be used to forward the call to its destination.

A channel allocation system (CAS) 162 is provided and is coupled to the controller bus 150. During the setting of a path across the switch element, the controller must select one or more free channels on outgoing communications links in order to complete the connection. The channel allocation system performs this activity in a short, fixed and repeatable time interval at the controller's request. It chooses the first available channel and distributes the load among switch ports in the same functional group.

The link data ports (LDP) 148a and 148b, which are coupled to the controller bus, provide the mechanism to launch and receive data packets to and from the network. To the switch ports of the switch element, the link data ports appear merely as another switch port. The link data port has 32 dedicated time slots which can read from and write to switch element crosspoint memory locations. To the controller 140, the link data port appears as 32 RAM locations.

The clocking for the switch element has not been shown in FIG. 5a as various clocking techniques well known to those skilled in the art can be utilized. For example, a centralized clock with dedicated lines to each switch element may be provided. A preferable clock, however, is a distributed clocking mechanism wherein the clock signals are transmitted throughout the system over the same communications links that carry the voice and data as disclosed in copending U.S. patent application Ser. No. 07/766,647, entitled, DISTRIBUTED CLOCKING SYSTEM (Attorney Docket No. 416-4034). The disclosure of this patent application is incorporated herein in its entirety by reference.

The output of the selector 112 is coupled to a command decoder 142 via data bus 141. The output of the command decoder is in turn coupled to the FIFO buffer section 144. When a switch port time slot is set for a particular switch port, e.g., switch port number 1, the channel data is transferred to the in-data register 114 via selector 112 and the incoming channel number information is transferred to pointer address register 136a via selector 112. The first 8 bits of the channel data are checked by the command decoder 142 which decodes the incoming commands. If the command decoder recognizes a command that requires the attention of the controller, it provides the incoming channel word to the FIFO buffer section 144 for further processing by the controller and the feature processor.

The pointer address register 136a at this point contains the incoming channel and switch port number; the channel number being obtained from the selector 112 and the switch port number from the sequencer 138. The pointer address register thereafter indexes the pointer RAM 134 with the switch port and channel number, to obtain the address of the appropriate crosspoint memory location. The address of the crosspoint memory location is then provided to pointer data out register 132a.

The in-data register 114 contains the data provided by the selector. The in-address pointer register 128 retrieves the crosspoint memory location from the pointer-data out register 132a. The in-address pointer register 128 is also coupled to the adder 116 and the multiplexer 118. The data in the in-address pointer register includes a flag signal that is provided by the controller when loading the pointer RAM data. The flag signal may be sent to the adder and the multiplexer. When a flag signal enable is provided to the adder 116 and multiplexer 118, the contents of the in-data register 114 are stored directly in the designated "in" crosspoint memory location 122a. If the flag signal enable is absent, the contents of the designated crosspoint memory location 122a are added to the contents of in-data register 114 and multiplexer 118 takes and stores the summed result in the designated crosspoint memory location 122a.

During the transmit time slot for the switch port, a procedure similar to that described above takes place. In this time slot, however, the pointer address register 136b is loaded with the local channel number and the switch port number provided by sequencer 139. The address of the crosspoint memory location is then sent to out-address pointer register 130 which points to designated "out" cross-point memory location 122b. The contents of designated crosspoint memory location 122b is sent to out data register 124. The contents of the out data register may be sent to controller 140 or may be directly loaded in the switch port director 126. The switch port director 126 now has the appropriate data which is transmitted to channel information register 174 and finally to outgoing communications link 172.

The information in pointer RAM 134 is loaded via controller 140. The switch element processors are responsible for allocating the appropriate crosspoint memory locations for each switch port and channel number. This information is fed into the pointer RAM 134 from the controller. As described above, the information on any channel of any incoming switch port can be switched to any other channel of an outgoing switch port in the switch element.

The adder 116 and the in address pointer registers 128 allow a flexible many-to-one operation wherein many incoming channels can be added together. The sum may be stored in the crosspoint memory location for a designated outgoing channel. As will be explained in more detail, this flexibility allows for duplex and conferencing features. For example, if a line and a trader key telephone station are connected as a duplex path, or if a number of trader key telephone station users wish to talk to each other, the contents of each channel corresponding to each line or user is merely added to the contents of the other channels. Accordingly, if the incoming channel is part of a duplex path or a conference call, the channel data is added to the existing contents of the crosspoint memory location using the adder 116.

Similarly, the out-address pointer register 130 allows for one-to-many operation. The out-address pointer register may point to the same crosspoint memory location for different outgoing channels on different switch ports. Data in an outgoing channel is fetched from the crosspoint memory location and stored in the channel transmitter for transmission during the next channel time. If the crosspoint memory location read is a part of a conference call, the memory location is reset to a zero value.

Figure 3B:
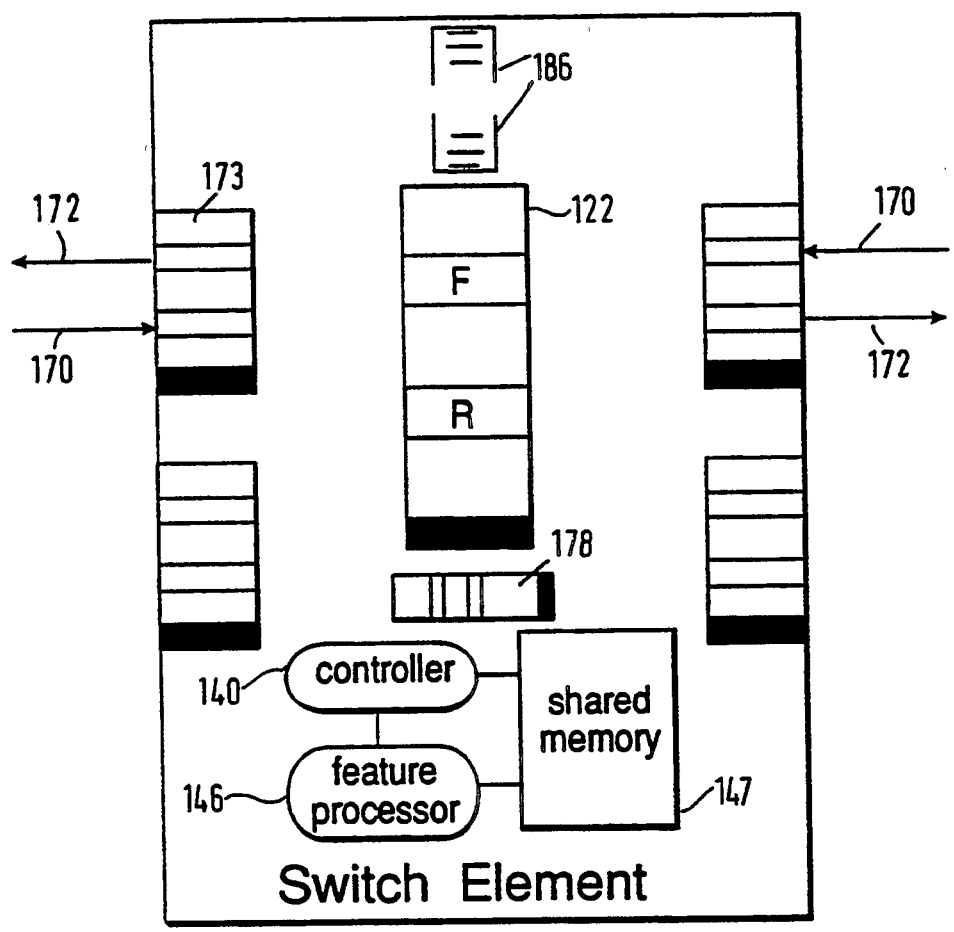

FIG. 3b is a conceptual diagram of the switch element described in FIG. 3a. For the purpose of clarity the switch element illustrated in FIG. 3b will be used hereinafter instead of the switch element illustrated in FIG. 3a, as concepts may be more easily visualized with a simplified figure. Each pair of channel receivers 100 and channel transmitters 102 of FIG. 3a is shown as one switch port 173 including incoming link 170 and outgoing link 172. Feature processor section 146 of FIG. 3a is also shown to be connected to controller 140 each utilizing the shared memory space 147. Shared memory 147 in FIG. 3b represents feature processor RAM 168 and controller RAM 166 of FIG. 3a. Link data ports 148a and 148b of FIG. 3a are shown as one link data port 148 in FIG. 3b. Crosspoint memory 122 of FIG. 3a is also shown in FIG. 3b with one memory location identified as "F" for forward crosspoint memory location and another memory location identified as "R" for reverse crosspoint memory location as will be described in more detail hereinafter. Broadcast FIFO buffers 186 are also shown in FIG. 3b which are part of the FIFO buffer section 144 of FIG. 3a. Broadcast FIFO buffers, as it will be further described, are utilized when receiving and transmitting status broadcast messages from one switch element to the other. Additional elements that are relevant may be added to the switch element of FIG. 3b to provide a clear conceptual understanding.

As previously mentioned, each of reflection switches, section switches, and access switches in the switching network are the same as the switch element described in FIG. 3a and FIG. 3b.

Figure 3C:
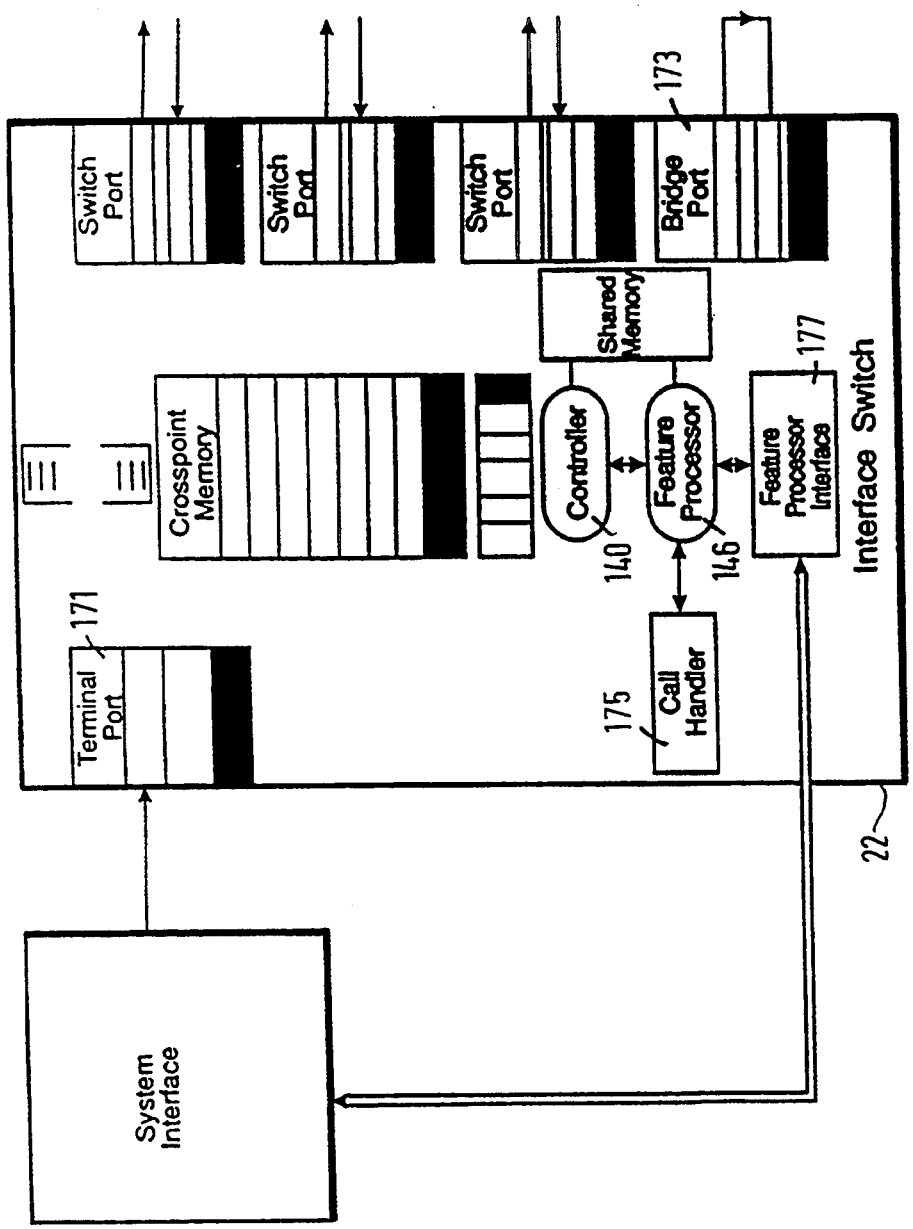
FIG. 3c illustrates the layout of an interface switch of FIG. 1.

FIG. 3c illustrates the layout of an interface switch stage 22 of FIG. 1. The interface switch is a scaled-down version of the switch element as described before, and is connected to various terminal equipment and line cards to provide them access to the switching network. The interface switch 22 includes a terminal port and four switch ports each having a channel transmitter and a channel receiver. In order to simplify the drawing, the switch element is illustrated only with relevant components.

Terminal port 171 provides access to the key station or line card via a communications link. In each interface switch, one switch port is allocated as a bridge port 173. A bridge port is similar to any other switch port except that the channel receiver of the bridge port is connected to the channel transmitter as shown in FIG. 3c. Therefore, the contents read from the crosspoint memory location associated with the bridge port is sent back into the interface switch and stored in its appropriate crosspoint memory location.

The feature processor 146 in the interface switch performs additional functions that are not performed by other switch elements in the switching network. The functions performed by the feature processor include call handling by a call handler software 175; downloading the configuration tables from the system center; and running diagnostics at boot up, upon reset, and on a continuing basis. In addition, the feature processors in the interface switches that are connected to key stations receive and analyze the line key actuation messages directly from the key station. The line key actuation messages may include setting a path to a line or to another key station, clearing or releasing a line on a key station, setting a conference call with other lines and key stations, setting a private communication path between a key station and a line or another key station and many other features depending on the user's needs and requirements. The feature processor in the interface switches that are connected to key stations also assemble and transmit line status information for each of the key stations connected to the interface switch.

For interface switches connected to line cards, the feature processor acquires and broadcasts line status at appropriate times via the switch ports to the switching network. The feature processor also provides call handling for the voice channels coupled to the line card. Either a simplex or a duplex path may be set between one originating switch port to a terminating switch port. Between these two ports there may exist several tandem connections to other switch ports. In a duplex communication, the switch elements of the originating and the terminating switch port set a path toward the same destination, i.e., a bridge port in an interface card. In a duplex communication the first half of a duplex path from the originating switch port and from the destination switch port towards a destination bridge port is referred to as a forward leg in each switch element. It is possible to have a plurality of duplex paths, for example, in a call conference set-up where all the interface switches involved set a path towards the same destination bridge port.

Figure 3D:
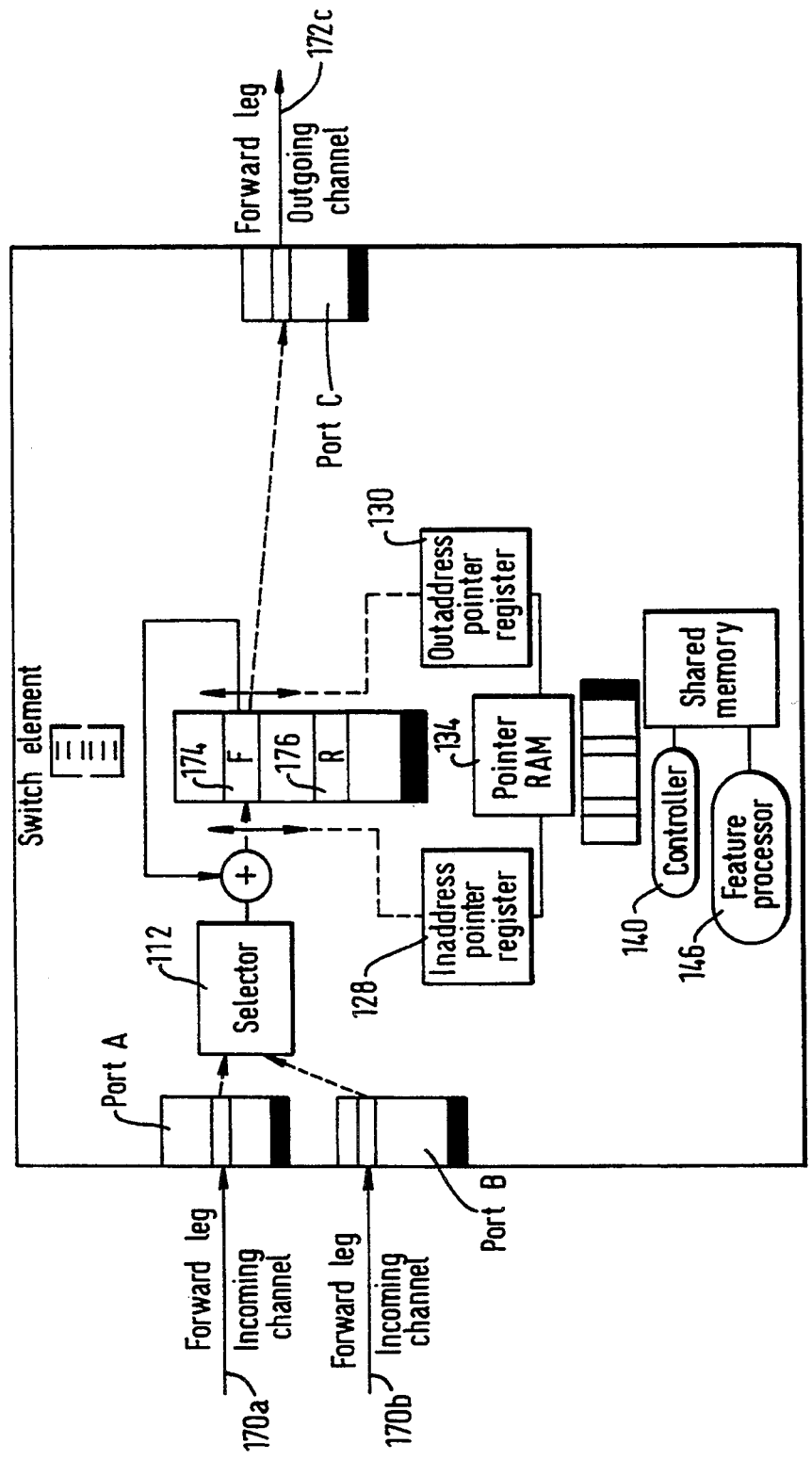
FIGS. 3d and 3e illustrate of a switch element employed in a conference or a duplex path.
Figure 3E:
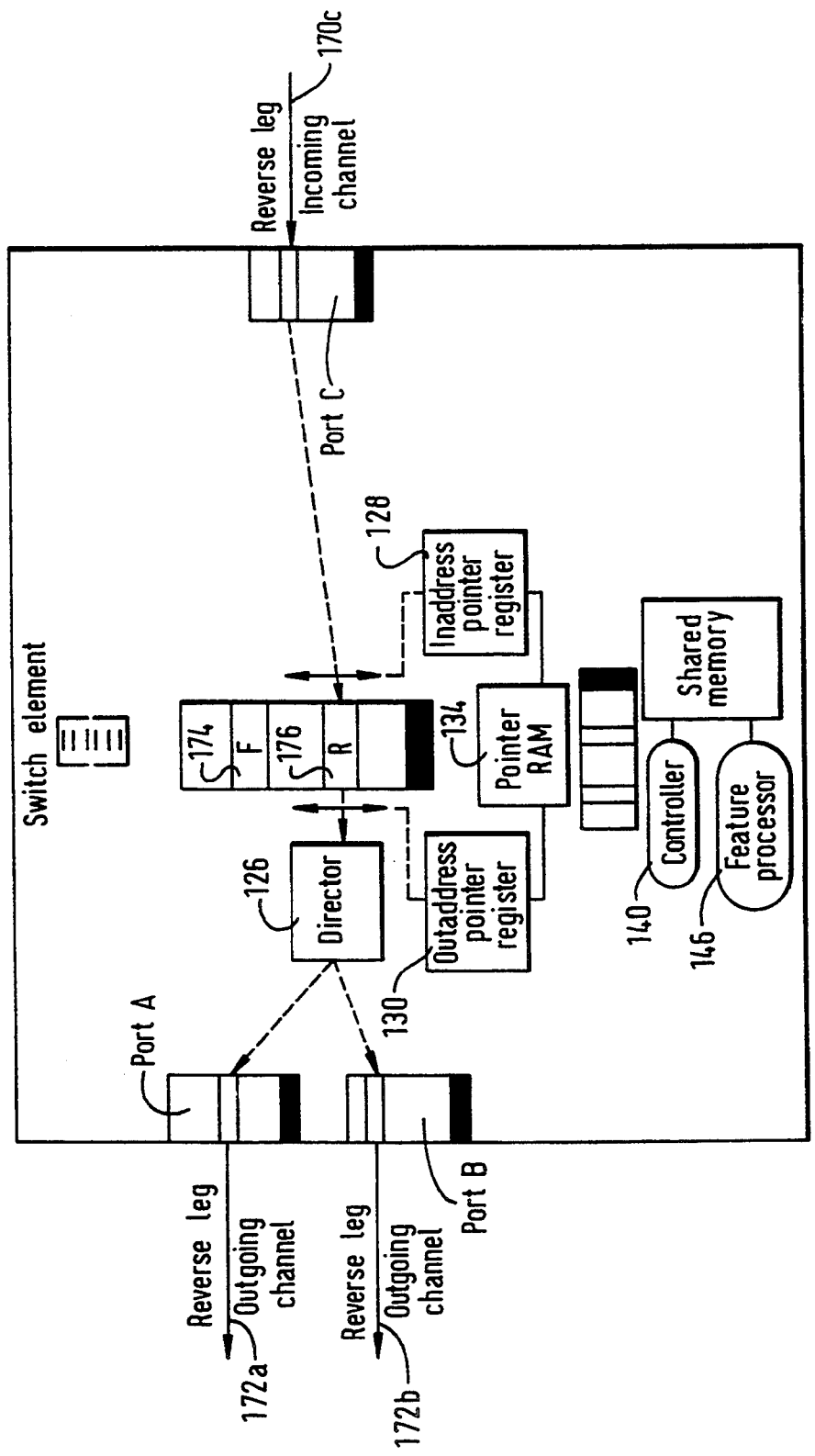

FIGS. 3d–3e illustrate an example of a switch element 99, employed in a call conference path. In FIG. 3d, switch port A receives a channel, the contents of which is addressed to a destination bridge port via a channel of switch port C of switch element 99. Switch port B also receives a channel, the contents of which is also addressed to the same destination bridge port via a channel of switch port C. In a call conference with multiple parties involved, other ports in the switch element may also receive channels, contents of which are addressed to the same destination bridge port via switch port C of the switch element. At the switch element where two or more paths to the same destination bridge port intersect, the two's complement sum of the incoming channel information for both channels is provided by adder 116 and is stored in a forward crosspoint memory location 174 identified as "F" and passed along to the destination via switch port C.

The second half of the duplex path which originates from the bridge port and provides the distribution of the summed forward legs to all interface switches involved in a call is referred to as the reverse leg. FIG. 3e illustrates the switch element 99, employed in the reverse leg of the conference call. Switch port C receives a channel from the bridge port. The contents of the channel is a sum of all the channel words in the conference call, and is stored in a reverse crosspoint memory location 176 identified as "R". The contents of the reverse crosspoint memory location is addressed to the originating and destination interface switches via channels of switch ports A and B.

Accordingly, the forward crosspoint memory location "F" is associated with the forward leg of a path and the reverse crosspoint memory location "R" is associated with the reverse leg of a path.

Each incoming channel word of switch port 170a and 170b of FIG. 3d and 170c of FIG. 3e has an address of a crosspoint memory location in the Pointer RAM 134 associated with it. On the forward leg of a duplex voice path, the switch element 99 will add the incoming channel word to the existing contents of forward crosspoint memory 174 by adder 116 and update. The in-address pointer register 128 allows for many-to-one operation by providing the same crosspoint memory location for all data routed to the same destination. Therefore the data contained in many incoming channels with the same destination can be added and stored in the same forward crosspoint memory location 174. On the forward leg of a duplex path, the forward crosspoint memory location 174 is read and its contents are provided to the outgoing channel. Thereafter, the content of the crosspoint memory location 174 is cleared.

On the reverse leg of a duplex path, the switch element 99 will write the incoming channel word into the reverse crosspoint memory location 176. Each outgoing channel word 172a and 172b of FIG. 3e and 172c of FIG. 3d similarly has an address of a crosspoint memory location in the pointer RAM 134 associated with it. The out-address pointer register 130 allows for one-to-many operation by pointing to the same reverse memory location 176. Therefore the contents of the reverse memory location 176 is available to many outgoing channels corresponding to the conference path. On the reverse leg of a duplex path, the outgoing channel word from the reverse crosspoint memory location is read and is provided to the outgoing channels.

G. Controller & Feature Processor

A switch element might receive at the same time various command codes and their corresponding arguments from the communication links connected to its switch ports. The rate of incoming commands can be faster than the controller's processing time. Therefore each switch element has a First In First Out (FIFO) buffer section to receive the incoming commands and provide the necessary information to the controller on a first in first out basis. The incoming commands and their corresponding arguments are provided to the FIFO buffer section 144 via command decoder 142 of FIG. 3a. At appropriate time the information stored in the FIFO buffers are read by the controller 140 via controller bus 150 in FIG. 3a.

FIG. 4 is a schematic diagram of the FIFO buffer section 144. The FIFO buffer section 144 contains four FIFO buffers: path set FIFO buffer 180; path clear FIFO buffer 182; channel monitor FIFO buffer 184; and broadcast FIFO buffer 186. The crosspoint memory locations and the switch ports are accessed by the controller 140 of FIG. 3a through the four FIFO buffers.

The path set FIFO buffer 180 presents path set commands from incoming channels for the controller to process. The FIFO contents corresponding to each path set command is forty bits wide. During the read function the path set FIFO buffer provides the controller with the port and channel number in ten bits, the local channel time in six bits, the command code in eight bits and the argument for that command in sixteen bits. The argument for the path set command is the destination logical address code (LAC). Therefore, an incoming path set command on a communications link is detected by a switch port and placed in the path set FIFO 180. At some moment later, the controller will read the FIFO as explained above, and use the logical address code to index into the destination port store 164 in FIG. 3a. The destination port store then provides the outgoing port or group of ports to use.

FIFO buffer 182 is used to store path clear and not acknowledged (NAK) commands. The FIFO buffer 182 is read similar to the path set FIFO except that its contents are 34 bits. During the read function, the FIFO 182 provides the controller with the port and channel number in 10 bits, the command code in eight bits and its corresponding argument in sixteen bits. The argument for a path clear command is the destination logical address code (LAC), and the argument for a NAK command is the channel number and the type of the command.

FIFO buffer 184 is used to present alarms, error conditions and warning commands to the controller 140. One bit in the pointer RAM 134 data is used to enable or disable the channel monitor FIFO buffer on a switch port and channel basis. The FIFO buffer 184 contains thirty-four bits. During the read function, FIFO buffer 184 provides the controller with the port and channel number in ten bits, a command code in eight bits and its corresponding argument in sixteen bits.

As it will be explained in more detail hereinafter, status broadcast FIFO's 186 are utilized for storing and forwarding broadcast messages.

Figure 5:
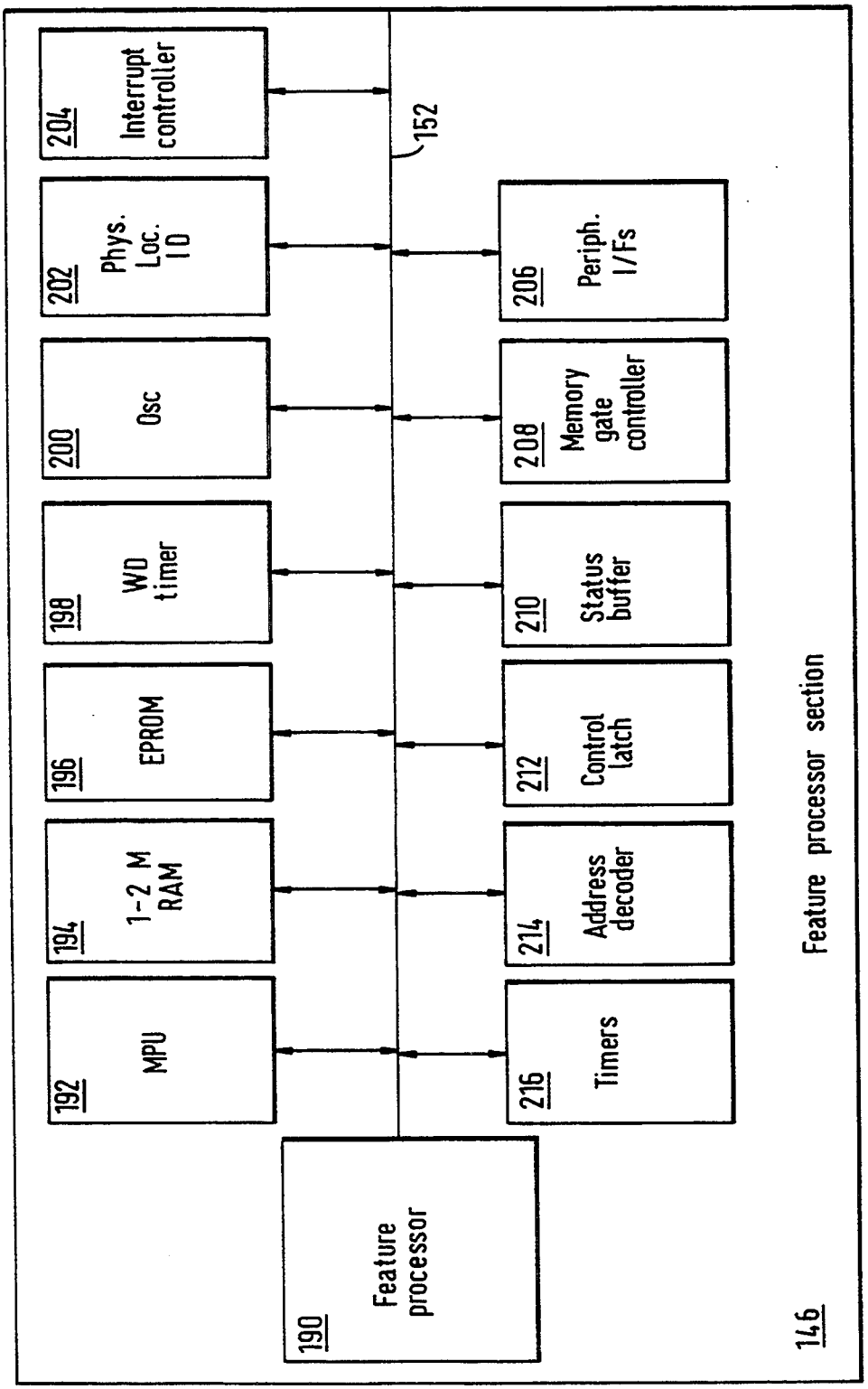

FIG. 5 is a functional block diagram of feature processor section 146 of FIG. 3a. The feature processor is a common processor design for all the switch elements in the switching network. This permits one design to be used in all the switch elements, thereby simplifying each switch element design and providing a common building block for future designs.

The feature processor 190 is a SPARC processor. The feature processor bus 152 contains an address bus which is a 24-bit subset of the feature processor 32 address bits. The feature processor bus 152 also includes an external data bus which is thirty two bits wide.

The basic support circuitry includes a memory protection unit (MPU) 192, RAM 194, boot EPROM 196 which is a 512K byte memory, watch dog (WD) timer 198, oscillator 200, physical location I.D. 202, interrupt controller 204, peripheral interface 206, memory gate controller 208, status buffer 210, control latch 212, address decoder 214 and timers 216.

Code and data tables are downloaded from the system center 15 hard disks to the RAM 194. The RAM is static for the high speed memory requirements and for battery backup use. The boot EPROM 196 contains the bootstrap and self test code. Each switch element is able to determine its own switch element type and its physical position within the system by reading a 14-bit register in the physical location ID section 202 provided from the backplane via a dedicated I/O port in the physical location I.D. section. Memory protection Unit (MPU) 192 controls the right of access to different sections of the RAM 194 for the software entities running in the feature processor. Memory gate controller 208 controls the memory gate 154 in FIG. 3a, which allows the controller 140 or the feature processor section 146 to have access to each other's environment at specific times. Peripheral interface section 206 allows terminal equipment and line cards to have direct access to feature processor section 146 of the interface switches.

Figure 6:
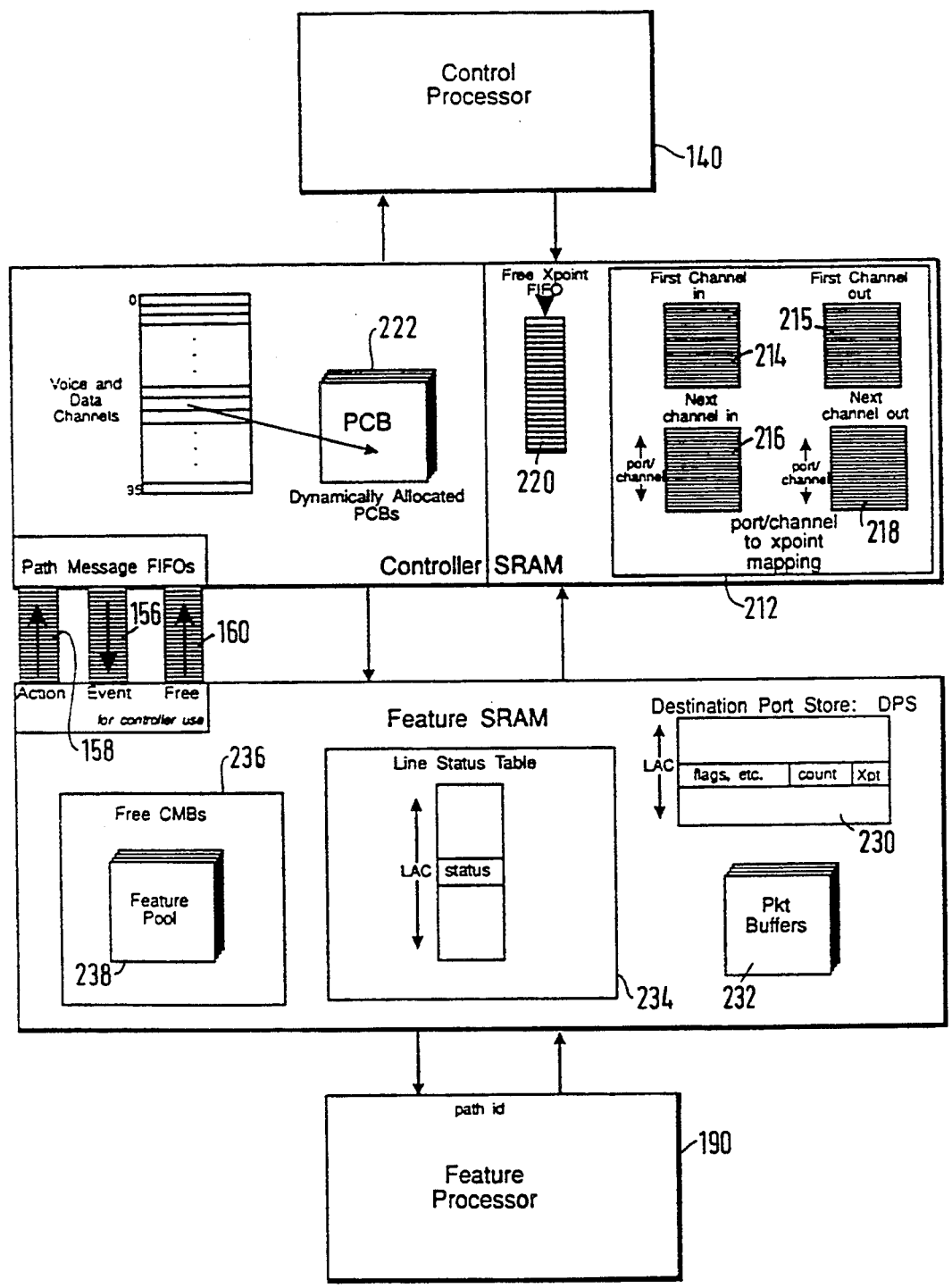
FIG. 6 illustrates the controller and feature processing memory

FIG. 6 illustrates the controller and Feature processor memory map. The controller RAM 166 which is a high speed RAM contains a switch port and channel to crosspoint mapping tables 212. The mapping tables include a crosspoint first channel-in lookup table 214, crosspoint first channel-out lookup table 215 both indexed by crosspoint number, a next channel in link list table 216 indexed by port and channel, and a next channel out link list table 218 which is also indexed by port and channel. The controller RAM also contains a free crosspoint FIFO buffer 220. The controller RAM additionally contains Path Control Buffers (PCBs) 222 corresponding to each active voice and data channel. The PCB is a block of memory allocated at each end of a path that is used for real time status monitoring and management of the path. The Controller RAM 166 is interfaced with Feature Processor RAM 194 via memory gate 154.

Referring to FIG. 6, the controller has a copy of the incoming channel information address in a local controller in-address register which also contains 5 bits for the Return Channel Number and 8 bits for Packet Control Buffer Index number. Therefore, the contents of the incoming channel information address in the controller in-address register has the following format:

| Controller In-address Register | |
|---|---|
| Crosspoint memory location address | 10 bits |
| Conference leg flag | 1 bit |
| Busy flag (Channel Monitor Enable) | 1 bit |
| Return channel # | 5 bits |
| Packet control buffer index # | 8 bits |
| Idle Count | 5 bits |

The packet control buffer index number allows any event on any switch port and channel to be associated with a packet control buffer if one exists. For switching network switch elements this field will be left blank. The controller RAM 166 will also contain a copy of the crosspoint memory location address of the outgoing channel word and the logical address code for the ultimate path destination in a local controller out address register. Therefore the contents of the controller out-address register in the controller RAM has the following format:

| Controller Out-address Register | |
|---|---|
| Crosspoint memory location address | 10 bits |
| Conference leg flag | 1 bit |

| Controller Out-address Register | |
|---|---|
| Busy flag | 1 bit |
| Destination logical address code # | 16 bits |

As illustrated in FIG. 6 the Feature Processor RAM contains destination port store 230, line status table 234, call message buffers 236, and call message FIFO buffers which include event FIFO buffer 156, action FIFO 158, free FIFO 160, and packet buffers 232. A call message buffer (CMB) 238 is used by the feature processor and it has an identical data structure as the path control buffer 222. Call message FIFO's 156, 158 and 160 are path message FIFO buffers for sending "event" information to the feature processor and action commands information from the feature processor. Therefore, the call message FIFO buffers allow interaction between the feature processor and the controller in each switch element.

The destination port store 230 (DPS) is a memory table indexed by logical address codes for selecting an outgoing switch port or switch port group. Therefore, when each switch element receives a command code to set up a path to a destination logical address code (LAC), the destination port store provides the switch port or the group of switch ports available that can direct incoming channel data towards that destination LAC. The outgoing switch port or the group of switch ports associated with a LAC is set at system initialization or dynamically thereafter when there is a physical reconfiguration in the system. Once the outgoing switch port or group of switch ports is provided, the switch element directs that switch port information to channel allocation system (CAS) 162 of FIG. 3a to select an optimum port and channel in the selected switch port. The resulting switch port and channel is then stored in the destination port store table 230 as the selected outgoing switch port and channel. The destination port store 230 stores the forward crosspoint memory location address. The reverse crosspoint memory location address is found via a mate table which can be indexed by the corresponding forward crosspoint memory location address. Similarly, a forward crosspoint memory location address can be found via the corresponding reverse crosspoint memory location address. The format of the destination port store is therefore as follows:

| Destination Port Store | |
|---|---|
| Outport/group | 5 bits |
| Crosspoint memory location address | 10 bits |
| Count | 5 bits |
| L | 1 bit |
| Out going port selected | 5 bits |
| Out going channel selected | 5 bits |

Where outport/group is the switch port or group of switch ports selected that may route the claimed data to its desired destination. The Count entry stores the number of connections on the switch element which are part of a particular path. L (local bit) is set if the destination LAC is local to the switch element.

If on a path set command, contained in incoming channel information, examination of the destination port store shows no existing path to the destination logical address code, an available crosspoint memory location address for the incoming channel word is read from the free FIFO. If however, examination of the destination port store shows a path already existing, the count entry is not zero and the corresponding crosspoint memory location address in the Destination Port Store 230 (DPS) would be used.

In a simplex path, the entry for the crosspoint memory location address in the destination port store is used to store the address of forward crosspoint memory location. In a duplex path, the entry for the crosspoint memory location address in the destination path store would also store the address of forward crosspoint memory location, to be used for the forward leg. Thereafter, the address of the reverse crosspoint memory location for a duplex path is found by examination of the controller mate table.

The count field can be thought of as the number of connections on a switch element in a particular path. It is incremented four times when the path is first set. Once for the incoming channel of the forward leg. Once for the outgoing channel in the forward leg, once for the incoming channel of a reverse leg, and once for the outgoing channel in a reverse leg. Subsequent path sets for the same logical address code number entering the switch element will increment the count by two, once for the incoming forward channel and once for the outgoing reverse channel.

The L bit in the destination port store (DPS) in each switch element indicates whether the switch port corresponding to the destination logical address code is in the same switch element. For a data path when the L bit is set the destination is assumed to be the link data port (LDP) for that switch element.

When a group of ports are available for a corresponding logical address code, the switch element assures that the traffic load among the available ports is equally distributed. The switch port or group of switch ports provided by the Destination Port Store, are used to access the channel allocation system 162 of FIG. 5a along with the last switch port parameter to locate the next available free channel. If more than one switch port in the switch port group have the same shortest channel time, the "last switch port" information is used to make the choice. By looking at the "last switch port" entry the CAS selects the next available switch port in the group. The "last switch port" table entry is updated each time a channel is allocated from a switch port group.

Figure 7A:
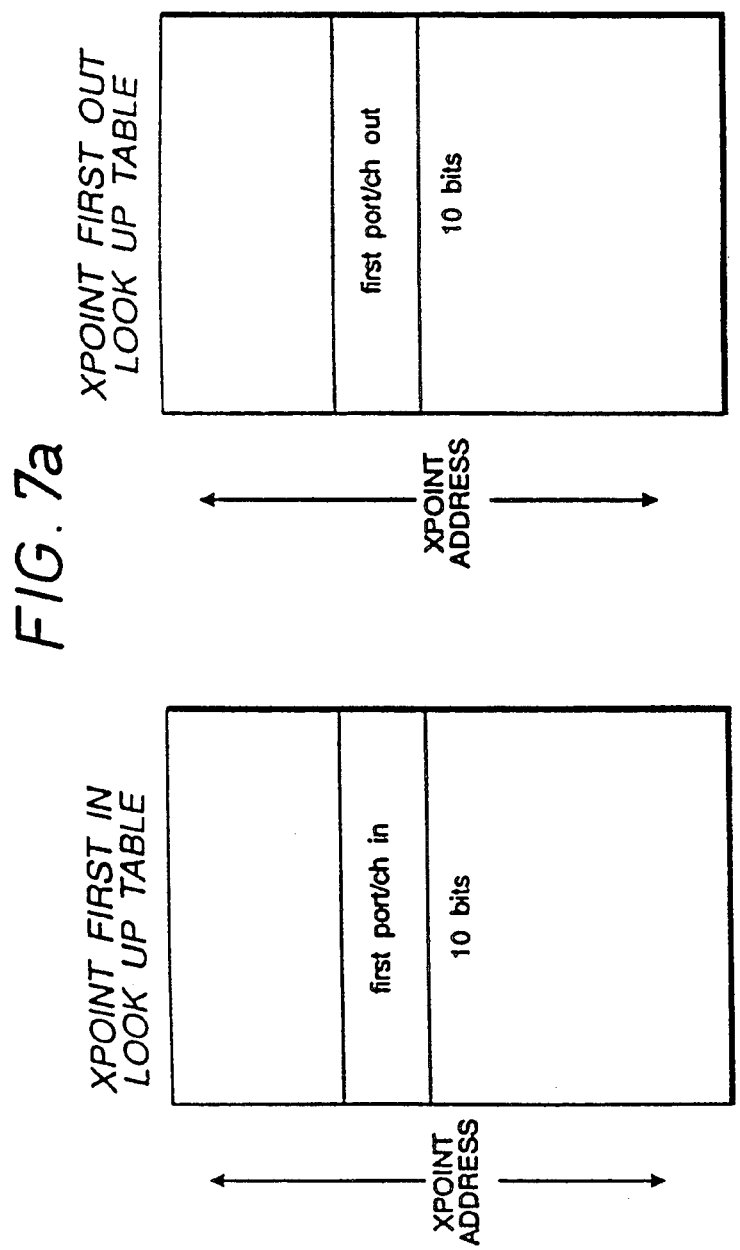
FIG. 7a illustrates crosspoint first channel in/out lookup tables.
Figure 7B:
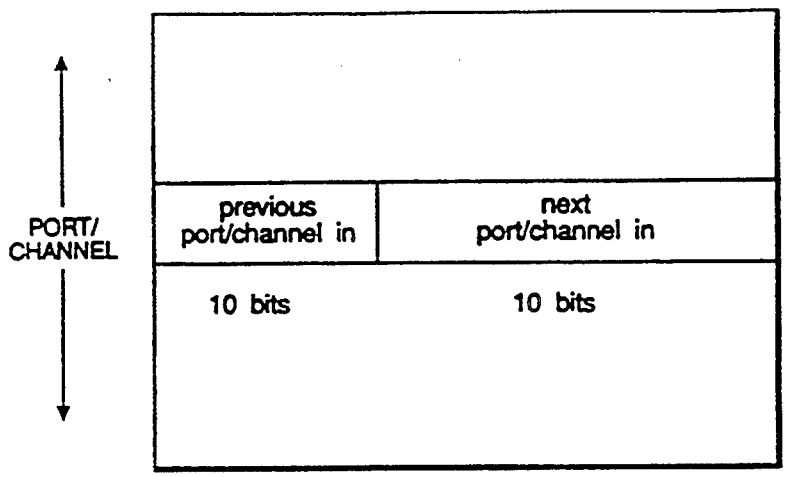
FIG. 7b illustrates a next channel in link list table.
Figure 7C:
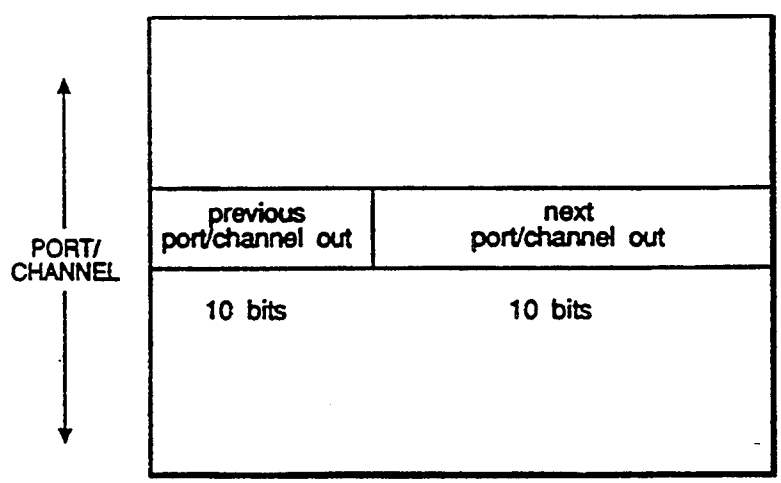
FIG. 7c illustrates a next channel out link list table.

FIGS. 7a-7c illustrate crosspoint first channel in lookup table 214, crosspoint first channel out lookup table 215, next channel in link list table 216, and next channel out link list table 218 of FIG. 6. It is necessary at times to locate all parties involved in a call with only a switch port and channel or crosspoint memory location address. Tables 214, 215, 216 and 218 can provide this information. FIG. 7a illustrates the crosspoint first channel in/out lookup tables 214 and 215 in more detail. By indexing into each of the tables by a crosspoint memory location address, the first switch port and channel assigned to write into and read from the crosspoint memory location can be found. For a forward crosspoint memory location, there is only one outgoing channel reading from the crosspoint memory location. For a reverse crosspoint memory location, there is only one switch port and channel writing into the reverse crosspoint memory location. The layout of the entries in the crosspoint first in/out lookup table are shown below:

| Crosspoint IN/OUT | |
|---|---|
| First switch port and channel in | 10 bits |
| First switch port and channel out | 10 bits |

FIG. 7b illustrates next channel in link list table 216 and FIG. 7c illustrates the next channel out link list table 218. It may be appreciated that there can be multiple switch ports and channels writing into a forward crosspoint memory location. When writing into a forward crosspoint memory location, the contents of each channel is added to the previous contents of the forward crosspoint memory location and the sum is stored. Similarly there can be multiple ports and channels reading from a reverse crosspoint memory location. To find all participants in a path, fixed length tables 216 and 218 contain a number of linked lists, one for incoming channels and one for outgoing channels. The first switch port and channel to write into a crosspoint memory location can be found by using the crosspoint first channel in/out lookup table 214 and 215 as indicated before. The first port and channel is used to index into the next channel in link list table 216 to obtain the next port and channel writing into the same forward crosspoint memory location. If the index switch port and channel 240 is the only channel writing into the crosspoint memory location, or if the index switch port and channel 240 are last port and channel, then the contents of the next channel in the link list table location will be NULL.

When a switch port and a channel are added to a path, it must be added to the end of the link lists. When a switch port or channel is removed from the path then the linked list must be compressed. The layout of the entries in the in/out link list tables are as follows:

| Next Channel In Linked List Table | |
|---|---|
| Previous switch port and channel in | 10 bits |
| Next switch port and channel in | 10 bits |
| Next Channel Out Linked List Table | |
| Previous switch port and channel out | 10 bits |
| Next switch port and channel out | 10 bits |

It may be appreciated that, in addition to the elements of the switching network, protocol layers are necessary to make routing decisions, test the components, respond to error conditions and communicate with other protocol layers. Within the Controller two software layers exist and are identified as switching path protocol (SPP) and switching connection protocol (SCP). The switching path protocol is responsible for end-to-end path management. It interfaces with the feature processor section 146, the link data ports 148 of FIG. 3a and the switching connection protocol (SCP). SCP is responsible for the stage by stage connections across the network. The SCP interfaces with the switching path protocol (SPP) in the controller 140. The switching path protocol communicates with the feature processor section via the message FIFO buffers 156, 158 and 160 illustrated in FIGS. 3a and 6.

FIG. 8 illustrates a block diagram of a packet control buffer (PCB) with corresponding (PCB) entries. Since the switching path protocol may simultaneously manage many active channels, each channel using the same controller processor and software as a common resource, some means must be provided to recall the state of each active channel when the time comes to service the channel using this common resource. This state information of each active channel is maintained by path control buffers (PCBs).

There are ninety-six available path control buffers. They are dynamically assigned to either a terminal port, a bridge port, or a link data port (LDP). At initialization they are all placed in a double linked list identified as a "Free" list. They are moved from the beginning of the free list to the end of the "Transient" list during the setting up of a path. Once the path is established and tested via confirm commands, the path control buffer allocated to a path is placed in a "talk" list for a voice path and a "link data port (LDP)" list for a data path.

During the termination of the path, the path control buffer is moved back to the transient list and once the path clear function is complete, the path control buffer is returned to the end of the "free" list.

As illustrated in FIG. 6, the path control buffer 222 is used by the controller to manage the real time details of each active call and path throughout its life, and to provide a record which may be used to trace its history, particularly for problem tracing. The call message buffer 238 (CMB) is used by the feature processor section to pass "Action" requests to the switching path protocol via the "Action" FIFO buffer 158 and by the switching path protocol to pass the current state of a path control buffer (PCB) to the feature processor by means of the "Event" FIFO 156. The "event" communication message buffers (CMBs) have event specific structures with a common element. A CMB is a subset of a path control buffer. For a path set, a communication message buffer is the means for the feature processor to provide to the switching path protocol the desired parameters of the path to be created. For originating and terminating paths, a path control buffer is used by the controller to record the path parameters and real time status. For data calls, a path control buffer is used to manage the transfer of the data to and from the required data buffers in memory. PCBs are shared by both the switching path protocol and switching connect protocol.

Each incoming/outgoing channel pair in a link data port will be driven by a state machine also (implemented by the controller's switching path protocol (SPP) software) responding to network commands and feature processor commands. This allows the controller to handle the path until there is a successful conclusion, or there is a natural break or an error condition. It allows the switching path protocol to handle an incoming path set autonomously, until it needs to alert the feature processor when it has reached a certain stage.

Throughout the lifetime of each call the channel monitor FIFO 184 (FIG. 4) in the interface switch remains connected, and maintains a complete record of the connection details in a packet control buffer which is managed by the SPP. The information in the packet control buffer is shared by both the switching path protocol and switching control protocol. Whenever a stage is reached where call processing needs to make a decision, a copy of the present state of the call and its data is placed in a call message buffer (CMB) and a pointer to the CMB is placed in the Event Message FIFO buffer.

Path control buffers contain many fields for providing pertinent data and each field entry may be used during an active call. If the call message buffer 238 passes information to the feature processor from the switching path protocol (SPP), the information is the "event" type and the incoming command and argument. However, if a call message buffer passes information to the switching path protocol from the feature processor, the information in this word is the path control code which indicates the desired "action" to be performed. The control code will determine the structure of the command specific portion of the communication message buffer (CMB).

A packet control buffer corresponding to a path contains an entry representing its packet control buffer (PCB) number which is from 0 to 95. This allows the controller to correlate its packet control buffer with the feature processor path ID. The PCB number is provided by the controller. Any subsequent events to the controller pertaining to this path include the controller ID which is the PCB number.

State/Path status entry contains the state of the data or terminal port channel pair state machine and some pertinent status bits.

When an active link data port channel is processed, the switching path protocol will execute a state machine for that link data port and channel with the state being provided by the state entry in the Pocket Control Buffer. The switching path protocol (SPP) is responsible for the contents of the state entry. When the SPP passes a signal to the feature processor, the feature processor examines the command entry and the status bits to determine the cause of the event.

FIFO buffer 156 is polled by the feature processor at some regular rate determined by a scheduler. Path status information is as follows:

| Path Status | |
|---|---|
| Path set attempt overflow (E) | Path clear (E) |
| Packet sent (E) | Path fail (E) |
| ACK (E) | Packet received (E) |
| NAK (E) | Packet transmit fail (E) |
| Speech path complete (E) | |

Another entry in the packet control buffer contains information on local logical address code (LAC) and distant logical address code. The local LAC is the originating LAC when setting a path or the destination LAC when terminating a path. The distant LAC is the destination LAC used when originating a path set or the originating LAC when terminating a path.

Depending on system requirements, some terminal ports of interface switches may serve as tape recorders for recording speech. An entry for containing information on tape port and channels in the packet control buffer is used for tape path sets (which are held until a configuration change is made). It contains the port and channel numbers that need to be joined to a voice path (from a tape card served by the interface switch) to make a connection to a tape channel.

A further entry in the packet control buffer contains information on path and call message buffer identity. The path identity number is used by the feature processor to identify the path for commands, and the call message buffer pointer in feature processor RAM for freeing up obsolete call message buffers for new actions.

The feature processor is responsible for allocating path IDs. When the feature processor initiates a path set, the path identity entry indicates that information. When the switching path protocol passes an event signal to the feature processor for a new path (speech path complete, for example) the path identity will be blank.

The feature processor will assign a path ID and include it in the next command back to the switching path protocol.

The feature processor identifies which path a call message buffer is associated with by the path ID. The switching path protocol identifies the path by the controller ID entry in the communication message buffer (CMB). The controller ID is the path control buffer number assigned to a particular path.

When the switching path protocol passes an event signal to the feature processor, the call message buffer identity tells the feature processor which call message buffer (CMB) can be free. The feature processor is responsible for managing the CMB resource allocation and then clears the CMB and places the pointer for the CMB into the free pool.

The join parameters entry in the packet control buffer contains the port and channel pair for a joining. The act of associating a terminal port, a bridge port, or a tape port and channel to a crosspoint memory location is a joining. If the path set command from the Communication Handler is not an automatic join, the contents of the join parameters entry are interpreted as the port-channels used to connect to forward or reverse crosspoint memory locations. If however the path set is not automatic join, the communication handler will have to do a separate join of the switch port and channels. The switch port and channel pair is set by the feature processor. The join information contains three bits. One bit for originating and terminating, one bit for forward and reverse and one bit for active and inactive.

The attempt count and delay information entry is the number of attempts the switching path protocol has made when setting up a path. Delay is a general purpose timer. The use of the timer is dependent upon the state. The granularity of this timer is 125 µs or one frame. This entry is set and used by the switching path protocol only. A typical use of this timer would be setting the timer to 8 after sending a confirm command. The state would be "confirm pending". If the timer times out before the confirm is returned, the switching path protocol would launch another confirm command via a link data port. Once the confirm is received, the contents of the delay is 8 minus the current entry. This is the frame delay of the confirm command and is needed by the processors in each interface card for echo cancellation.

Confirms are launched into the switching network via a link data port channel. This allows the controller to accurately determine when the confirm command was sent into the switching network and when it was received back from a round trip. The packet control buffer has a entry to keep track of the link data port containing the confirm command.

The parameters that are used for measuring the confirm round trip delay in a port each have an entry in the packet control buffer corresponding to the path. These parameters are: start of time for confirm sent; end of time for confirm sent; incoming reverse port that confirm is received; and incoming reverse channel time which is the local channel time that the incoming reverse channel for a voice path is processed.

During the operation of the switching network, path information is sent throughout the system via data path set. The packet type entry (data paths only) in the packet control buffer contains the information in the argument portion of a "PACKET TYPE" command. Since many data packets are transmitted via the switching network, various packet types have to be differentiated. The relevant packet type information is written into this entry by the switching path protocol upon reception of a "packet type" command or loaded by the feature processor when passing a "send packet" action to the switching path protocol.

The packet buffer control entry contains information for data paths only. This entry contains the pointer to the packet buffer control block.

The packet start entry contains the base pointer for the current "transmit" or "receive" packet corresponding to a switch element sending or receiving a packet. This entry is set by the feature processor when transmitting a packet and set by the switching path protocol (SPP) when receiving a packet. The receiving SPP fills the entry from a list of available packet buffers. There are several link lists of packet buffers corresponding to each packet buffer size. The SPP gets an appropriate packet buffer from the link list. Thereafter, the list is replenished by the feature processor.

The packet limit entry contains information for data paths only. On transmit, it contains the actual size of the packet and is set by the feature processor. For receive, this is a value which defines the size of the current packet. The maximum size of the packet is already defined by the packet type command. When "next word =packet limit", the packet has been sent and the next channel must contain the "end of packet command" and a checksum. The checksum can occur before this (evident by the reception of the end of packet command) if the packet length is less than the Packet Limit.

The original word/next word entry in the packet control buffer contains information for data paths only. The original word is the starting offset from the base address which indicates the beginning of a transmit or receive buffer when transmitting or receiving data. This allows the starting offset to be copied to the "next word" when a packet error occurs. This eliminates the need to keep the pointer to the packet buffer control block.

The next word is the index offset from Packet Start to the current entry of the packet buffer. During transmit, this entry points to the next packet entry to be transmitted from the packet buffer. During receive, this entry points to the destination in the packet buffer of the next data received on the data channel. When a complete packet is received, the feature processor can use this entry to determine the length of the packet.

The checksum for data paths entry contains the checksum of the current packet being sent. It is calculated and transmitted at the end of the packet as the argument of a Checksum command by the originating switching path protocol when transmitting a packet and is calculated and compared to the received checksum command argument by the destination switching path protocol when receiving a packet. This value is calculated by adding the data to the previous checksum entry. The updated checksum is then stored in the original location. When starting to send or receive a packet, this entry is set to zero. This checksum will be the sum of the arguments for data command codes and packet type.

The crosspoint information entry is used to store both the address of forward and reverse crosspoint memory locations. This information is necessary for doing joins as well as for orderly clear down in the event of negative acknowledges (NAKs) or forced release.

Communication between the protocol layers is accomplished through the call message FIFO buffers. The data relating to each path and call in progress is held in a separate path control buffer in the controller RAM. A similar structure is held for each path/call, either in progress or planned, in the feature processor RAM. The data relating to path "actions" requested by the feature processor, or "events" returned by a switching path protocol monitored channel to the feature processor, are passed between them using call message FIFO buffers in feature processor RAM which are accessible by both the switching path protocol (controller) and the feature processor section. The Communication Handler is responsible for the management of the call message buffers (CMBs). Access to these CMBs is controlled by an index for each. These indexes are passed between the SPP and the feature processor section in a way that prevents either from interfering with the operation of the other, by means of call message FIFO buffers 156, 158 and 160.

The FIFO buffers are 9 bits wide allowing 512 possible call message buffers. The 9 bits define the call message buffer index. The location of the call message buffer can be found using the CMB base pointer entry in the feature processor memory map table located in feature processor RAM. The message buffers provided are shown below:

| FIFO BUFFER | WRITTEN BY | READ BY |
| --- | --- | --- |
| Free (empty CMBs) | Feature processor | SPP (controller) |
| Event | SPP (controller) | Feature processor |
| Action | Feature processor | SPP (controller) |

The free message FIFO buffer contains pointers to call message buffers which are presently unoccupied. The feature processor places the call message buffer and the related pointer in a pool of empty CMBs. There are two sets of free call message buffers, both managed by the feature processor. The pool of free call message buffers is maintained separately from the free CMB FIFO buffer so that the feature processor does not need to access the free CMB FIFO buffer when it wishes to prepare a CMB with a path or packet request to place in the action FIFO buffer. It is from this pool that the feature processor replenishes the free CMB FIFO buffer.

The feature processor monitors the occupancy of the free message FIFO buffer 160, and maintains an adequate supply of communication message buffer (CMB) numbers from zero to 511. The feature processor will take a pointer to any empty CMB from the pool and load it with the parameters for a new call before placing the pointer in the Action FIFO buffer 158. The switching path protocol will take a pointer to a free communication message buffer from the free FIFO buffer 160 whenever a new incoming call is detected or an action takes place on the path that requires reporting.

The act of the switching path protocol (controller) taking a communication message buffer pointed to by a pointer in the action FIFO buffer 158 entails copying the pertinent information from the communication message buffer into a packet control buffer in high speed RAM in the address space of the controller. Before placing a pointer to a communication message buffer in the Event FIFO buffer 156, the controller must copy the appropriate entries of the packet control buffer in its high speed RAM 166 back to the CMB location in the Feature Processor RAM.

Those packet control buffers whose contents have been copied back into a communication message buffer in a feature processor RAM when they contain incomplete calls, and whose CMB pointers have been placed in the event FIFO buffer 156, continue to be retained by the switching path protocol managing the calls to ensure correct handling of any further activity. The communication message buffer will contain the call state at the time the event was posted. Any subsequent events which need to be passed to the feature processor will be done by fetching another communication message buffer from the free FIFO. The feature processor will then read the CMBs in the correct order because of the FIFO function.

H. Channel Allocation Store

The channel allocation system according to the invention maintains the availability (busy/free status) of every outgoing channel on every switch port in the switch element 15 and determines the earliest free channel within a specified time window on the identified switch ports. In the preferred embodiment, the channel allocation system receives an identification from the switch element controller of the port group to be utilized for the outgoing communications link. The channel allocation system maintains the assignment of which switch ports comprise each port group. The port group indicates which switch ports should be searched for the earliest free channel. Port groups 0 through 19 are reserved for identifying individual switch ports, while port groups 20 through 31 are reserved for specifying groups of switch ports. When a port group is specified as an outgoing route, the identities of the individual switch port(s) comprising the port group must be determined.

An availability table 300, as shown in FIG. 9a, is the central element of the channel allocation system. In selection of an output switch port and channel, the free/busy status of the switch ports and channels, maintained in the availability table 300, is searched for the earliest free channel. To limit the search of the availability table 300 to appropriate switch ports and channels, the rows and columns of the availability table 300 (corresponding to switch ports and channels of the switch element 15) to be included in the search may be controlled. Means may be provided to enable only the rows of the availability table 300 that correspond to the switch ports included in the identified port group. Similarly, means may be provided to enable only certain columns corresponding to certain channels of the availability table 300.

The availability table 300, configured as an array of associative memory cells 302, maintains the availability (free/busy status) of each channel in the switch element. The availability table 300 is used to ascertain the earliest free channel within a specified time window on the switch ports identified by the port group. A basic switch element has 20 switch ports with 32 channels. Accordingly, in order to store the availability of each port and channel, the availability table 300 is arranged in 20 rows of associative memory cells 302 (one row for each of the switch ports) with 32 columns (one for each channel). By convention, if a channel is available the corresponding cell 302 in the availability table 300 will have a value of 1 (high logic value), and if the channel is busy the corresponding cell 302 will have a value of 0 (low logic value). In this manner, the appropriate rows of the availability table 300 can be readily searched for the earliest available channel.

Figure 9B:
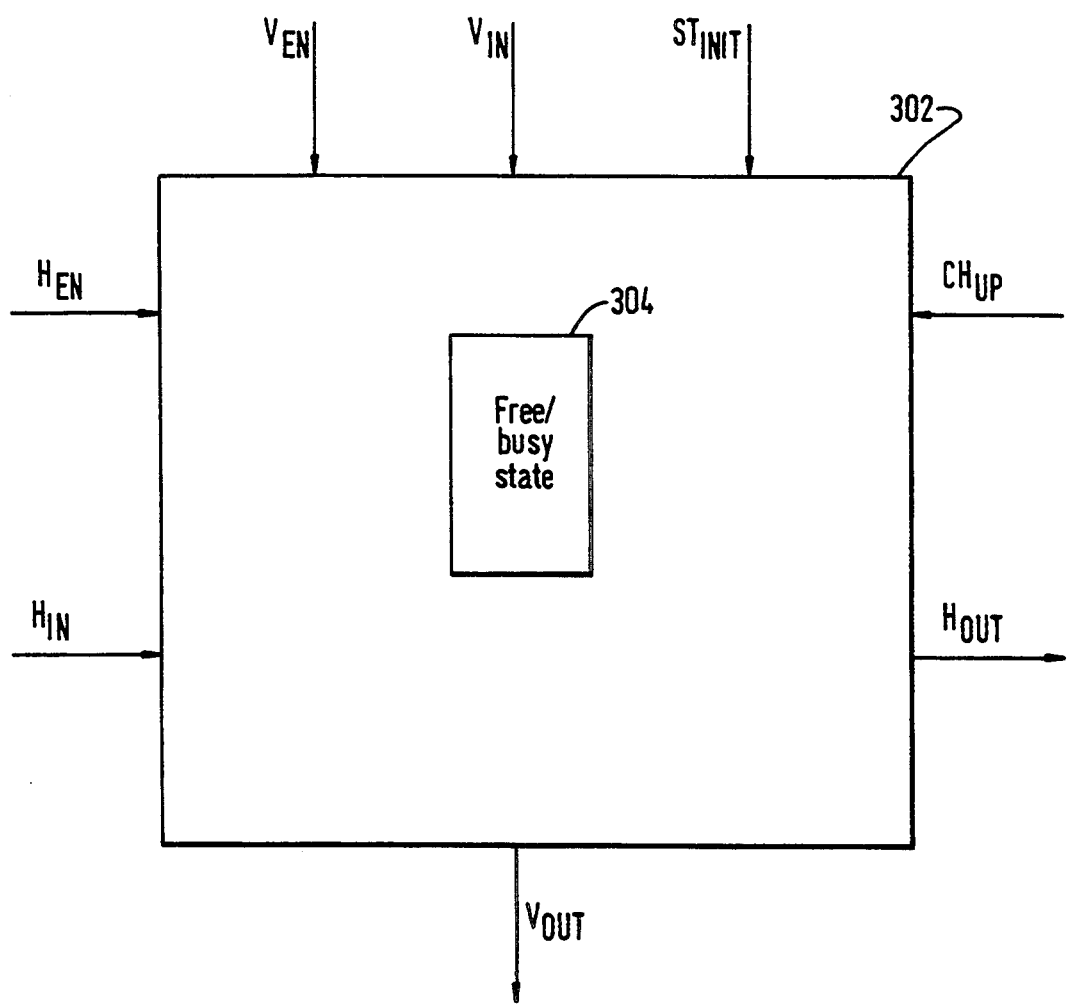
FIG. 9b is a schematic diagram of a single associative memory cell of the availability table.

A schematic diagram of an individual associative memory cell 302 of the availability table 300 is shown in FIG. 9b. As shown in the figure, each cell 302 of the availability table 300 has a memory element 304, 6 inputs and 2 outputs. The memory element 304 maintains the free/busy status (0 or 1) of the corresponding switch port and channel. An individual cell 302 in the availability table 300 is enabled (included in a search) when both its Horizontal Enable ($H_{EN}$) and Vertical Enable ($V_{EN}$) inputs have logic values of 1.

A column of the availability table 300 is constructed by connecting the Vertical Output ($V_{OUT}$) of each cell 302 to the Vertical Input ($V_{IN}$) of the cell 302 beneath it. Similarly, a row in the availability table 300 is created by connecting the Horizontal Output ($H_{OUT}$) of each cell 302 to the Horizontal Input ($H_{IN}$) of the cell 302 immediately to its right. Furthermore, the Vertical Input ($V_{IN}$) to each cell 302 in the top row of the array and the Horizontal Input ($H_{IN}$) to each cell in the left column of the array are wired to logic values of 0.

The value in the memory element 304 in each cell 302, shown in FIG. 9b, may be controlled by the $CH_{UP}$ input (Selected Channel Update) and the $ST_{INIT}$ input (Status Initialization). The $CH_{UP}$ input is utilized to set the cell 302 corresponding to the selected channel to the busy state. Additionally, the $ST_{INIT}$ input (Status Initialization) directly controls the availability state of each memory element 304. The $ST_{INIT}$ input can be used, e.g., to initialize the status of each cell 302 to a free state at system initialization, to update the value of a cell 302 to a free state or to set all of the cells 302 associated with channels that are not normally available for call routing to a busy state (e.g., clocking and status broadcast channels).

The logic of each cell 302 in the availability table 300 is such that the Horizontal Output ($H_{OUT}$) of a particular row in the availability table 300 will have a logic value of 1 if the respective row is enabled by its Horizontal Enable ($H_{EN}$) and any cell in the row, which is simultaneously enabled by its corresponding Vertical Enable signal ($V_{EN}$), is free (indicated by a logic value of 1 in its memory element 304). Similarly, the Vertical Output ($V_{OUT}$) of a particular column in the availability table 300 will have a logic value of 1 if its respective column is enabled by its Vertical Enable ($V_{EN}$) and any cell in the column, simultaneously enabled by its corresponding Horizontal Enable signal ($H_{EN}$), is free (indicated by a logic value of 1 in its memory element 304). This logic can be implemented with the following boolean equations:

$$M = V_{EN} \cdot ST_{INIT} \cdot H_{EN}$$

$$M = V_{EN} \cdot ST_{INIT}(H_{EN} + CH_{UP})$$

$$H_{OUT} = H_{EN}(V_{EN} \cdot M + H_{IN})$$

$$V_{OUT} = V_{EN}(H_{EN} \cdot M + V_{IN})$$

where M equals the value stored in the memory element 304.

Figure 9C:
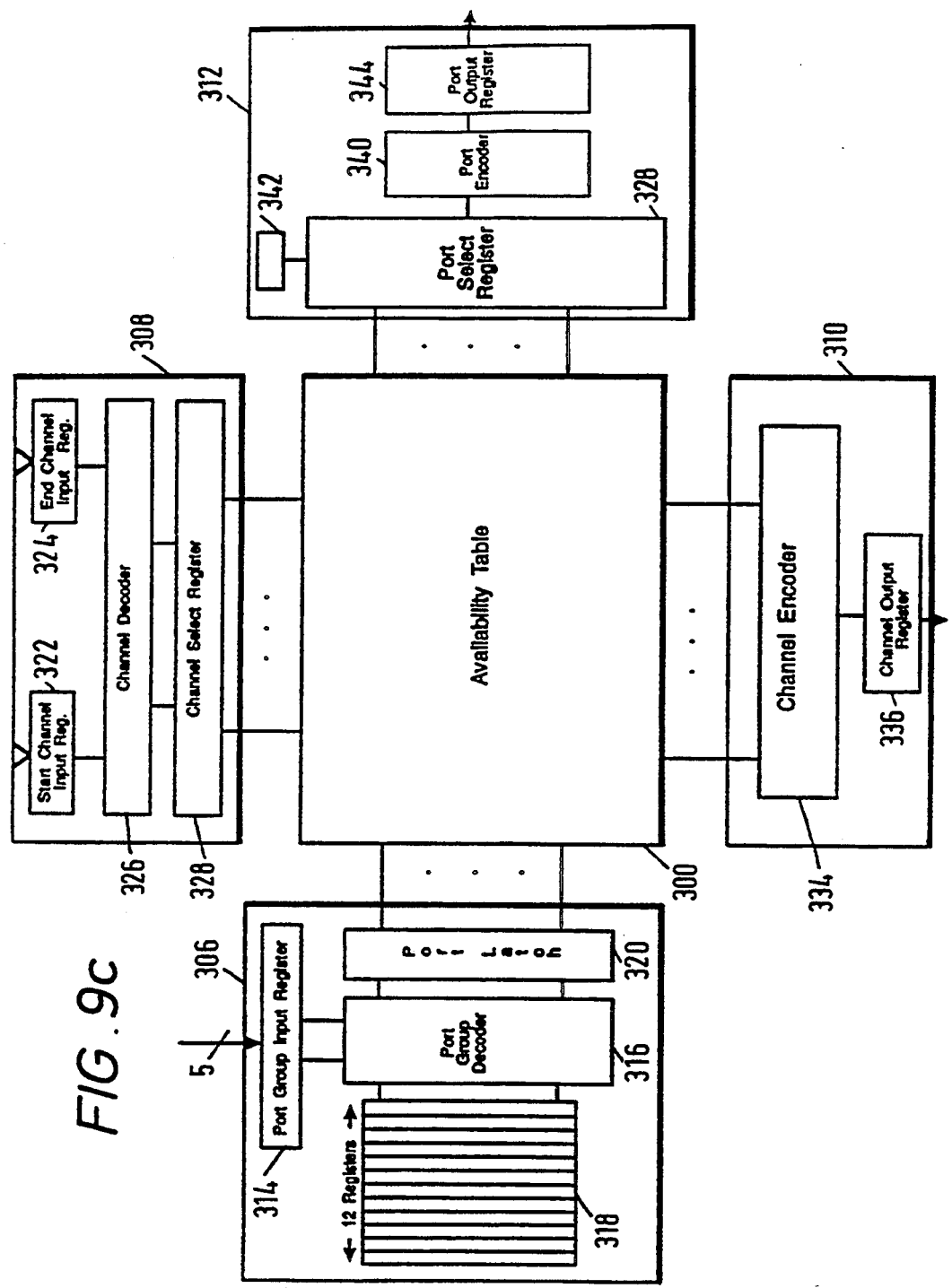
FIG. 9c is a schematic block diagram of the channel allocation system.

As preferably embodied, the channel allocation system shown in FIG. 9c, is comprised of the availability table 300, as well as a switch port enable block 306, a channel enable block 308, and channel and switch port output blocks 310, 312.

As shown in FIG. 9c, the switch port enable block 306 is comprised of a port group input register 314, port group decoder 316, port group decode registers 318 and switch port latch 320. The switch port enable block 306 receives search requests (in the form of a 5 bit port group) from the switch element controller by means of its port group input register 314. The 5 bit port group value is translated by the switch port enable block 306 into the switch ports that should be searched for free channels. The switch port enable block 306 decodes the 5 bit port group value and activates its appropriate output line(s) (each of the 20 outputs of switch port enable block 306 correspond to a switch port). The output lines are latched by means of the switch port latch 320 (containing 20 latches) and serve to enable the corresponding row(s) in the availability table 300.

When a port group value between 0 and 19 (corresponding to an individual switch port) is received at the port group input register 314, the 5 bit port group number is decoded by the logic of the port group decoder 316 to activate the corresponding switch port output line to the availability table 300. Similarly, when a port group value between 20 and 31 (corresponding to a defined group of switch ports) is received at the port group input register 314 it is used to access one of twelve port group decode registers 318. These port group decode registers 318 are 20-bit registers that allow any of the 20 bits (each corresponding to a switch port) to be marked during system initialization in order to indicate those switch ports included in a particular port group,, During initialization, the switch element controller initiates a series of twelve SET PORT GROUP commands (one for each port group decode register) that indicate the port group decode register address and the corresponding data that identifies the port(s) in the port group. The data consists of a 20 bit word where each bit corresponds to a switch port. A 1 in the bit position indicates that the associated switch port is a part of that port group and a 0 in the bit position indicates that the switch port is not a part of the port group. (If any ports are taken out of service, or returned to service, during system operation the port group decode registers 318 can be reprogrammed).

During operation, the output of the port group decode register 318 addressed by the port group value, via the port group decoder 316, activates the corresponding output lines of the switch port enable block 306. The outputs of the switch port enable block 306 are used to drive the Horizontal Enable lines ($H_{EN}$) Of the rows of cells 302 in the availability table 300; thus enabling the appropriate rows of the availability table 300.

As preferably embodied, a timing search window may be implemented by a channel enable block 308, shown in FIG. 9c, which includes start and end channel input registers 322, 324, channel decoder 326 and channel select register 328. The timing window is defined by two 5 bit values indicating the start and end channel values. These values are received from the switch element controller and placed in the start and end channel input registers 322, 324. The start and end channels define the timing window over which the free channel searches are performed.

Due to the non-alignment of frames arriving on the different switch ports of a switch element, a path set-up command received on a particular channel of an incoming switch port may not correspond to the same local channel number of the respective switch element. Thus, the arriving path set-up command should be assigned a local channel time corresponding to the channel of the respective switch element. The start channel for the search is equal to the local channel number of the incoming path set-up command plus 1, enabling the first free channel to be as close as possible to the incoming channel. The end channel is generally the start channel minus one (or the local channel number of the incoming path set-up command) to allow the search window to include all of the channels. The 5 bit start and end values are entered into the channel decoder 326 which access the channel select register 328.

As illustrated in FIG..9d, the channel select register 328 is made up of a ring of 32 associative memory cells 330 (one for each column of the availability table 300). The channel select register 328 performs two functions in the channel allocation process. The functional state of the channel select register 328 is controlled by the logical value at the Function Select input ($F_s$) of each cell 330. In the first function, where $F_s$ equals 1, the channel select register 328 initiates a broad search of the availability table 300 by enabling all of the columns in the availability table 300 within the defined search window. The broad search of the availability table 300 ascertains all of the available channels within the search window on the appropriate switch ports (enabled rows). In the second function, where $F_s$ equals 0, the channel select register 328 performs a focused search by evaluating those channels that were determined in the broad search to be available and then selecting the earliest available cell 330 within the search window (corresponding to the earliest available channel). During the focused search, only the one column in the availability table 300 associated with the selected channel is enabled, and the particular switch ports having an available channel in the selected time slot are ascertained.

Figure 9D:
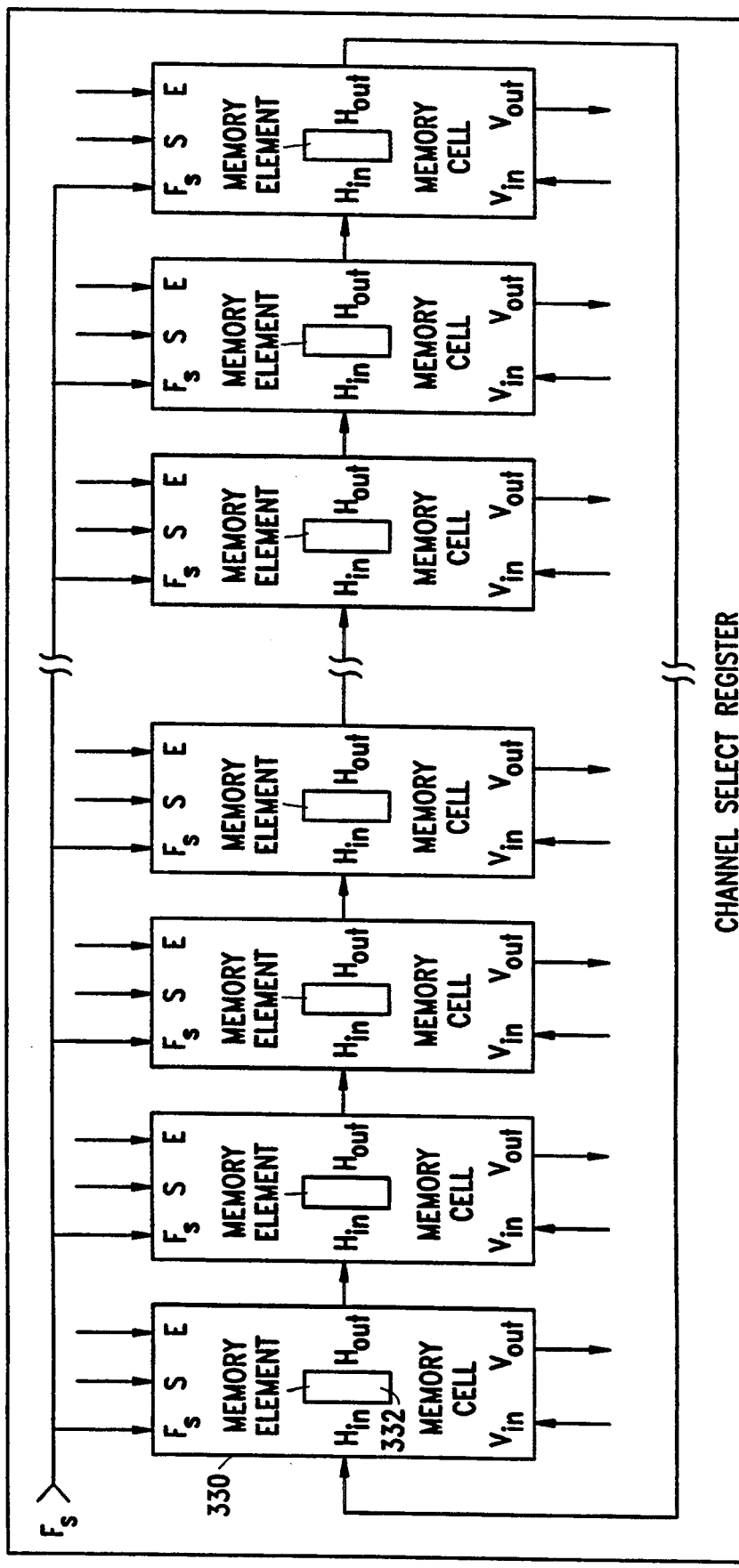
FIG. 9d is a schematic block diagram of the channel select register.

As shown in FIG. 9d, the channel select register 328 (illustrated with seven cells) is created by connecting the Horizontal Output ($H_{OUT}$) of each cell 330 to the Horizontal Input ($H_{IN}$) of the cell 330 to its right. A circular register is created by connecting the Horizontal Output ($H_{OUT}$) of the last cell in the channel select register 328 to the Horizontal Input ($H_{IN}$) of the first cell. The start and end channels provide two inputs (S and E) to each of the register cells 330. By convention, the channel decoder 326 outputs a logical value of 1 to the S input of the cell 330 selected as the start cell, while the S input for all of the other cells 330 in the channel select register 328 will have logic values of 0. Similarly, the E input to the cell 330 selected as the end cell will have a logical value of 1 while the E input for all of the other cells 330 will have logic values of 0.

As shown in FIG. 9d, each cell 330 in the channel select register 328 has a memory element 332, 5 inputs and 2 outputs. The value stored in the memory element 332 controls whether or not the corresponding column of the availability table 300 is enabled. By convention, the memory element 332 will have a 1 if the corresponding column is to be enabled, and will have a 0 otherwise. The Vertical Output ($V_{OUT}$) of each cell 330, equal to the value contained in the memory element 332, is used to drive the Vertical Enable lines ($V_{EN}$) of the columns of cells 302 in the availability table 300. The Vertical Inputs ($V_{IN}$) to each cell 330 in the register 328 are received from the Vertical Outputs ($V_{OUT}$) of the bottom row of cells 302 in the availability table 300 and will have logic values of 1 for those columns having available channels on the appropriate switch port(s) (enabled rows). The Function Select input ($F_s$) controls the functional state of the channel select register 328.

Figure 9E:
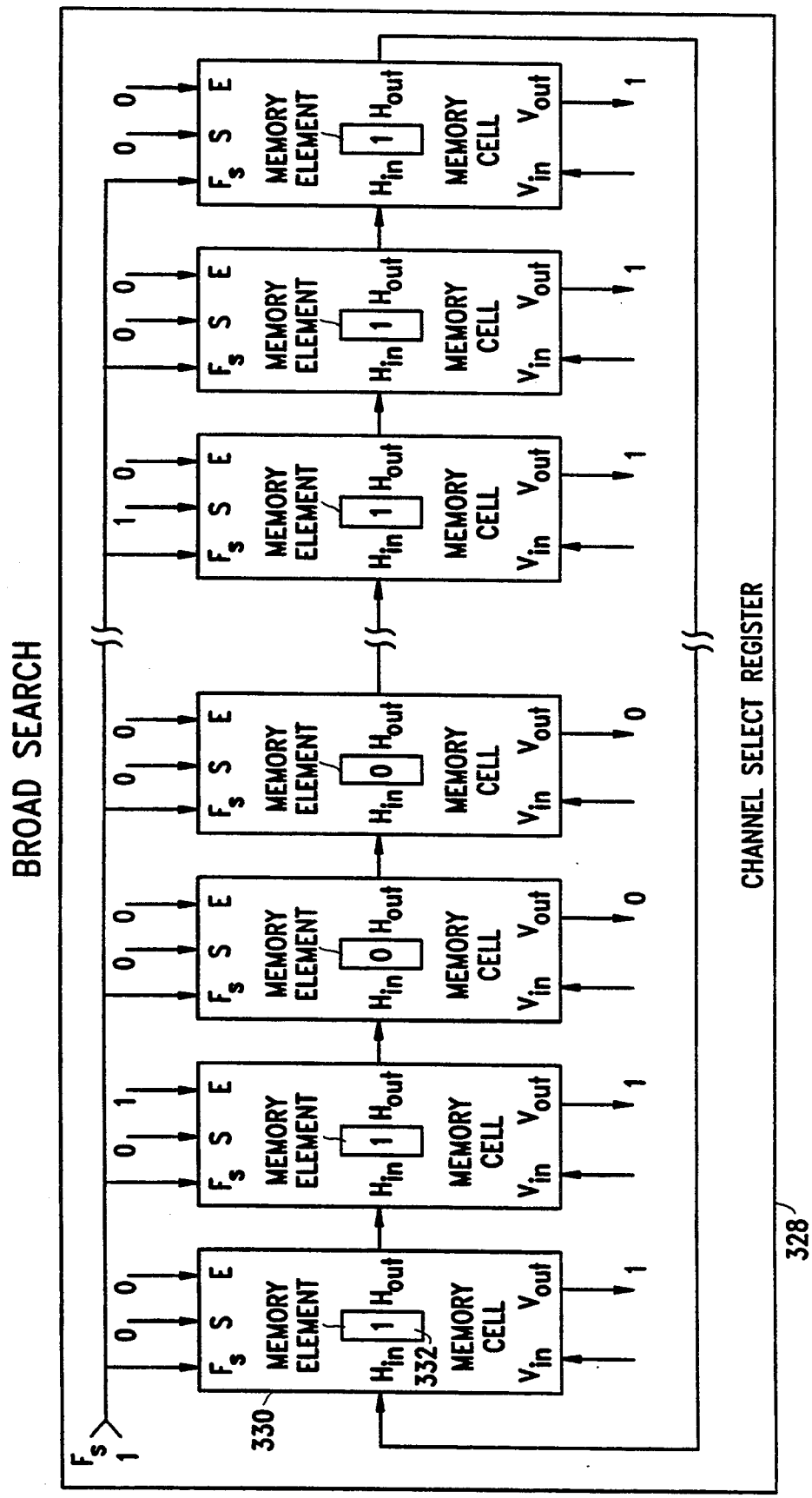

FIG. 9e illustrates the first function (broad search) of channel select register 328, illustrated with seven cells 330. The first function of the channel select register 328 is activated by setting the value of the Function Select input ($F_s$) to each cell 330 in the channel select register 328 to a logic value of 1. The logic of each cell 330 in the register 328 is such that when $F_s$ (function select) has a logic value of 1 the value of the memory element 332 in each cell 330 will have a logical value of 1 for each of the cells between (and including) the defined start and end channels, as shown in FIG. 9e. This logic can be implemented with the following boolean equations:

$$[M] = F_s(H_{IN} + S)$$

$$M = F_s \cdot H_{IN}$$

$$H_{OUT} = F_s \cdot E(H_{IN} + S)$$

$$V_{OUT} = [M]$$

where M equals the value stored in the memory element 332 and $F_s$ equals 1. During the broad search of the availability table 300, all of the columns in the window between the start and end channels are enabled (by having $V_{OUT}$ equal to 1 for each of the corresponding cells 330). The Vertical Inputs ($V_{IN}$) to each cell 330 in the register 328, received from the corresponding columns of the availability table 300, will have logic values of 1 for those columns having available channels on the enabled switch port(s).

The second function of the channel select register 328 is activated by setting the Function Select input ($F_s$) to each cell 330 in the channel select register 328 to a logic value of 0, as shown in FIG. 9f. The second function evaluates the results of the broad search of the availability table 300 for columns receiving logic values of 1 at its Vertical Input ($V_{IN}$). Thereafter, the logic of the channel select register 328 is such that the earliest cell having $V_{IN}$ equal to 1 will have a 1 in its memory element 332. This logic can be implemented with the following boolean equations:

$$[M_{T2}] = F_s \cdot V_{IN} \cdot (H_{IN} + S)$$

$$H_{OUT} = F_s \cdot E(T_1 \cdot (H_{IN} + S)$$

$$V_{OUT} = [M_{T2}]$$

where M equals the value stored in the memory element 332 from the previous equations, $M_{T2}$ is the value currently being calculated, S is the start: channel and $F_s$ equals 0. This enables the one column associated with the selected cell for the focused search of the availability table 300 since the corresponding $V_{OUT}$ will have a value of 1.

Following the second function of the channel select register 328 (with only the selected column enabled), the only Vertical Output ($V_{OUT}$) Of the availability table 300 with a value of 1 is the column associated with the selected channel. Similarly, after the second function only the rows of the availability table 300 with available cells in the one enabled column will have Horizontal Outputs ($H_{OUT}$) of 1.

The channel output block 310, shown in FIG. 9c, is comprised of a channel encoder 334 and channel output register 336. The Vertical Outputs ($V_{OUT}$) of the bottom row of cells 302 of the availability table 200 are connected to the inputs of the channel encoder 334. As noted above, following the second search of the availability table 300 (with only one enabled column) only the selected channel will have a Vertical Output ($V_{OUT}$) of 1. The channel encoder 334 receives this input and encodes the selected switch port number into a 5 bit value and outputs it to the channel output register 336. The channel output register 336 can then be read by the switch element controller.

The switch port output block 312, shown in FIG. 9c, is comprised of a switch port select register 338, port encoder 340, last selected port input register 342, and a switch port output register 344. When a port group comprised of several suitable outgoing switch ports (i.e. port groups 20 through 31) has been identified as the outgoing communications link it is possible that the search of the availability table 300 will indicate that more than one switch port has the same optimum channel available. The switch port output block 312 serves to receive and evaluate the row outputs of the availability table 300 and select one port for the outgoing communications link. Although numerous traffic distribution conventions can be utilized when choosing the switch port, the switch port selection method discussed herein will be based on the last selected switch port for that port group.

Figure 9G:
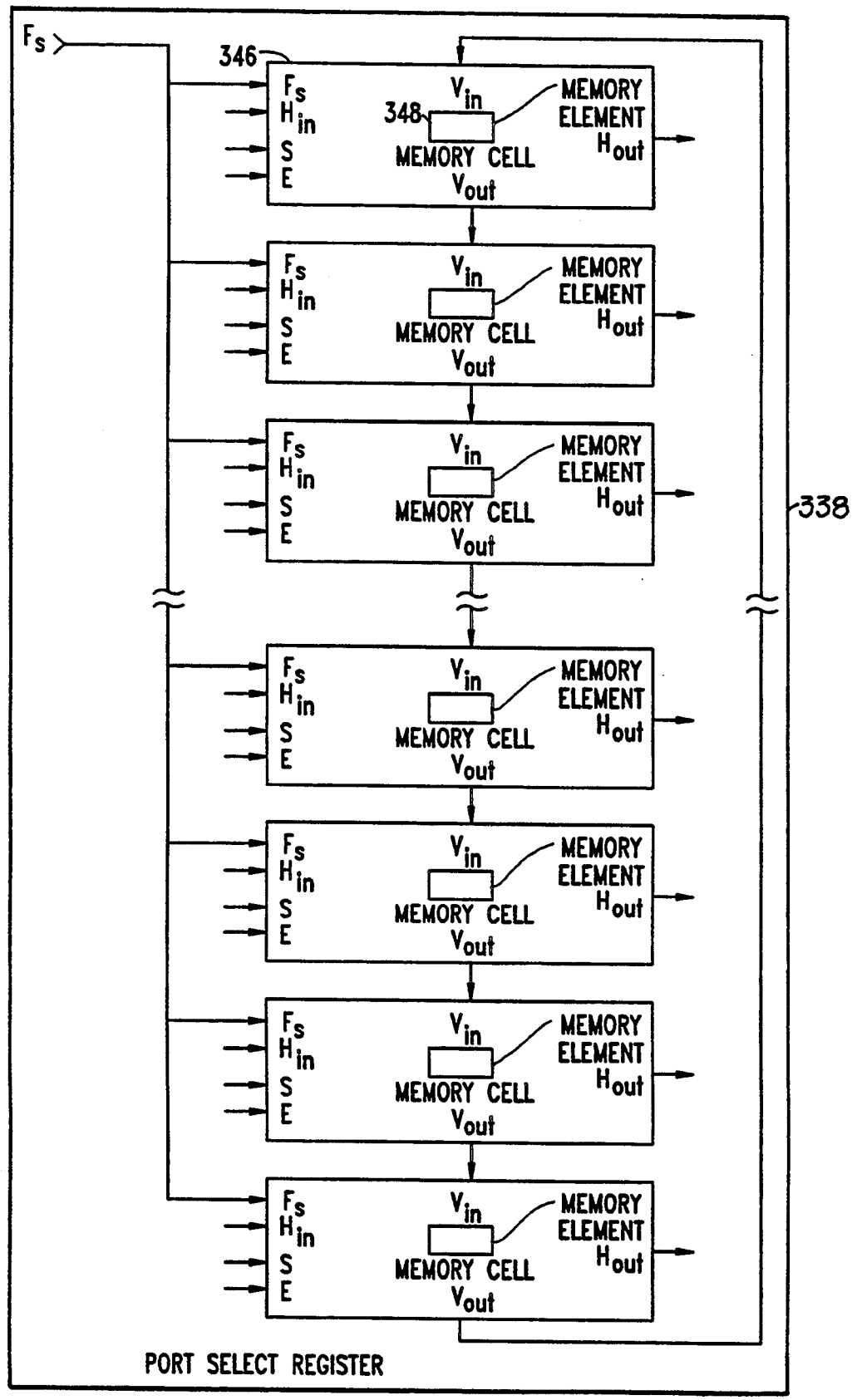
FIG. 9g is a schematic block diagram illustrating the components of the port select register.

As preferably embodied, the switch port select register 338, shown in FIG. 9g, is made up of a ring of 20 associative memory cells 346 (one for each row of the availability table 300). When a port group comprised of several suitable outgoing switch ports (i.e. port groups 20 through 31) has been identified as the outgoing communications link, the switch port select register 338 is loaded by the switch element controller with the number of the switch port that was selected during the last port and channel assignment for that port group by means of the last selected port input register 342. Thereafter, the search for an appropriate switch port will start at the last selected switch port plus one in order to distribute the traffic evenly. The search will end with the last selected switch port (or the start port minus 1), so that all of the switch ports are searched.

As shown in FIG. 9g, the port select register 338 (illustrated with 7 cells) is created by connecting the Vertical Output ($V_{OUT}$) of each cell 346 to the Vertical Input ($V_{IN}$) of the cell 346 immediately beneath it. A circular register is created by connecting the Vertical Output ($V_{OUT}$) of the bottom cell in the port select register 338 to the Vertical Input ($V_{IN}$) of the top cell. The start port, equal to the last selected port (for that port group) plus 1, and the end port, equal to the last selected port, provides an input to each of the cells 346 of the port select register 338. By convention, the S input to the cell 346 selected as the start cell will have a value of 1, while the S input for all of the other cells 346 in the port select register 338 will have logic values of 0. Similarly, the E input to the cell 346 selected as the end cell will have a logical value of 1 while the E input for all of the other cells 346 will have logic values of 0.

As shown in FIG. 9g, each cell 346 in the port select register 338 has a memory element 348, 5 inputs and 2 outputs. The value stored in the memory element 348 indicates whether or not the port is selected for the outgoing communications link. By convention, the memory element 348 of each cell 346 will contain a 1 if it is the selected port, or a 0 otherwise. The Horizontal Output ($H_{OUT}$) of each cell 346, equal to the value in the memory element 348, is connected to the corresponding input line of the port encoder 340. The Horizontal Inputs ($H_{IN}$) of each cell 346 are received from the corresponding row of the availability table 300 and will have values of 1 for those rows corresponding to a free port in the selected channel time slot. The value of the Function Select ($F_s$) input to each cell 346 should be permanently wired to 0.

The port select register 338 evaluates the signals received from the corresponding rows of the availability table 300 for cells 346 receiving logic values of 1 at its Horizontal Input ($H_{IN}$). Thereafter, the logic of the cells 346 of the port select register 338 is such that the earliest cell after the identified start cell having its $H_{IN}$ equal to 1 will have a 1 in its memory element 348. This logic can be implemented with the following boolean equations:

$$[M_{T3}] = M_{T2} \cdot (V_{IN} + S)$$

$$V_{OUT} = M_{T2} \cdot E \cdot (V_{IN} + S)$$

$$H_{OUT} = M_{T3}$$

where $M_{T2}$ equals the value stored in the memory element 348 from the previous equations, $M_{T3}$ is the value currently being calculated, S is the start port. The logic of the switch port select register 338 is similar to the second function of the channel select register 328 discussed above, wherein the channel select register 328 searches for the first available channel starting with the start channel. Here, the port select register 338 searches for the first available port, starting with the start port.

The Horizontal Output ($H_{OUT}$) of each cell 346 of the switch port select register 338, equal to the value in the memory element 348, has a logic value of 1 only for the cell 346 that is associated with the selected switch port. This high logic value is received by the switch port encoder 340 and encoded into a 5 bit switch port value which is output to the switch port output register 344. The switch port output register 344 can be read by the switch element controller.

The Horizontal Output ($H_{OUT}$) of each cell 346, shown in FIG. 9g, in the switch port select register 338 is also connected to the $CH_{UP}$ input (Selected Channel Update) of each cell in the corresponding row in the availability table 300. The Horizontal Output ($H_{OUT}$) from the switch port select register 338 with a logic value of 1, corresponding to the selected row, is received by each cell in the corresponding row of the availability table 300 at their $CH_{UP}$ (Selected Channel Update) inputs. The logic of the cells 302 in the availability table 300 is such that when a value of 1 is received at the $CH_{UP}$ input of a cell 302 while the cell is enabled (i.e. when its Horizontal and Vertical Enables have values of 1) the value of the memory element 304 will be set to the busy state (0).

It is important that the channel allocation system not only distribute traffic evenly amongst the switch ports in a port group, as discussed above, but also to insure that subsequent path set-up attempts (retries) for the same path (i.e. after a path set-up failure) are attempted on different switch ports and channels. Thus, when a switch element controller cannot establish duplex communication between the source and destination (i.e.

CONFIRM was sent by the source but was not echoed back) a path set retry must be attempted. On the retry attempt, in addition to starting the switch ports each at the last selected switch port plus 1, there will also be an offset for the channel search so that different channels are searched. Preferably, channel searches on a path set retry should start at the last selected channel plus an offset of 25. The offset of 25 has been selected because it does not divide into 32 (the number of channels) and guarantees different channels being searched each time. Modulo 32 arithmetic is utilized to insure that the number remains between 0 and 31.

For example, assume that an initial path set attempt for a port group (Group 20) comprised of switch ports A, B, and C indicated that switch port B and channel 2 were the earliest switch port/channel available. If the switch element controller does not receive back its CONFIRM signal, a duplex path has not been established and a new path set must be attempted. On the path set retry, the switch element controller will initiate the search for the earliest free switch port and channel in the port group by loading the input registers of the channel allocation system with the following values:

switch port group input register 314—Group 20
start channel input register 322—2+25=27
end channel input register 324—27−1=26
last selected port input register 342—Port B This search will select the first channel available starting with channel 27. If more than one of the switch ports in the port group (Port #s A, B, C) have the same optimum port available, the first one after port B will be selected.

I. Key Station

Figure 10:
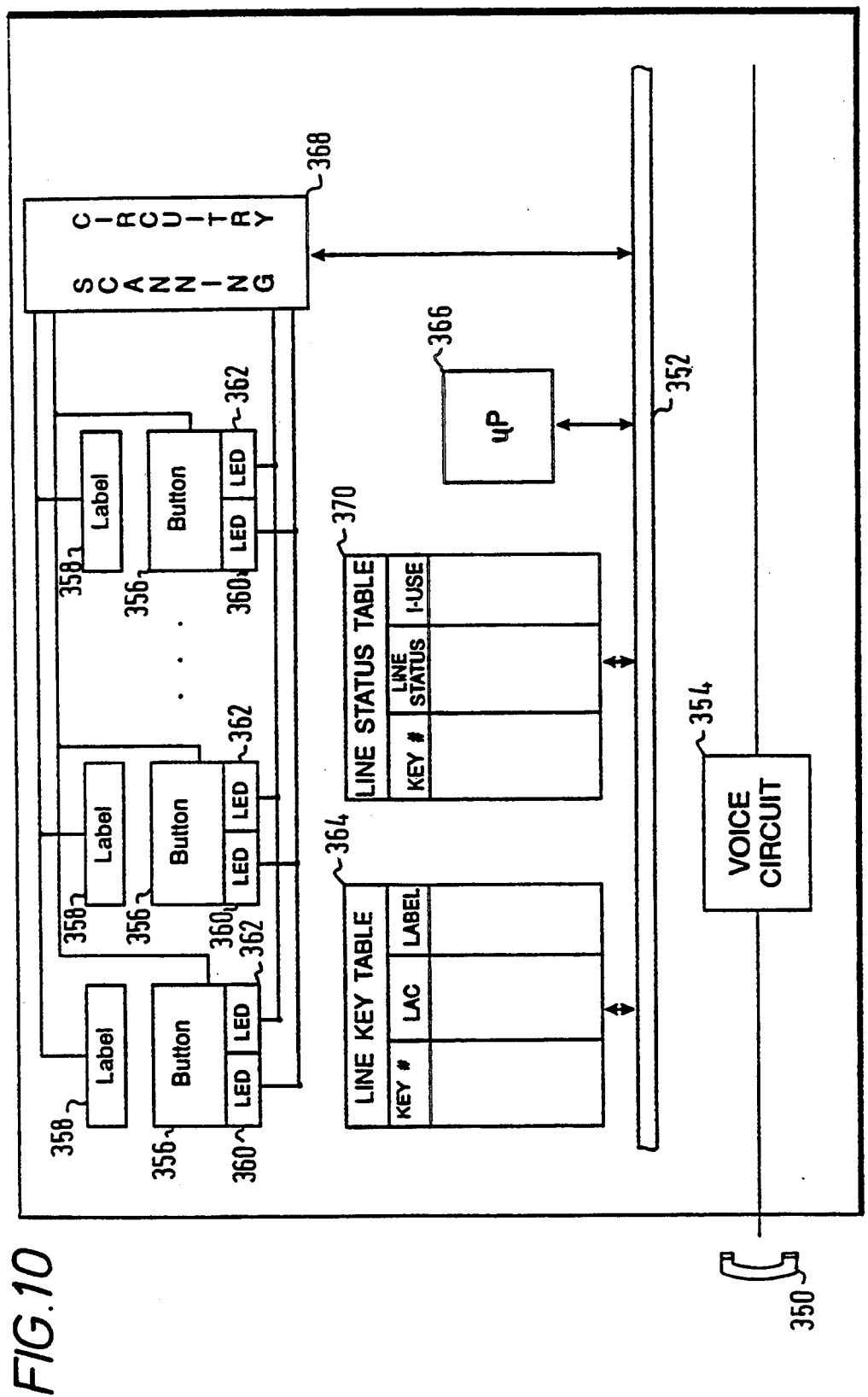
FIG. 10 is a conceptual drawing of a key station as may be connected to the switching network.

FIG. 10 is a conceptual drawing of a key station, or turret, as may be connected to the switching network herein. Such key stations are well known in the art and therefore will not be described in great detail. The key station includes the familiar handset 350 which is coupled to data bus 352 by means of voice circuit 354. The key station includes individual line buttons or keys 356, each having a label 358, a red LED 360 and an green LED 362 associated therewith. The key station button array may include up to 600 such buttons. The red LED 360 associated with each button is used for line status indication and the green LED 362 is used for active line, or I-use, indication. Label 358 may be an alphanumeric identifier indicating to which line the particular button is connected. Line key table 364 provides key numbers, logical address codes and labels for each button.

Processor 366 controls the functions of the key station interacting with data bus 352 and scanning circuitry 368. The button array is scanned by scanning circuitry 368 to determine when a button has been depressed. Scanning circuitry 368 also activates the LEDs for display of line status information. The key station maintains a line status table 370 which relates line status to particular buttons of the key station to allow indication to the user the status of the particular line to which the button is connected. The line status table may also include information as to which button is the active line at the key station. The key station is connected to an interface switch in the switching network via a key station interface as described.

J. Key station Interface

Figure 11A:
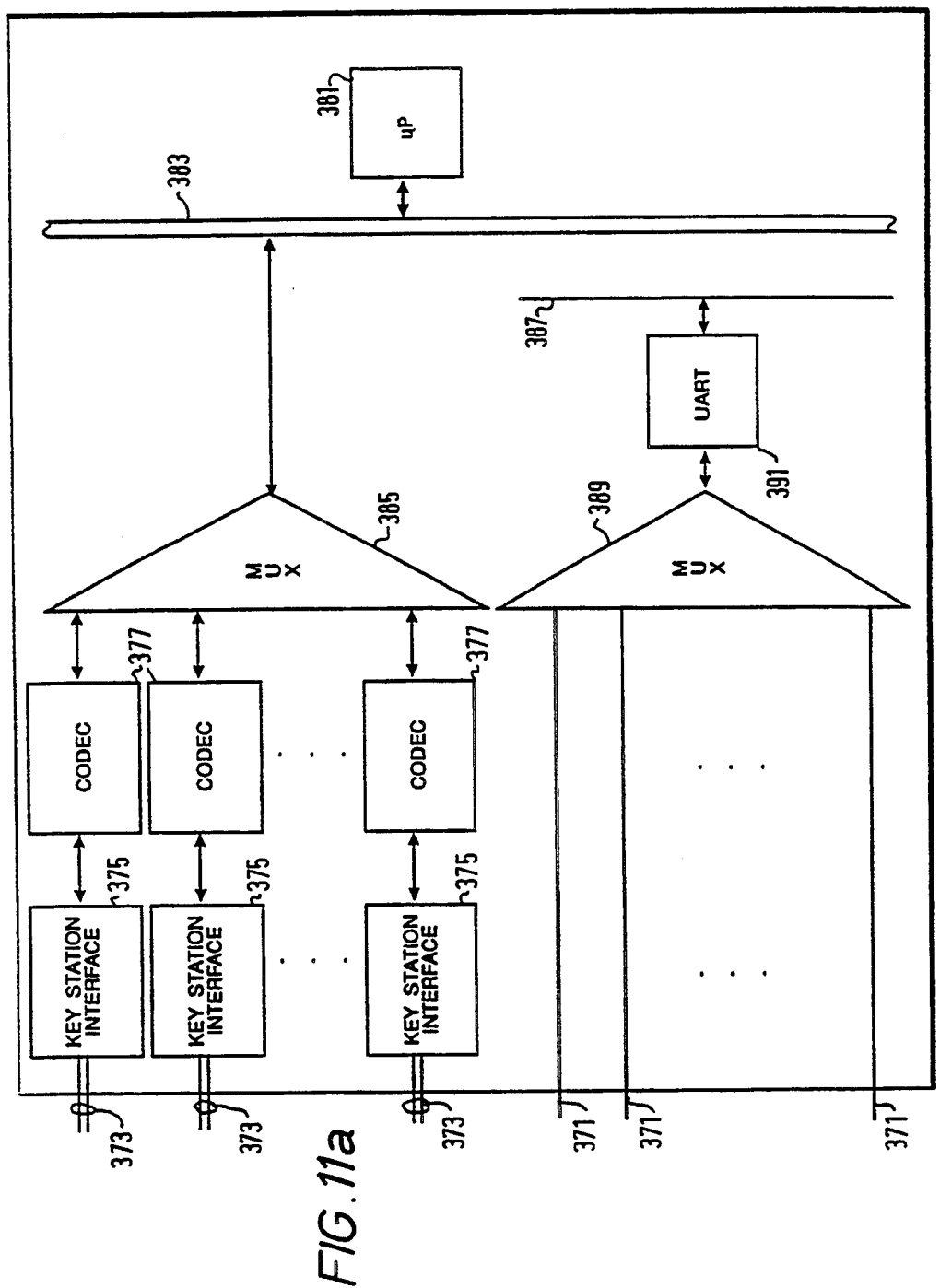
FIG. 11a is a conceptual drawing of a key station interface as may be connected to the switching network.

FIG. 11a is a conceptual drawing of a key station interface as may be connected to the switching network for interfacing analog key stations. With reference to FIG. 1, the key station interface may be thought of as being located within key station 12. Such interface procedures are within the abilities of the average skilled artisan and therefore will not be described in great detail. Handset voice pairs 373 connected to the key station interface are shown on the left hand side of the drawing. In practice, up to 12 entering voice pairs may be used for each key station interface connected to the switching network. However, for purposes of illustration only three voice pairs are shown. Similarly up to 12 serial data links 371 may be utilized of which three are illustrated. The voice pairs connect to a key station interface 375 which includes a protection circuit and a voice isolation circuit as are known in the art. The key station interface circuits 375 are each connected to a codec 377 which converts two-wire analog voice to four-wire digital voice.

Each of the codecs generate 8-bit $\mu$-law (or A-law) voice samples which are serially output on a serial bus 383 in one of twelve allocated time slots (one per connected voice pair) via multiplexer 385. Each sample is then converted into linearly-encoded 13-bit samples by the key station interface processor 381. The codecs also receive 8-bit $\mu$-law (or A-law) voice samples on the serial bus coming from the key station interface processor. Additionally, line status and key station commands are output on serial bus 387 via multiplexer 389 and UART 391.

Processor 381 performs digital signal processing functions including format and rate conversion for the voice samples and key station command translation. The key station interface is connected to an appropriate interface switch in the switching network.

While illustrated herein as separate circuit elements connected to the switching network, in actual implementation it may be desirable to incorporate the key station interface into the appropriate interface switch to realize economies of components and interconnections.

K. Private Line Interface

FIG. 11b is a conceptual drawing of a private line interface as may be connected to the switching network. With reference to FIG. 1, the line interface may be thought of as being within private line 13. Such line interfaces are well known in the art and therefore will not be described in great detail. External lines 372 connected to the line interfaces are shown on the left hand side of the drawing. In practice, up to 10 entering line pairs may be used for each line interface connected to the switching network. However, for purposes of illustration only three line pairs are shown. Ten analog lines represents an acceptable trade-off between cost per line and loss of service should a line interface failure occur. The external lines connect to a line interface circuit 374 which includes a protection circuit, a ring detector and a voice isolation circuit as are known in the art. The line interface circuits 374 are each connected to a codec 376.

Each of the codecs generate 8-bit $\mu$-law (or A-law) voice samples which are serially output on a serial bus 378 in one of ten allocated time slots (one per connected line) via multiplexer 379. Each sample is then converted into linearly-encoded 13-bit samples by the line card processor 380. The codecs also receive 8-bit $\mu$-law (or A-law) voice samples on the serial bus coming from the line interface processor.

Processor 380 performs digital signal processing functions including format and rate conversion for the voice samples and line interface testing. A line status table 382 is maintained on the line interface interacting with the processor on the interface switch via data bus 378. The interface is connected to an appropriate interface switch in the switching network.

While illustrated herein as the separate circuit elements connected to the switching network, in actual implementation it may be desirable to incorporate the private line interface into the appropriate interface switch to realize economies of components and interconnections.

L. System Initialization and Destination Port Store Setup

During system initialization, each switch element in the switching network polls its neighbors to request information about itself. Initially, none of the switch elements in the switching network have any information so these polling requests go unacknowledged. The system center, responsible for system initialization and maintenance, is the first to be initialized by utilizing a bus to retrieve its initialization data from the system center hard disk. Thus, the system center can be initialized without accessing the switching network.

Once the system center has retrieved and processed its own initialization data, the system center is fully operational. Thereafter, the system center can respond to polling requests for information from the system center interface switch 21 which is adjacent to the system center. As each switch element gets initialized and becomes fully operational, the switch element is then capable of responding to polling requests for information to other switch elements. The system initialization proceeds in a "wave" from the system center until all of the switch elements in the switching network have been initialized. In one embodiment, the system center interface switch is adapted to provide the information necessary for initializing other switch elements. Alternatively, computer 15 may directly provide the information itself.

The system center interface switch will respond to the polling requests of these adjacent switch elements by providing the switch element with their LACs and TACs. Once the switch elements adjacent to the system center interface switch have their LACs and TACs, they can request the system center interface switch to transmit the load image array to them. The load image array, maintaining the physical switch address (PSA) for each logical address code (LAC) assigned in the switching network, can be used to retrieve the PSA corresponding to the particular switch element. Thereafter, the switch element can generate its Destination Port Store (DPS) table.

The switch element's DPS table is created after a switch element has received its own LAC number from its neighbor and the load image array from the system center. The load image array is indexed by LAC number and maintains the physical switch address (PSA) for each LAC. The first step requires the switch element to retrieve its own PSA from the load image array based on its LAC number. The PSA tells the switch element its position or node in the switching network. The switch element can then step through the list of LACs/PSAs in the load image array and compare its own PSA with that of each entry to determine the appropriate outgoing route for each LAC.

For each entry in the DPS table, the switch element being initialized compares its own PSA to the PSA of the entry. This PSA comparison determines if the particular LAC identifies a destination to which the switch element can direct a transmission without sending the transmission further into the switching network. If the switch element is an access switch, this will occur when the first two bytes of the LAC's PSA (identifying the path from the reflection and section switches necessary to reach the LAC) is the same as the first two bytes of the access switch's own PSA. In such a case, the selected outgoing route from the access switch is the switch port identified in the third byte of the LAC's PSA (identifying the switch port necessary to route the transmission from the access switch to the LAC).

Similarly, if the switch element being initialized is a section switch, the section switch will be capable of directing a transmission to the destination identified by the LAC without sending the transmission further into the switching network when the first byte of the LAC's PSA (identifying the path from the reflection stage) is the same as the first byte of the section switch's own PSA. In such a case, the selected outgoing route from the section switch is the switch port identified in the second byte of the LAC's PSA (identifying the switch port necessary to route the transmission from the section switch stage towards the LAC).

If the switch element being initialized is a reflection switch, any reflection switch can direct the transmission towards its destination. In such a case, the selected outgoing route from the reflection switch is the switch port identified in the first byte of the PSA (identifying the switch port necessary to route the transmission from a reflection switch towards the LAC).

If the LAC does not identify a destination that a switch element can direct a transmission to without sending the transmission further into the switching network, then the switch element must determine what switch port or port group should be utilized to send the transmission further into the switching network to a switch element that can route the transmission towards its destination. Thereafter, the selected switch port or port group should be written into the DPS entry corresponding to the LAC.

For example, a section switch creating an entry in its DPS table for a LAC identifying a particular key station will first retrieve the PSA for that LAC from the load image array. Thereafter, the section switch will compare the PSA of the key station with its own PSA and determine whether that key station is connected to one of the five terminal units that are connected to that section switch (i.e., whether the first byte of the destination LAC's PSA is the same as the first byte of the section switch's own PSA). If the key station is connected to one of these five terminal units, then the section switch selects a port group that will direct the transmission to the appropriate terminal unit. This is accomplished by selecting the outgoing route from the section switch identified by the second byte of the LAC's PSA (equal to the port group that is associated with the respective terminal unit connected to the key station) and placing the port group in the DPS table entry.

If the key station is not connected to one of the five terminal units that the section switch is connected to (i.e., the first byte of the LAC's PSA is not the same as the first byte of the section switch's PSA) then the call needs to go further into the switching network to a reflection switch. Thus, the port group corresponding to those switch ports coupled to the reflection switches will be selected and entered in the appropriate entry in the DPS table.

If a switching network utilizes a distributed clocking system, such as in the clocking system set forth in co-pending U.S. patent application Ser. No. 07/766,647 entitled DISTRIBUTED CLOCKING SYSTEM (Attorney Docket No. 416-4034), initialization of the clocking system should also be accomplished by the system center during system initialization.

Additionally, during initialization, the port group assignments that have been defined must be entered into the port group decode registers of the channel allocation system found in each switch element. Preferably, the port group assignments are entered into the port group decode registers by means of a succession of 20 bit command words that allow any of the 20 bits (each corresponding to a switch port) to be marked in order to indicate which switch ports are included in a particular port group.

A status broadcast system may be provided for broadcasting messages to all interface switch processors over duplicated paths established on dedicated broadcast channels. During system initialization, the particular communications links that are utilized for broadcast and the designation of which switch port in each switch element is to be utilized to forward broadcast messages toward the reflection switch are determined for the system. Furthermore, the correct addresses are placed into the in-address and out-address pointers associated with each broadcast channel in the switch ports. During system operation, the selected communications links and switch ports that have been selected for status broadcast during system initialization may be dynamically reconfigured in the event of a failure.

M. Duplex and Conference Path Set

Figure 12A:
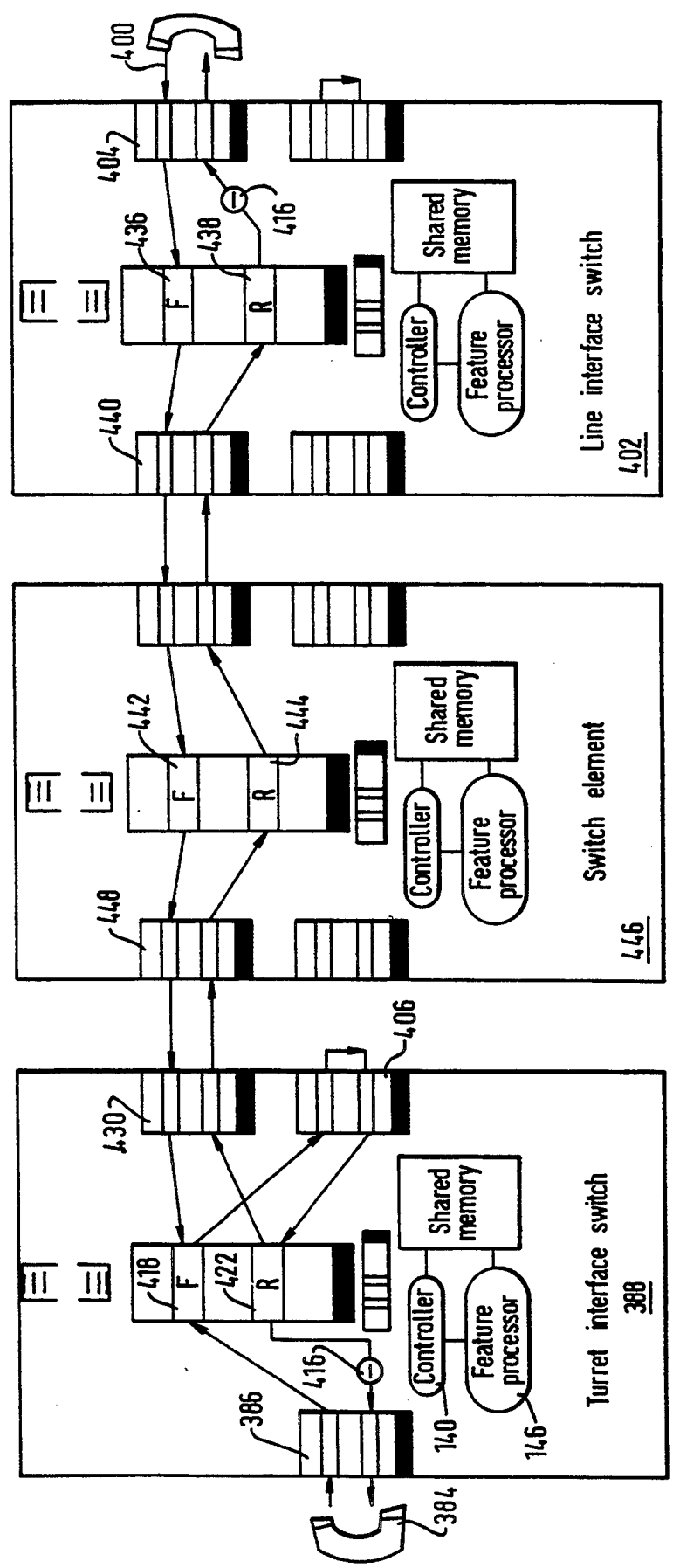
FIG. 12a–12c illustrate an example of the action sequence for originating duplex voice path between a key station and a line.
Figure 12B:
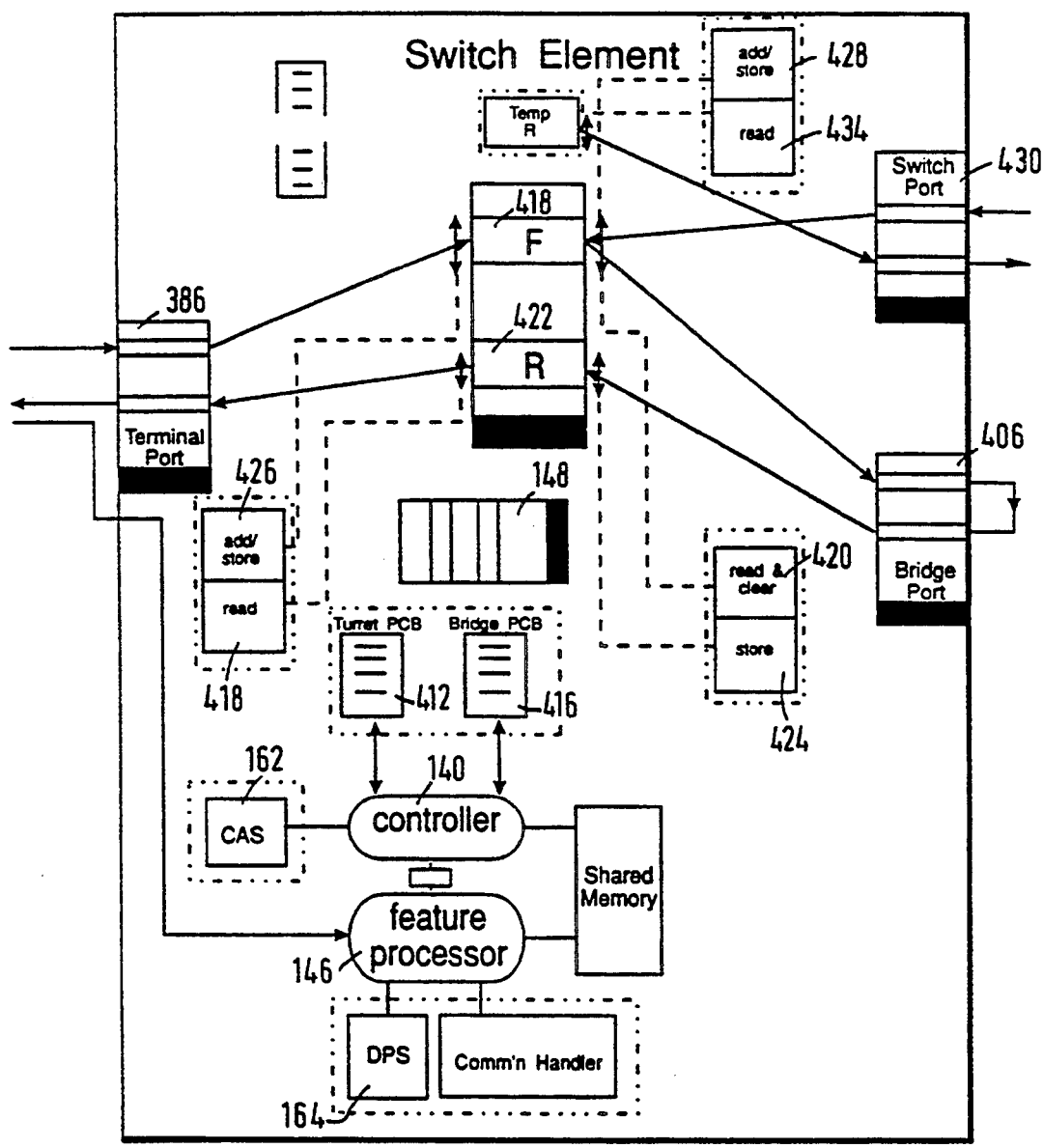
Figure 12C:
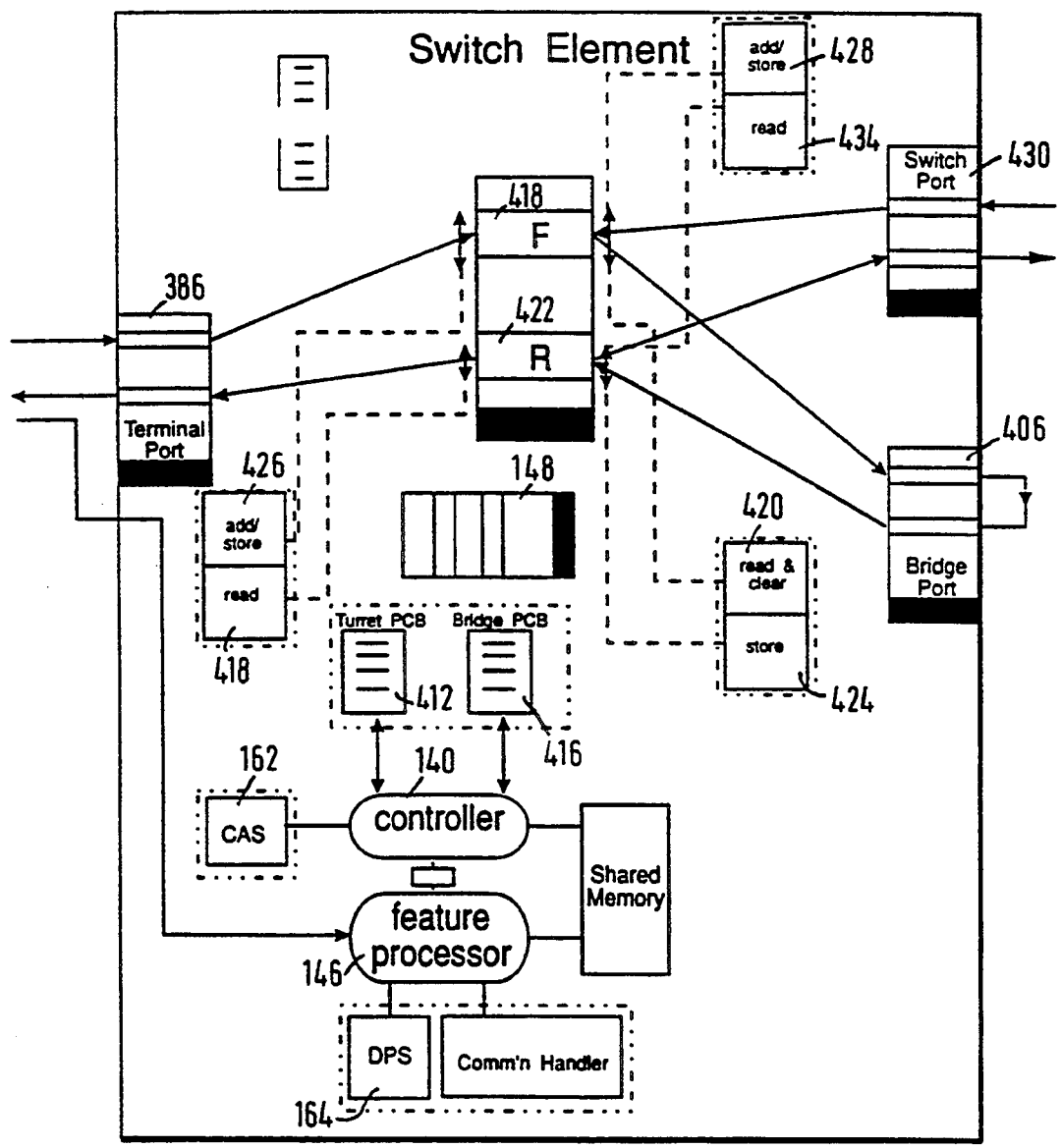

FIGS. 12a, 12b and 12c illustrate an example of the action sequence for originating a duplex voice path between a key station and a line. It will be appreciated by those skilled in the art that the following discussion may also be applicable to simplex paths in many aspects. A key station or turret 384 is coupled to a terminal port 386 of an interface switch 388. Interface switch 388, in turn, is coupled to an access switch 446. Similarly, a central office or a line 400 is coupled to an interface switch 402 via terminal port 404. The line interface switch, in turn, is coupled to the access switch 446. A user at key station 384 depresses a button on the key station to seize a line and communicate in a duplex mode with a party at the end of line 400. Accordingly, interface switch 388 becomes the path originator which, in this instance, is on the same switch as the bridge port 406. It will be appreciated that there may be instances where the bridge port resides on a different interface switch in the switching network.

Referring to FIG. 12b once a button is pushed on the key station or turret 384 of FIG. 9a, the terminal port 386 sends a message is directly sent from the key station or turret to the feature processor of interface switch 388 requesting a path be established to a certain destination line 400. Line 400 is represented in the switching network by a particular logical address code Lx. Feature processor section 146 in interface switch 388 provides a message in a data packet format, identified by a packet address code. Controller 140 sends the data packet format to line interface switch 402 requesting that it set a voice path to a unique logical address code number belonging to bridge port 406 in interface switch 388. As previously mentioned, the bridge port need not be on the same card as the line or turret but in most cases the bridge port will reside on the interface switch connected to the key station. Both the line 400 and the key station or turret 384 will set voice paths to the same bridge port logical address code.

After the data packet is sent, the switching path protocol (SPP) in controller 140 receives a voice path set request from the feature processor section 146 by means of an action FIFO buffer 158 of FIG. 3a. The SPP then allocates a path control buffer 412 of FIG. 9b for the path and initiates a "path set voice" command sequence, by passing the command to the switching connection protocol (SCP) along with the destination bridge logical address code (LAC) number and the path control buffer (PCB) number. The switching control protocol (SCP) also provides the appropriate crosspoint memory control functions. The SCP uses the destination logical address code Lx to index into the destination port store 164 (DPS) to check if there is already a path set to this destination. If the crosspoint field in the DPS is set to null, then no path presently exists. The controller 140 indexes the DPS by destination logical address code and uses the DPS entry to find the identity of the outgoing port or group of ports for entry into the network.

If the bridge port 406 exists on the same switch L bit field in the DPS entry is set to 1, which indicates that termination port of the corresponding LAC number is in the same switch element. Thereafter, the controller 140 provides for a local connection from the terminal port 386 to the bridge port 406. In the current example, the outgoing bridge port is local to interface switch 388.

The selected port, in this case the bridge port 406 which is obtained by the destination port store 164 is used to access the channel allocation system (CAS) 162. The switching connection protocol SCP at the interface switch 388, recognizes that the bridge port is local to the card by the destination port store (DPS) L bit entry. Accordingly, the switching connection protocol (SCP) allocates a second path control buffer 416 identified as bridge control buffer for the termination or bridge end of the path. A forward crosspoint memory location 418 is fetched from the free store FIFO buffer 220 (FIG. 6) in the controller RAM 166. The forward crosspoint memory location 418 is used for the connection, and its address will be placed in register 420 in pointer RAM 134 (FIG. 3a) indexed by bridge port and the channel selected by the channel allocation store for bridge port 406.

The controller copy of pointer RAM register 420 which is the controller out address register, will also include the relevant values of the path flags and the destination logical address code. The first channel in/out Lookup Tables 214 and 215 of FIG. 7a will be updated for the forward crosspoint memory location 418 to indicate the bridge port and the channel reading from it. Thereafter, the selected port and channel number is written in the appropriate fields of the destination port store (DPS) table and the count field in the DPS is incremented to one. There is no need to update the in/out link list tables 216 and 218 of FIGS. 7b and 7c, because only one channel is reading from the forward crosspoint memory location at this time.

Because the path terminates on the interface switch 388, the controller 410 need not set a path. Instead, the switching connection protocol (SCP) uses a reverse crosspoint memory location 422 associated with the bridge 406. The address of the reverse crosspoint memory location is stored in register 424 of pointer RAM 134 indexed by bridge port and incoming channel number to the bridge port. Accordingly, the reverse leg of the path is connected and the SCP-allocated path control buffer number is stored in the controller copy of pointer RAM register 424 corresponding to the controller in address register. This links the bridge port with the terminating path or bridge path control buffer 416. The first in/out table entry (FIG. 7a) for the reverse crosspoint memory location 422 is updated to show the bridge port and channel writing into it.

The switching connection protocol notifies the switching path protocol that the reverse path has been completed and provides a reverse path set RPS command. As the result of the RPS, the Switching Path Protocol requests that a confirm message to be sent. The Switching Connection Protocol will launch a confirm command from the link data port 148 into the forward crosspoint memory location 422 via selector 112 and in-data register 114 of FIG. 3a. After a round trip the confirm arrives back at the incoming channel of the bridge port 406, it is directed to the path set FIFO buffer 180 of FIG. 4. The local logical address code is recognized which ensures that a round-trip path exists. The path delay is measured at this point. Path delay is measured using the confirm message and the round trip delay from the forward crosspoint memory location to the bridge port and back to the reverse crosspoint memory location.

There is a possibility that the path confirm command may clash with a similar message from a different key telephone station or line, and can therefore be lost. Thus, if a confirm is not returned in eight frames time, the switching path protocol will instruct the switching connection protocol to send another. This is repeated until one is successful, or a predetermined number of attempts have failed. If successful, the delay value will be placed in the path control buffer and the feature processor section will be passed an event with the voice-path-complete flag set. If a path can not be set, the switching path protocol will send an event signal to the feature processor with the "path attempt overflow" flag set.

If the communication handler for the path indicates an automatic join, the connection to the terminal port 386 is made by writing the address of the forward crosspoint memory location 418 in register 426 in the pointer RAM 134 (FIG. 3a) indexed by the terminal port and incoming channel number and the reverse crosspoint memory location 422, in register 418 in the pointer RAM 134 (FIG. 3a) indexed by terminal port and outgoing channel number. This information is found in the path control buffer (PCB) 412. The originating PCB of turret PCB 412 number is placed in the controller copy of register 426 which is the controller in-address register associated with terminal port 386. The First Channel In/Out Table is then updated for both the forward crosspoint memory location 418 and the reverse crosspoint memory location 422 to include the key station channels. The destination port store (DPS) count entry for the destination logical address code (LAC) is again incremented to four, one for each connection.

If the Path request was not for automatic joining, the Switching Path Protocol would send an event signal to the Feature Processor with a voice-path-complete via the Event FIFO buffer. The Communication Handler would then have to send a separate join command to the switching path protocol via the Action FIFO buffer.

Some time later, the path set command to the same bridge port logical address code is received for the line connection. An incoming "path set" command is received by the interface card from the access switch, and passed to the switching connection protocol via the path set FIFO buffer 180 (FIG. 4). The logical address code is used to index into the destination port store to determine the outgoing switch port identity. Examination of the count entry in the destination port store table indicates that a path already exists. The switching control protocol then uses the address of the forward crosspoint memory location 418 located in the destination port switch (DPS) entry and associated with bridge port 406 and copies it into register 428 of the Pointer RAM 134 (FIG. 3a) indexed by switch port 430 and incoming channel number associated with switch port 430. The address of the crosspoint memory location that was stored in the controller copy of the in-address register associated with switchport is added to the free crosspoint FIFO 220 (FIG. 6). The switching connection protocol then fetches a temporary crosspoint location 432 from the free crosspoint FIFO 220 of (FIG. 6) and writes the reverse path set command with the originating path set command and incoming channel number as the argument, into temporary crosspoint memory location 432. The channel allocation system is then used to select a return channel path to line interface switch 402.

The destination logical address code is stored in the controller copy of register 434 of the pointer RAM which is the controller out-address register associated with switch port 430. The return channel number is stored in the controller copy register 428 of pointer RAM which is the controller in-address register associated with switch port 430 along with the flags. No path control buffer number is stored in the controller in-address register associated with switch port 430 because no PCB numbers exist for switch ports connected to the switching network. The next in and out tables are updated with the switch port 430 and channels. Finally the address of the temporary reverse crosspoint memory location is stored in register 434 of the pointer RAM which corresponds to the controller out-address register for the channel that was selected by channel allocation system. Contents of the temporary reverse crosspoint which is Return Path Set is transmitted to the previous stage.

One frame later, as illustrated by FIG. 12c, the switching control protocol changes the contents of register 434 in the pointer RAM which had stored the address of the temporary reverse crosspoint memory location 432 into the address of reverse crosspoint memory location 422 and puts the address of temporary crosspoint memory location 432 back in the Free Crosspoint FIFO. The First channel In/Out and Next channel In/Out tables are updated accordingly.

The example explained above describes the manner in which a duplex path is set between a key station and a line. Similar duplex paths may be established between two key stations as well. Additionally, ire a line originates a call to a key station, the interface switch connected to the line card sends a broadcast message to all of the key stations. The key station for which the call is directed sends a path set command to the originating interface switch and the same process as explained above will take place to set a duplex path.

Referring to FIG. 12c when a path set command arrives at line interface switch 402, forward crosspoint memory location 436 and reverse crosspoint memory location 438 will be allocated for the path as described above. Switch port 440 in interface switch 402 will be selected for the path and a reverse path is set. Similarly, a forward crosspoint memory location 442 and a reverse crosspoint memory location 444 will be allocated for switch element 446. Switchport 448 in switch element 446 will be selected for the path and a reverse path to interface switch 402 is set.

When there is more than one switching stage between two terminals, e.g. a key station and a line card, the forward leg of a duplex path is chosen to select the outgoing channel with the shortest delay. As previously mentioned, this is accomplished by the destination port state and the channel allocation system. However, the reverse leg of the duplex path is set stage by stage. Accordingly, an optimum channel cannot be chosen since the reverse path for each stage is set without knowing the return channel of the next stage.

It will be appreciated that, due to the manner which a duplex communication is created between a line card and a key station, the speech information corresponding to a station is added to the speech information in a line from the line card, and the summed information is transmitted back to the key station and to the line card from the bridge location. Therefore, each interface switch coupled to the duplex communication path receives its own speech information in addition to speech information corresponding to the other end. Hence, there will be an echo caused by the returning information belonging to each interface switch.

Referring to FIG. 12a each interface switch 388 and 402 have an echo cancellation circuit 416. The delay parameter for this echo cancellation circuit will be determined via the confirm command and is a fixed value for all line or turret interface switches which use a local bridge. The delay value will then be set into the echo canceler for each circuit.

N. Conferencing

Figure 13:
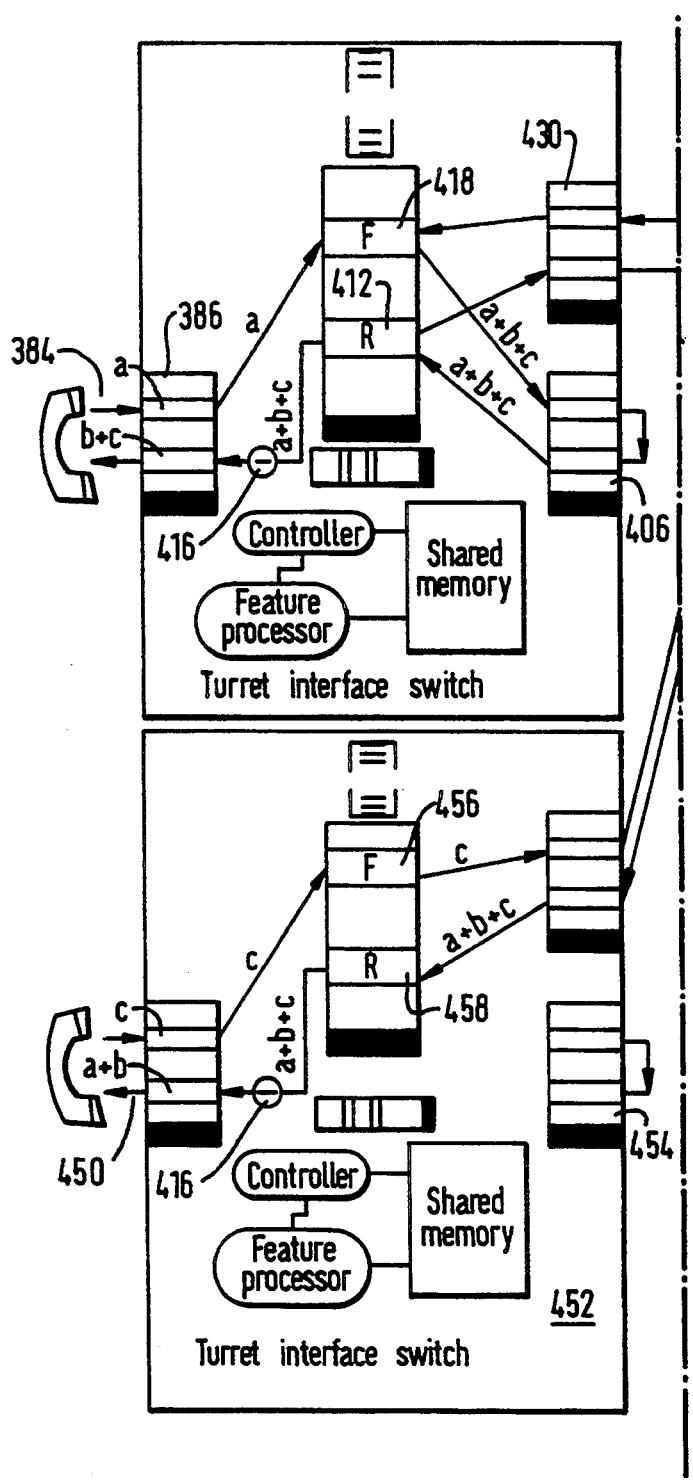
FIG. 13 illustrates a diagram of a conference path.
Figure 13:
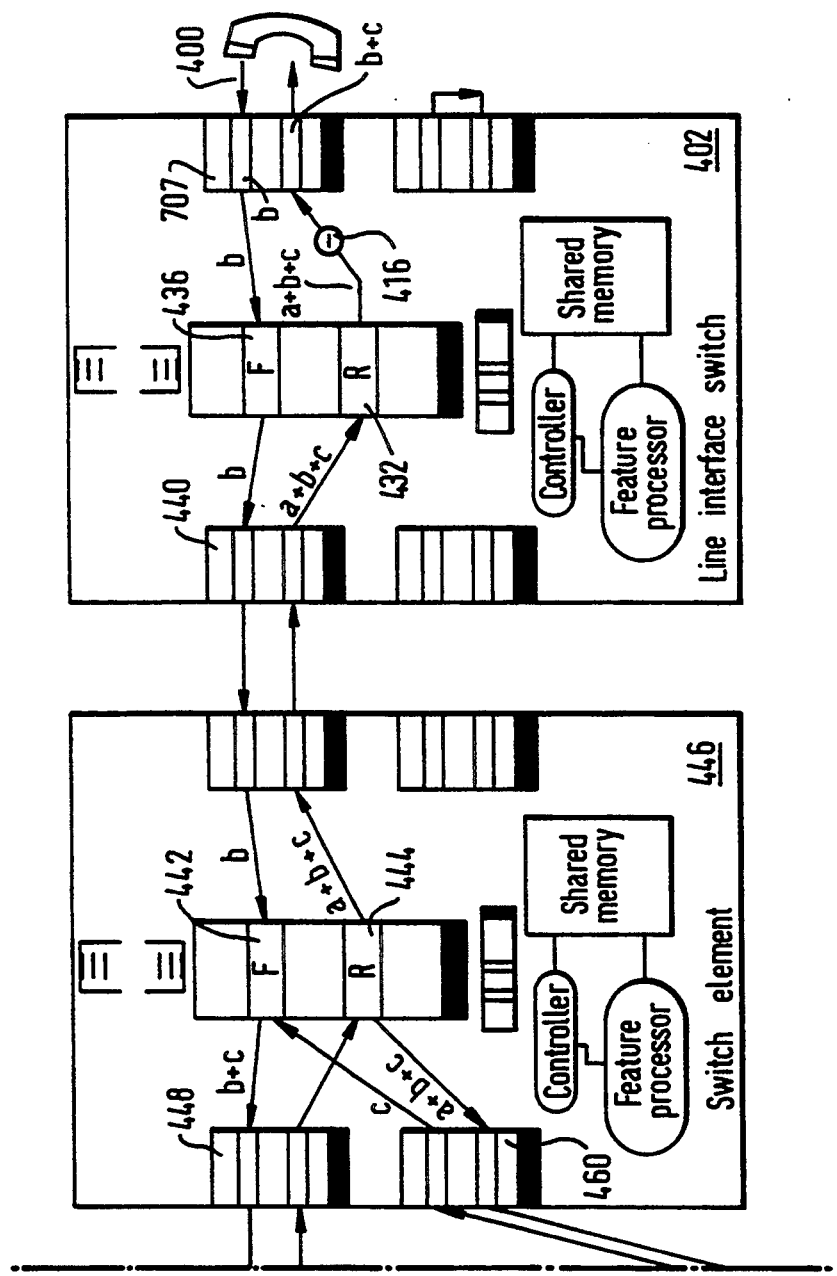

FIG. 13 illustrates the manner in which a second key station or turret 450 can set a conference by joining a connection already set between key telephone station 384 and line 400. The turret 450 is coupled to interface switch 452. Interface switch 388 is provided with speech information identified as "a". Line 400 from a line card connected to interface switch 400 provides speech information identified as "b", and interface switch 452 is provided with speech information identified as "c". The interface switch 452 sends a "path set" command to the desired line 406 to set a path to a local bridge logical address code corresponding to bridge 454. When interface switch 402 receives the command, it responds by indicating to interface switch 452, that it already has set a path to another bridge port logical address code corresponding to bridge port 310 on interface switch 388. Interface switch 452 then sets a path to the same bridge port logical address code corresponding to bridge port 406. This includes the process of selecting the port and channel out of turret interface switch 452 and assigning a forward crosspoint memory location 456 and a reverse crosspoint memory location 458.

Some period of time later, switch 446 receives a path set command to the same bridge port logical address code as the line connection. The logical address code is used to index into the destination port store in switch element 446 to determine the outgoing switch port identity. Examination of the count entry in the destination port store table in the switch element 446 indicates that a path already exists. The switching control protocol then retrieves the address of the forward crosspoint memory location 442 from the destination port store table and copies it into the controller copy of in-address register corresponding to switch port 460.

The reverse crosspoint memory location 444 is determined via a mate table which is indexed by forward crosspoint memory location addresses. This information is then stored in the controller out-address register corresponding to switch port 460 of switch element 446. The channel allocation system is then used to select a return channel path to line interface switch 402. The destination Logical Address Code is stored in the controller copy of the switch element out-address register corresponding to switch port 448. The return channel number is stored in the controller copy of the switch element in-address register corresponding to switch port 460 along with the flags. No path control buffer number is stored in the in-address register because no PCB numbers exist for switch ports in the switching network. The Next Channel In/Out Tables are updated with the switch port 460 and channels. It may be appreciated that additional turrets or lines can be added into the conference by merely joining an already connected path in the same manner.

O. Status Broadcasting and Multicasting

The broadcast system of the switching network provides for the broadcast (one to all) or multicast (one to many) of two types of broadcast messages:

(1) Interface switch status broadcast; and
(2) Interface switch event broadcast.

The interface switch status broadcast informs all feature processors on interface switches of the current status (not-in-use, ringing, busy or hold) of all of the lines in the system. The status broadcast may also be utilized to broadcast data packets to all interface switch feature processors in the switching network. The interface switch event broadcast alerts all interface switch feature processors to event occurrences in which they may be involved.

The broadcast message is passed into the switching network through multiple switch elements toward a fold point before being broadcast back to all of the interface switches. The switching network is organized as a set of switch element stages of which the first stage is the switching network interface to the key stations and line cards, the second stage is called the access switch stage and the $n^{th}$ stage is called the fold point. The fold point, or reflection switch, is the switch element in the switching network (defined at system initialization) where the broadcast message in the "in" broadcast FIFO buffer is transferred to the "out" broadcast FIFO buffer in the switch element.

The broadcast system provides for an interface switch feature processor to initiate a broadcast message made up of two bytes of data on a first channel, with a flag to identify the type of data contained within the broadcast message (status or event), paired with another two bytes of data in the same frame on a second channel. As preferably implemented, the channel pair should be on adjacent channels. As used herein, "message" indicates a discrete quantity of data or information broadcast through the switching network and is not limited in either size or number of channels utilized. As described herein, the broadcast message comprises 16 bits on each of two channels (a total of 32 bits) but may be increased or decreased in accordance with a specific system implementation.

As illustrated in FIG. 14, the broadcast message is a signed two byte argument transmitted on a first channel to all interface switch feature processors, in combination with a second two byte argument transmitted in the same frame on a paired channel. The second argument of the broadcast message is generally a data argument associated with the first argument.

The first argument of the broadcast message includes a first (most significant) bit, "$B_m$" in FIG. 14, to indicate whether the broadcast message is to be indexed into memory or treated as an event occurrence. If the broadcast message is to be indexed into memory, the remainder of the first argument is used to index store the broadcast message into memory. If an event, the broadcast message is stored and passed in its entirety to the feature processor for further processing.

Every interface switch status or event broadcast is broadcast to all interface switch feature processors over duplicated paths established on dedicated broadcast channels. The broadcast channels are a pair of channels on every required communications link. The particular communications link requirements and configuration are determined for the system and set at system initialization. The broadcast channels need not be consecutive but the first channel should be lower in number. As preferably embodied, the broadcast channels are implemented on channels 30 and 31 of each communications link.

It is desirable to provide redundant communications links to and from each interface switch. There is a redundant status broadcast connection (using two communications links) from each interface switch to two access switches. This provides high reliability for the propagation of each individual broadcast message so that no single failure in the switching network can block the propagation of a broadcast message. The identification of each of the two communications links used by the interface switch for broadcast may be specified at system initialization and dynamically reconfigured in the event of failure of one of the communication links.

Figure 15:
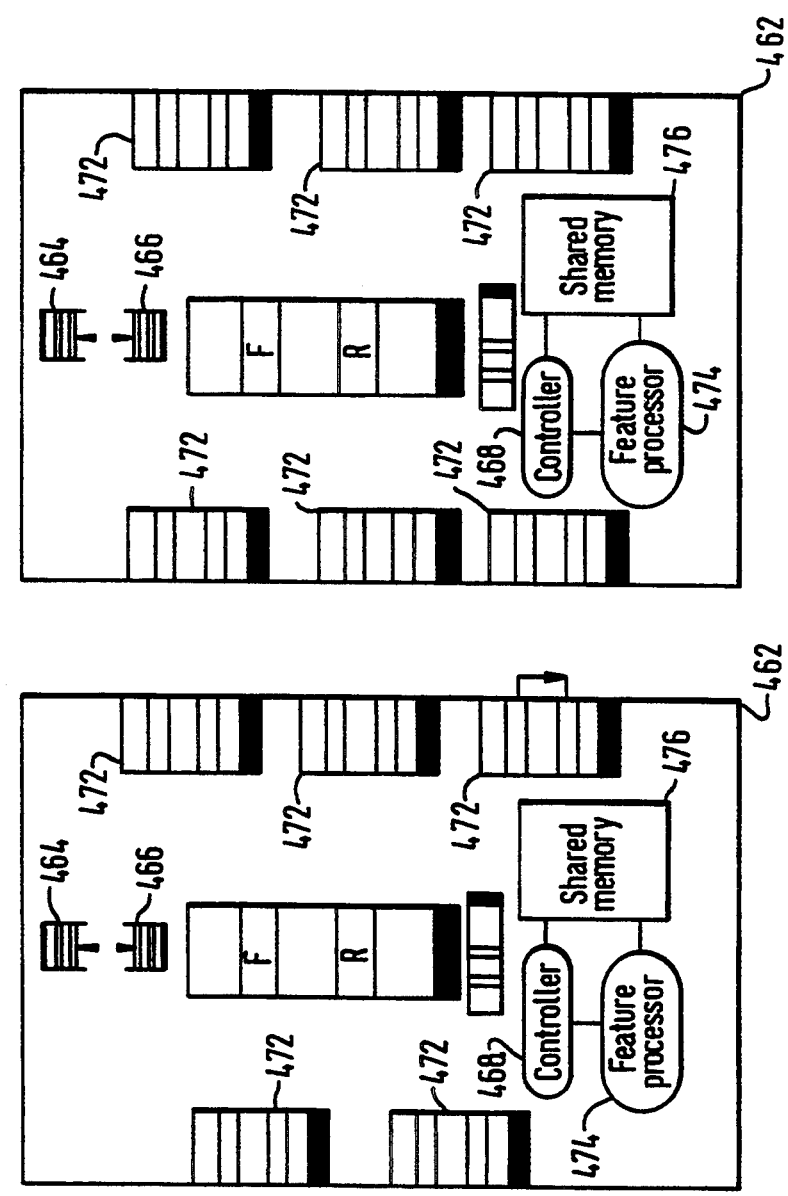
FIG. 15 is a diagram illustrating propagation of a broadcast message through the switching network toward the fold point.
Figure 16:
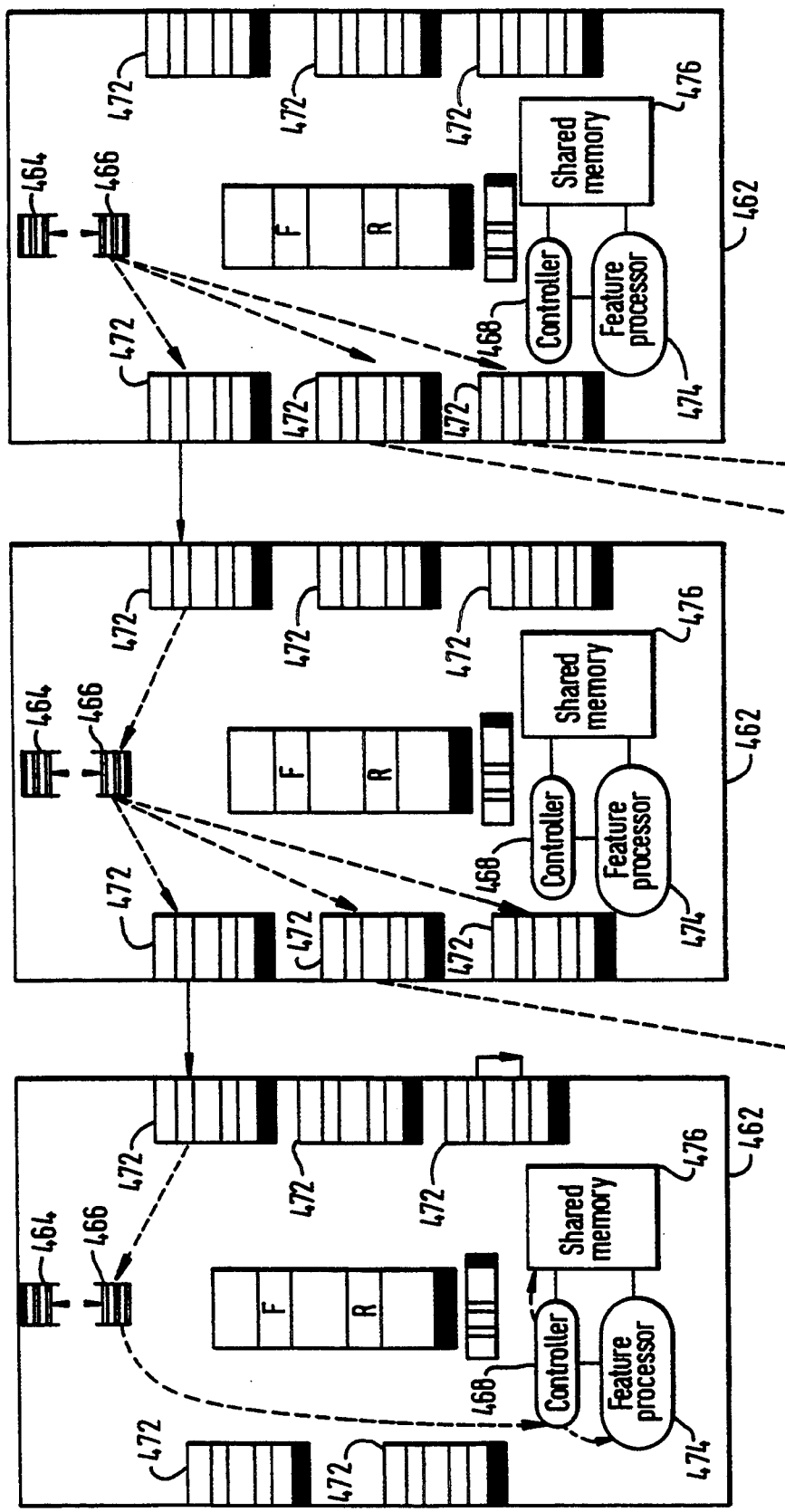
FIG. 16 is a diagram illustrating propagation of a broadcast message through the switching network outward from the fold point.
Figure 16:
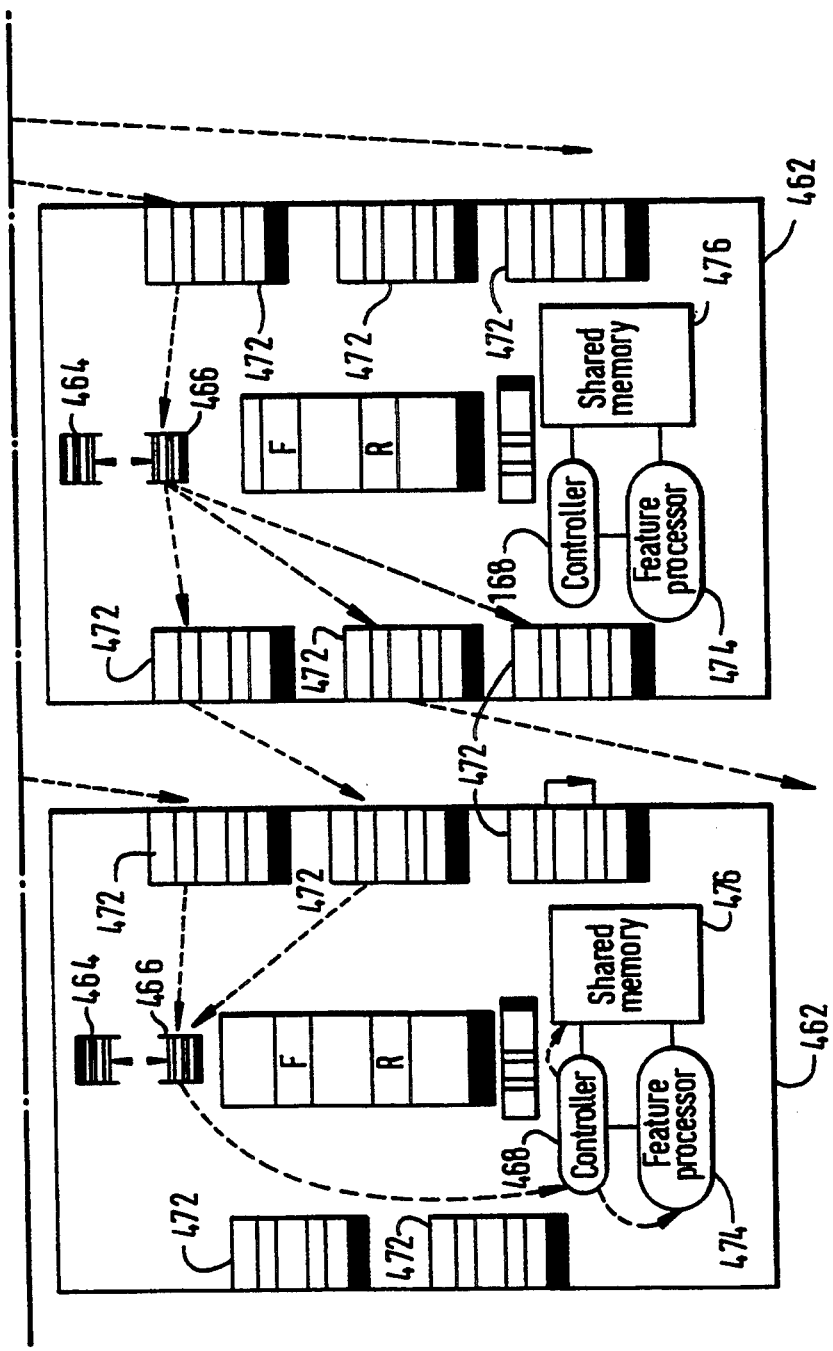

Referring to FIGS. 15 and 16, in each switch element 462, two broadcast first-in-first-out ("FIFO") registers 464, 466 are provided to transmit the broadcast message over the broadcast channels. The broadcast FIFO buffers 464, 466 may be programmed in either of two modes:

(1) Interface mode (for interface switches) where the broadcast FIFO buffers are connected between the switch port bus and the controller bus; and (2) Switch element mode (for all other switch elements) where the broadcast FIFO buffers are connected to the switch port bus only.

In interface mode, the "in" broadcast FIFO buffer 464 is loaded by the controller 468 from the controller bus and unloaded via an out-address pointer to the switch port bus. (See FIG. 3a.) The "out" broadcast FIFO buffer 466 is loaded from the switch port bus via an in-address pointer and unloaded by the controller 468 on the controller bus. As used herein, "in" refers to broadcast messages progressing into the switching network toward the fold point and "out" refers to broadcast messages progressing from the fold point out of the switching network. Each of the broadcast FIFO buffers is capable of holding the data for a full frame and allowing the same data to be read repeatedly by different outgoing switch ports.

At initialization, the correct addresses are placed into the in-address and out-address pointers associated with each broadcast channel in the switch ports. These addresses point to the top or bottom of one of the two broadcast FIFO buffers ("in" or "out"). There is a "filter" at the input of each of the broadcast FIFO buffers to insure that only valid messages are loaded into the broadcast FIFO buffers.

FIG. 15 illustrates the propagation of a broadcast message through the switching network toward a reflection switch. Any interface switch can initiate a broadcast or multicast message. For example, in FIG. 15 switch element 462 is an interface switch connected to a line card which includes a line status table with the status of each of the lines to which the line card is connected. When a signal is received indicating an incoming call, the interface switch feature processor changes the status of the line in the line status table and then hands a broadcast message 470 to the controller 468. The controller 468 then writes the broadcast message into the "in" broadcast FIFO buffer 464 to be transferred to the outgoing switch port 472 automatically by the hardware. Accordingly, the feature processor 474 only transmits line status when there is a change in line status (i.e., on an event basis).

The broadcast message is then propagated through the switching network via each switch element 10 being transferred from an input switch port 472 to "in" broadcast FIFO register 464 to an output switch port 472 until reaching the fold point. In an access or section switch, when the broadcast message is progressing into the system toward the fold point, the broadcast message is loaded into the "in" broadcast FIFO buffer 464 and then to the predetermined output switch port 472 toward the reflection switch. The designation of which switch port is to be utilized to forward broadcast messages toward the reflection switch is set at system initialization and may be dynamically changed thereafter.

In FIG. 15, the fold point or reflection switch is the switch element 462 which is farthest to the right in the figure. Upon receipt at the reflection switch, the broadcast message is loaded into the "out" broadcast FIFO buffer 466.

FIG. 16 illustrates the propagation of a broadcast message through the switching network outward from the fold point. In the reflection switch, the broadcast message is transferred from the "out" broadcast FIFO buffer 466 to all switch ports 472. In the access or section switch, when the broadcast message is coming out from the reflection switch, the broadcast message is loaded into the "out" broadcast FIFO buffer 466 in the switch element and then to all switch ports.

All interface switches can receive broadcast and multicast messages. The controller 468 determines whether the broadcast message 470 is to be indexed into shared memory 476 or treated as an event and passed the feature processor 474 as shown in FIG. 16. For example, in an interface switch connected to a key station, line status broadcast messages are stored in tables located in the feature processor memory 476 by the controller 468.

When the most significant bit of the broadcast message is 0, the broadcast message is assumed to be a status broadcast and the value of the argument in the first channel (originating logical address code or LAC) is used as an index to write the value of the argument in the second channel ("$B_s$" being line status bits) into the feature processor's broadcast index table as illustrated in FIG. 17a. As shown in FIG. 17b, the feature processor also has a button table arranged in button order thereby providing line association with the stored LAC's. The broadcast index table contains line status associated with particular line card LAC's for every line connected to the switching network. Line status may therefore be associated with particular key station buttons. It will be appreciated that the status broadcast system may also be utilized in a similar manner to provide a fast means of broadcasting a discrete quantity of data to each interface switch feature processor.

The feature processor 474 may then extract and forward to a key station only those status changes which apply to the particular key station. A table of line status for each key station is updated and the contents of the table transferred as a single data packet to the key station. Each new transferred data packet overwrites the old data stored in the line status table in the key station. The line status information may then be displayed via LED's at the key station.

It will be appreciated that the system may also be configured to note changes in the status of individual lines and compile a "change list" to be transferred to the key station. This arrangement, however, requires that the particular button to which the change applies be identified.

When the most significant bit of the broadcast message is 1, the broadcast message is assumed to be an event broadcast, the value of the data word in the first channel being the originating LAC and the value of the data word in the second channel being an event descriptor. Events may include multicast messages (in which case a type address code or TAC would be provided in the second channel), system configuration updates, date, and time of day.

It will be appreciated that multicasting is easy to achieve with local area network (LAN) type systems. However, due to its point-to-point structure, such multicasting is difficult to achieve in a switching network. The system according to the instant invention, however, provides for such a multicasting facility.

Multicasting in the instant invention is implemented essentially as a "call back" scheme. An event broadcast is propagated across the switching network and all feature processors in interface switches that recognize that they are members of the group (or "type") having the transmitted TAC set a path back to originating LAC from which the event broadcast originated. Such a multicast facility is particularly advantageous, for example, in dynamically loading software updates to interface switches in the switching network. The interface switches can retrieve a software update from an originating interface switch (e.g., connected to the system center) by recognizing that they are members of the TAC being addressed and setting a path back to the originating LAC.

Advantageously, this broadcast facility also gives rise to important new features. For example, virtual private lines may be implemented (where the originating LAC would be that of an incoming call and the event descriptor would be the private line identifier). Additionally, stock market price quotes may be made available to traders at the press of a button with this facility (originating LAC being the stock identifier and the event descriptor being the price).

Accordingly, broadcast messages are sent into the switching network in a non-broadcast manner until they reach the fold point of the switch network (i.e., multiple inputs to the broadcast FIFO buffers, one output from the broadcast FIFO buffers) as illustrated in FIG. 15. From the fold point the broadcast messages are broadcast on every available broadcast channel directed out of the switch network towards the interface switches (i.e., one input to the broadcast FIFO buffers, multiple outputs from the broadcast. FIFO buffers) as illustrated in FIG. 16.

Due to the redundant status broadcast connections from an interface switch to two access switches, the number of status messages arriving at the access switches from the section switches is duplicated, it will be appreciated that redundant broadcast messages do not represent a problem as data tables are merely overwritten with the same data. Traffic considerations, however, require that repetitions be small otherwise broadcast FIFO buffers become excessively large.

The switching network can, therefore, be initialized and dynamically reconfigured to provide for redundant broadcast messages without excessive processing load. Two channels on two communications links from a section switch to a given group of two access switches are used for broadcast messages. Of these two sets of channels, one set of channels is designated for use and the other provides backup in case of failure. Which pair of channels is used and which pair of channels is provided for backup is arbitrarily chosen and may be changed dynamically. The access switches, therefore, receive only two identical messages instead of four for any given broadcast message. The processing load related to the filtering of the status messages in the access switches can thus be reduced by one half.

As may be appreciated from the foregoing discussion, broadcast messages are initiated on an event basis. Broadcast messages, however, may also be initiated on a polled basis, either alternatively or in combination with event-initiated broadcast messages.

With a bit error rate on the inter-switch communications links better than 1:10**11, approximately one message in every 10 days of heavy load activity may be lost through communications link bit errors. To account for this probability, if considered important, the status of each line may be retransmitted at some specific time interval, e.g., every 10 seconds. It will be appreciated that, provided this retransmission is time distributed, it will have negligible effect on traffic loading. A 10 second timer may be utilized which is reset each time there is a status change, thereby providing that only line status that has not changed within 10 seconds will be retransmitted.

To prevent a communications link or switch element failure in the switch planes causing a loss of broadcast messages, it may be desirable to disable a whole switch plane from carrying broadcast messages if there is any communications link or switch element failure in the plane. This may be accomplished by writing NULL addresses in the out-address registers associated with each broadcast channel in the switch ports from the access switches to the disabled plane. This will not affect the normal traffic to the plane.

It will be appreciated that an additional line indicator at the key station, line-in-use, may be facilitated with the present system. When a button on the key station is depressed, the transmitted button code may be interpreted by the feature processor in the interface switch to set a bit in the button table corresponding to that button. This bit is used to indicate which line-in-use ("I-use") indicator associated with that button is to be activated.

In a distributed switching network as described herein, many broadcast system parameters may be dimensioned to provide desired traffic capability and system reliability. Such parameters include:

(1) the size of the broadcast FIFO buffers;
(2) the number of broadcast FIFO buffers;
(3) the number of broadcast communications links (incoming or outgoing);
(4) the number of channels on each communications link;
(5) the size of the broadcast message;
(6) the number of broadcast messages; and
(7) the location of the fold point.

While the invention has been described in its preferred embodiments, it is to be understood that the words that have been used are words of description, rather than limitation, and that changes may be made within the purview of the appended claims without departing from the true scope and spirit of the invention in its broader aspects. For example, although discussed with respect to key stations, the invention is equally applicable to standard telephone stations. Additionally, while discussed primarily in terms of duplex communication paths, the invention is equally applicable to simplex communication paths.

We claim:

1. A conferecing system for providing conference calls among groups of terminals in a digital telephone switching system, said conferencing system comprising:
a plurality of switch elements in a multistage arrangements each switch element having a summing device for interconnecting said terminals via communication links which link said switch elements;
a predetermined number of said switch elements each having a bridge port;
means for setting a plurality of first paths for carrying speech data via one or more of said predetermined number of switch elements from each one of said terminals in a group toward a designated bridge port;
means for enabling the summing device in a switch element wherein two or more first paths from said terminals towards said designated bridge port intersect in said switch element, said summing device summing the data carried in said first paths towards said bridge port such data, in the switch element having said bridge port the sum of all speech data corresponding to terminals in conference call is available; and
means for selectively assigning a second path for carrying data from said bridge port towards each of said terminals said second path capable of routing the sum of all speech data.

2. The invention according to claim 1, wherein said first and second paths are provided such that a duplex path from each one of said terminals toward said bridge port is set.

3. The invention according to claim 1, wherein said terminals include a plurality of telephone terminal units and a plurality of telephone lines.

4. The invention according to claim 3, wherein said telephone terminal units include trader key stations used for selecting private telephone line communications.

5. The invention according to claim 4, wherein said switching elements of said switching network are arranged in stages such that interconnection between said telephone terminal units and said telephone lines pass through multiple switch elements, each of said switch elements adapted to select a path therethrough.

6. The invention according to claim 5, wherein each of said switching elements further comprise:
a plurality of switch ports having an input for receiving incoming data and an output for transmitting outgoing data;
memory means having a plurality of addressable memory locations capable of storing said incoming data;
pointer table capable of storing addresses of said memory locations for writing incoming data and reading outgoing data, said addresses corresponding to each one of said incoming and outgoing data; and
summing means for summing two or more incoming data when said incoming data have the same address in said memory location;
processor means adapted to manage the operation of the switching element and said switch ports.

7. The invention according to claim 6, wherein the first stage of said switching network include an interface switch element adapted to be responsive to said telephone terminal units and said telephone lines.

8. The invention according to claim 7, wherein in each interface switch said bridge port is provided by connecting the output and input of the same switch port.

9. The invention according to claim 7, wherein said interface switch further includes an echo cancellation device capable of subtracting speech data originated by each party in the conference coupled to said interface switch such that each interface switch is capable to obtain the speech data from the other parties in the conference.

10. The invention according to claim 9, wherein said echo cancellation device further comprises:
means for sending a confirm message to said bridge port; and
means for measuring the round-trip time delay of said confirm message from the time said confirm message was sent until the time said confirm message was received, said time delay used to time the subtraction of speech data originated by each party in the conference.

11. A method for providing conference calls among groups of terminals in a digital telephone switching system, said telephone switching system having a plurality of switch elements in a multistage arrangement for interconnecting said terminals via communications links which link said switch elements, each switch element having a summing device, said method comprising the steps of:
setting a plurality of first paths for carrying speech data via one or more of said switch elements in the multistage arrangement from each one of said terminals in a group toward a designated bridge port in one of said switch elements;
enabling the summing device in a switch element wherein two or more first paths from said terminals towards said designated bridge port intersect in said switch element, said summing device summing the data carried in said first paths towards said bridge port such that at the one said switch element having said bridge port the sum of all speech data corresponding to said terminals is available; and assigning a second path for carrying data from said bridge port towards each of said terminals said second path capable of routing the sum of all speech data.

12. The method according to claim 11, wherein said first and second paths are provided such that a duplex path is set from each one of said terminals toward said bridge port.

13. The invention according to claim 11, wherein said terminals include a plurality of telephone terminal units and a plurality of telephone lines.

14. The invention according to claim 13, wherein said telephone terminal units include trader key stations used for selecting private telephone line communications.

15. The invention according to claim 14, wherein said switching elements of said switching network are arranged in stages such that interconnection between said telephone terminal units and said telephone lines pass through multiple switch elements, each of said switch elements adapted to select a path therethrough.

16. The invention according to claim 15, wherein each of said switching elements further comprise:

a plurality of switch ports having an input for receiving incoming data and an output for transmitting outgoing data;

memory means having a plurality of addressable memory locations capable of storing said incoming data;

pointer table capable of storing addresses of said memory locations for writing incoming data and reading outgoing data, said addresses corresponding to each one of said incoming and outgoing data; and summing means for summing two or more incoming data when said incoming data have the same address in said memory location; and processor means adapted to manage the operation of the switching element and said switch ports.

17. The invention according to claim 16, wherein the first stage of said switching network includes an interface switch element adapted to be responsive to said telephone terminal units and said telephone lines.

18. The invention according to claim 17, wherein in each interface switch said bridge port is provided by connecting the output and input of the same switch port.

19. The method according to claim 17, further including the step of cancelling echo by an echo cancellation device capable of subtracting speech data originated by each party in the conference coupled to said interface switch such that each interface switch is capable to obtain the speech data from the other parties in the conference.

20. The method according to claim 19, wherein said echo cancellation step further includes:

sending a confirm message to said bridge port; and measuring the round-trip time delay of said confirm message from the time said confirm message was sent until the time said confirm message was received, said time delay used to time the subtraction of speech data originated by each party in the conference.

21. A conferencing system for providing a plurality of conference calls among groups of addressable locations in a digital telephone switching system, said conferencing system comprising:

a plurality of switch elements in a multistage arrangement, each switch element having a summing device, for interconnecting said addressable locations via communication links;

means capable of setting a plurality of first paths for carrying speech data via said switch elements from each one of said addressable locations towards a designated bridge port by selectively assigning a first memory location in each switch element in each first path for writing and reading data carried in each said first path;

means for enabling a summing device in each intersecting switch element wherein two or more first paths from said addressable locations to said designated bridge port intersect, said summing device in each of said intersecting switch elements capable of summing the data carried in said first paths and writing and reading the sum in the first memory location of said intersecting switch element such that said bridge port is capable of receiving the total sum of all data originated from said addressable locations; and means capable of setting a second path for carrying data via said switch elements from said designated bridge port to each one of said addressable locations by selectively assigning a second memory location in each switch element in each second path for writing and reading said total sum of all data carried in each said second path.

22. The invention according to claim 21, wherein said first and second path are provided such that a duplex path is set from each one of said addressable location toward said bridge port.

23. The invention according to claim 21, wherein the address of said first and second memory location in each switch element is provided by a pointer table, such that many incoming data to each switch element are capable to be addressed to the same memory location and many outgoing data from said switch element can be read from the same memory location.

24. The invention according to claim 21, wherein each of said switching elements further comprises:

a plurality of switch ports having an input for receiving incoming data and an output for transmitting outgoing data;

memory means having a plurality of addressable memory locations capable of being written into and read from said incoming and outgoing data;

pointer table capable of storing addresses of said memory locations for writing incoming data and reading outgoing data, said addresses corresponding to each one of said incoming and outgoing data;

summing means for summing two or more incoming data when said incoming data have the same address in said memory location; and processor means adapted to manage the operation of the switching element and said switch ports.

25. The invention according to claim 21, wherein said addressable locations are identified by a unique logical address code.

26. The invention according to claim 21, wherein said communication links connecting switch elements in the switching system supply serial data in a serial thirty-two channel time division multiplexed frame format with twenty-four bits of information per channel, and wherein each channel in each frame corresponds to a separate communication path.

27. The invention according to claim 26, wherein each of said separate communication paths having dedicated channels, said channels being transmitted through the same switch ports of each switch elements during the length of a call.

28. The invention according to claim 25, wherein said unique logical address codes include a plurality of telephone terminal units and a plurality of telephone lines.

29. The invention according to claim 28, wherein said telephone terminal units include trader key stations used for selecting private telephone line communications.

30. The invention according to claim 29, wherein said switching elements of said switching network are arranged in stages such that interconnection between said telephone terminal units and said telephone lines pass through multiple switch elements, each of said switch elements adapted to select a path therethrough.

31. The invention according to claim 30, wherein the first stage of said switching network includes an interface switch element adapted to be responsive to said telephone terminal units and said telephone lines.

32. The invention according to claim 31, wherein in each interface switch said bridge port is provided by connecting the output and input of the same switch port.

33. The invention according to claim 32, wherein said interface switch further includes an echo cancellation device capable of subtracting speech data originated by each party in the conference coupled to said interface switch such that each interface switch is capable to obtain the speech data from the other parties in the conference.

34. The invention according to claim 33, wherein said echo cancellation device further comprise:
means for sending a confirm message to said bridge port; and
means for measuring the round-trip time delay of said confirm message from the time said confirm message was sent until the time said confirm message was received, said time delay used to time the subtraction of speech data originated by each party in the conference.

35. A method for providing a plurality of conference calls among groups of terminals in a digital telephone switching system, said telephone switching system having a plurality of switch elements in a multistage arrangement for interconnecting said terminals via communications links comprising the steps of:
allocating a predetermined number of bridge ports within a predetermined number of said switch elements in the multistage arrangement;
setting, for each group of the groups of terminals, a first path for carrying data via one or more of said predetermined switch elements from each one of said terminals in the group towards a designated bridge port by selectively assigning a first memory location in each switch element in each first path for writing and reading data carried in each said first path;
enabling a summing device in each switch element wherein two or more first paths from said addressable locations to said designated bridge port intersect;
summing the data carried in said first paths and writing and reading the sum in the first memory location of said switch element wherein two or more first paths intersect such that said bridge port is capable of receiving the total sum of all data originated from said terminals; and
setting a second path via said switch elements for carrying said total sum of all data from said designated bridge port to each one of said terminals by selectively assigning a second memory location in each switch element in each second path for writing and reading said total sum of all data carried in each said second path.

36. The method according to claim 35, wherein the addresses of said first and second memory locations in each switch element are provided by a pointer table, such that many incoming data to each switch element are capable to be addressed to the same memory location and many outgoing data from said switch element can be read from the same memory location.

37. The invention according to claim 35, wherein each of said switching elements further comprises:
a plurality of switch ports having an input for receiving incoming data and an output for transmitting outgoing data;
memory means having a plurality of addressable memory locations capable of being written into and read from said incoming and outgoing data;
pointer table capable of storing addresses of said memory locations for writing incoming data and reading outgoing data, said addresses corresponding to each one of said incoming and outgoing data;
summing means for summing two or more incoming data when said incoming data have the same address in said memory location; and
processor means adapted to manage the operation of the switching element and said switch ports.

38. The invention according to claim 36, wherein said terminals are identified by a unique logical address code.

39. The invention according to claim 38, wherein said communication links connecting switch elements in the switching system supply serial data in a serial thirty-two channel time division multiplexed frame format with twenty-four bits of information per channel, and wherein each channel in each frame corresponds to a separate communication path.

40. The invention according to claim 39, wherein each of said separate communication paths having dedicated channels, said channels being transmitted through the same switch ports of each switch element during the length of a call.

41. The invention according to claim 40, wherein said unique logical address codes includes a plurality of telephone terminal units and a plurality of telephone lines.

42. The invention according to claim 41, wherein said telephone terminal units include trader key stations used for selecting private telephone line communications.

43. The invention according to claim 42, wherein said switching elements of said switching network are arranged in stages such that interconnection between said telephone terminal units and said telephone lines pass through multiple switch elements, each of said switch elements adapted to select a path therethrough.

44. The invention according to claim 43, wherein the first stage of said switching network includes an interface switch element adapted to be responsive to said telephone terminal units and said telephone lines.

45. The invention according to claim 44, wherein in each interface switch said bridge port is provided by connecting the output and input of the same switch port.

46. The method according to claim 45, further including the step of cancelling echo by an echo cancellation device capable of subtracting speech data originated by each party in the conference coupled to said interface switch such that each interface switch is capable to obtain the speech data from the other parties in the conference.

47. The method according to claim 46, wherein said echo cancellation step further includes:
 sending a confirm message to said bridge port; and
 measuring the round-trip time delay of said confirm message from the time said confirm message was sent until the time said confirm message was received, said time delay used to time the subtraction of speech data originated by each party in the conference.

* * * * *